(12) United States Patent
Konishi

(10) Patent No.: US 8,320,683 B2
(45) Date of Patent: *Nov. 27, 2012

(54) IMAGE PROCESSING METHOD, IMAGE PROCESSING APPARATUS, IMAGE READING APPARATUS, AND IMAGE FORMING APPARATUS

(75) Inventor: Yohsuke Konishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1331 days.

This patent is subject to a terminal disclaimer.

(21) Appl. No.: 12/027,036

(22) Filed: Feb. 6, 2008

(65) Prior Publication Data

US 2008/0212115 A1 Sep. 4, 2008

(30) Foreign Application Priority Data

Feb. 13, 2007 (JP) .................................. 2007-032592
Aug. 10, 2007 (JP) .................................. 2007-210013

(51) Int. Cl.
*G06K 9/62* (2006.01)

(52) U.S. Cl. ......................... 382/224; 382/209; 382/306

(58) Field of Classification Search .................. 382/209, 382/224, 306; 707/E17.008, E17.052
See application file for complete search history.

(56) References Cited

U.S. PATENT DOCUMENTS

| 5,465,353 | A | 11/1995 | Hull et al. |
| 6,674,924 | B2 * | 1/2004 | Wright et al. ................. 382/306 |
| 6,941,321 | B2 * | 9/2005 | Schuetze et al. ...................... 1/1 |
| 7,233,945 | B2 * | 6/2007 | Shiiyama ............................... 1/1 |
| 7,826,074 | B1 * | 11/2010 | Wang et al. .................. 358/1.13 |
| 8,144,994 | B2 * | 3/2012 | Konishi ......................... 382/209 |
| 2008/0163364 | A1 * | 7/2008 | Ferlitsch ......................... 726/21 |
| 2008/0187249 | A1 * | 8/2008 | Konishi ......................... 382/306 |
| 2008/0212115 | A1 * | 9/2008 | Konishi ......................... 358/1.9 |

FOREIGN PATENT DOCUMENTS

| JP | 7-282088 A | 10/1995 |
| JP | 8-7071 A | 1/1996 |
| JP | 10-316302 A | 12/1998 |
| JP | 2001-005831 A | 1/2001 |
| JP | 2001-257862 A | 9/2001 |
| JP | 2006-236218 A | 9/2006 |
| JP | 2006-306735 | 11/2006 |
| WO | WO-2006/092957 A1 | 9/2006 |

OTHER PUBLICATIONS

U.S. Appl. No. 11/938,107.

* cited by examiner

*Primary Examiner* — Gregory M Desire
(74) *Attorney, Agent, or Firm* — Birch, Stewart, Kolasch & Birch, LLP

(57) ABSTRACT

When a reference image to which a document image is judged as being similar for the first time is not the first document sheet of the document type which contains this reference image, error occurrence is concluded so that the page number indicated by a counter is set to be an error occurrence position. In case that the reference image to which the document image is similar is the last document sheet of the document type, when the number of document images having been counted up by the time when this document image is judged as being similar to the reference image does not correspond with the number of reference images contained in the document type, error occurrence is concluded so that the page number indicated by a counter is set to be an error occurrence position.

11 Claims, 40 Drawing Sheets

F I G. 4

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

F I G. 5

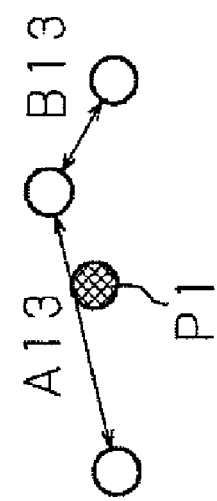
FIG. 8A H11
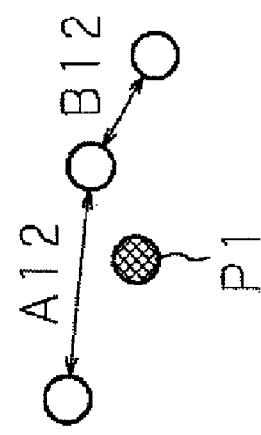
FIG. 8B H12
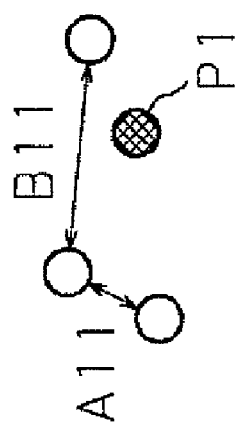
FIG. 8C H13

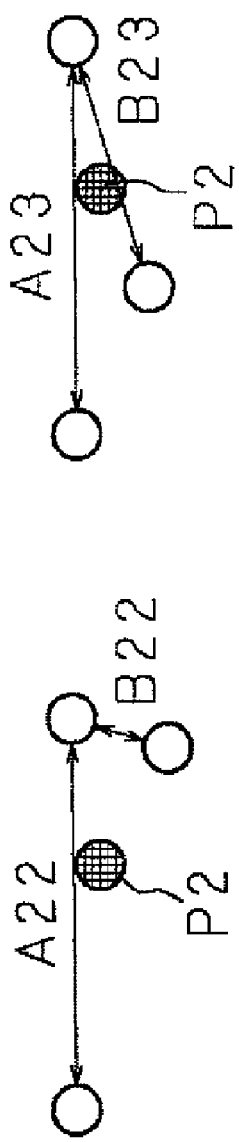
FIG. 9A H21  FIG. 9B H22  FIG. 9C H23

FIG. 10A H31
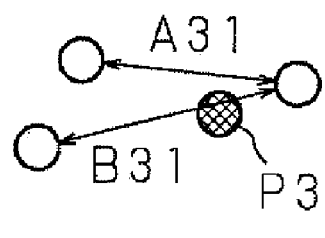
FIG. 10B H32
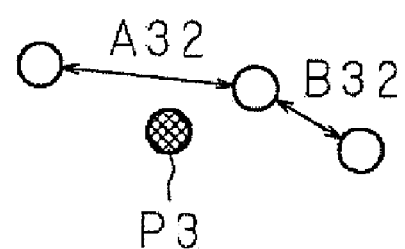
FIG. 10C H33
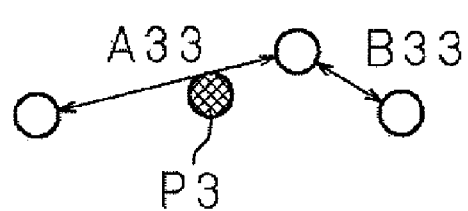
FIG. 10D H34
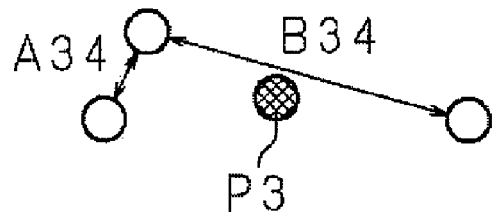

FIG. 11A H41
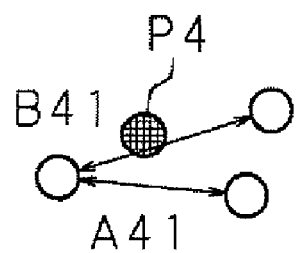
FIG. 11B H42
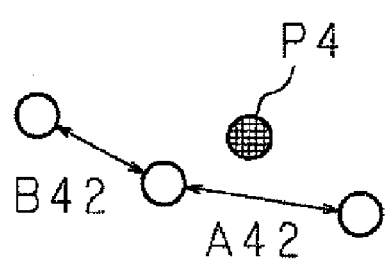
FIG. 11C H43
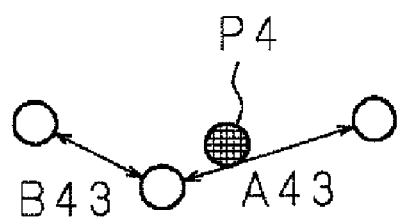
FIG. 11D H44
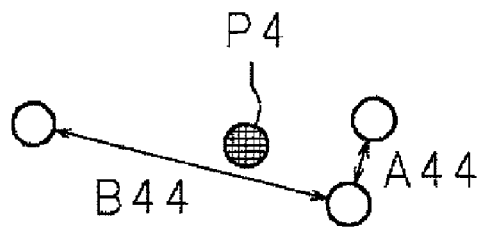

| HASH VALUE | DOCUMENT PAGE INDEX |
|---|---|
| H1 | ID1 |
| H2 | ID1, ID3 |
| H3 | ID1, ID2 |
| H4 | ID1, ID3 |
| H5 | ID1 |
| H6 | ID1, ID2 |
| ⋮ | ⋮ |

| HASH VALUE | DOCUMENT PAGE INDEX |
|---|---|
| H1 | ID1, ID1 |
| H2 | ID1, ID3 |
| H3 | ID1, ID2 |
| H4 | ID1, ID3 |
| H6 | ID1, ID2 |
| ⋮ | ⋮ |

| DOCUMENT PAGE INDEX | HASH VALUE | HEAD FLAG | END FLAG | DOCUMENT TYPE INDEX |
|---|---|---|---|---|
| ID1 | H1, H2, H4, H5, H6 ··· | 1 | 0 | |
| ID2 | H3, H6, ··· | 0 | 0 | DocID1 |
| ID3 | H2, H4, ··· | 0 | 1 | |

FIG. 14
DOCUMENT (DocID1)
DOCUMENT (DocID2)
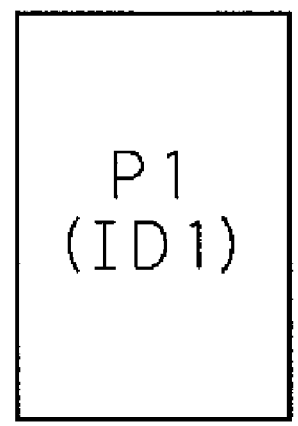
P1 (ID1)
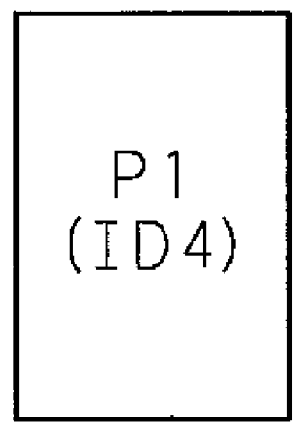
P1 (ID4)
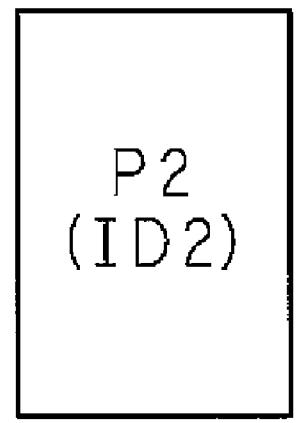
P2 (ID2)
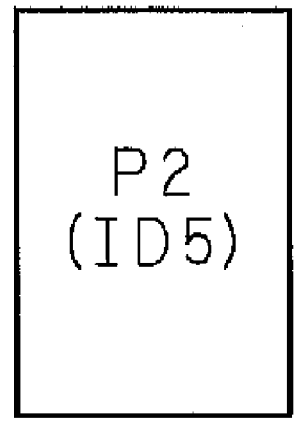
P2 (ID5)
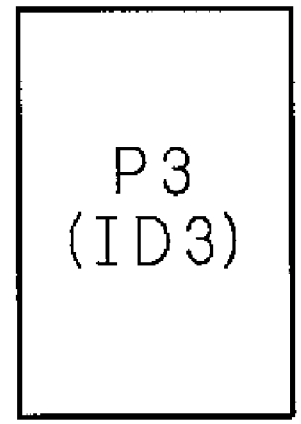
P3 (ID3)

| DOCUMENT PAGE INDEX | HEAD FLAG | END FLAG | DOCUMENT TYPE INDEX |
|---|---|---|---|
| ID1 | 1 | 0 | DocID1 |
| ID2 | 0 | 0 | DocID1 |
| ID3 | 0 | 1 | DocID1 |
| ID4 | 1 | 0 | DocID2 |
| ID5 | 0 | 1 | DocID2 |
| ⋮ | ⋮ | ⋮ | ⋮ |

| DOCUMENT TYPE INDEX | REFERENCE PAGE NUMBER |
|---|---|
| DocID1 | 3 |
| DocID2 | 2 |
| ⋮ | ⋮ |

| DOCUMENT PAGE INDEX | PAGE ID | DOCUMENT TYPE INDEX |
|---|---|---|
| ID1 | 1 | DocID1 |
| ID2 | 2 | DocID1 |
| ID3 | 3 | DocID1 |
| ID4 | 1 | DocID2 |
| ID5 | 2 | DocID2 |
| ⋮ | ⋮ | ⋮ |

| DOCUMENT PAGE INDEX | PAGE ID | FACE INFORMATION | DOCUMENT TYPE INDEX |
|---|---|---|---|
| ID1 | 1 | 1 | DocID1 |
| ID2 | 1 | 2 | DocID1 |
| ID3 | 2 | 1 | DocID1 |
| ID4 | 2 | 2 | DocID1 |
| ID5 | 3 | 1 | DocID1 |
| ID6 | 3 | 2 | DocID1 |
| ID7 | 1 | 1 | DocID2 |
| ID8 | 1 | 2 | DocID2 |
| ⋮ | ⋮ | ⋮ | ⋮ |

IMAGE PROCESSING METHOD, IMAGE PROCESSING APPARATUS, IMAGE READING APPARATUS, AND IMAGE FORMING APPARATUS

CROSS-REFERENCE TO RELATED APPLICATIONS

This Nonprovisional application claims priority under 35 U.S.C. §119(a) on Patent Application No. 2007-32592 filed in Japan on Feb. 13, 2007 and Patent Application No. 2007-210013 filed in Japan on Aug. 10, 2007, the entire contents of which are hereby incorporated by reference.

BACKGROUND OF THE INVENTION

The present invention relates to: an image processing method and an image processing apparatus for judging whether an obtained document image is similar to a preliminary reference image; and an image reading apparatus and an image forming apparatus employing this image processing apparatus.

A technique is known in which a document consisting of a plurality of pages is partitioned at desired pages so that the document is classified, and then the page images of individual classified documents are filed separately. In an exemplary method, partition sheets having an identification mark are inserted at breaks of the document in advance. Then, when an identification mark recorded on a partition sheet is detected among the page images obtained by reading the document through an image reading apparatus such as a scanner, the document is partitioned. In another exemplary method, when a document is to be read by an image reading apparatus, the numbers of pages for partitioning a document are specified in advance. Then, when the document of a specified number of pages is read, the document is partitioned.

Further, in order that filing processing for page images obtained by reading a document should be achieved in a short time, an image filing apparatus is proposed in which: page images of a plurality of sub-documents are read successively and stored; then, index information is generated for referring to each of the page images; then, index information for each page is stored in a manner partitioned for each sub-document, on the basis of the specified number of pages for one sub-document; so that without the necessity of performing filing processing on page images at each time when page images for one sub-document have been read, filing processing is performed document by document on the page images of a plurality of sub-documents (see Japanese Patent Application Laid-Open No. H8-7071).

On the other hand, as a technique of matching a page image obtained by reading a document with a predetermined image stored in advance and thereby judging similarity of the image, a method is known in which, for example, keywords in a page image obtained by reading a document are extracted by an OCR (Optical Character Reader) and then similarity of the image is judged on the basis of the extracted keywords. In another method, documents where similarity judgment is to be performed are limited to sheet forms containing ruled lines and then features of the ruled lines are extracted from a page image obtained by reading a document so that similarity of the image is judged.

Further, a matching apparatus is proposed in which features of an input document are extracted so that a descriptor is generated. Then, the descriptor is matched with descriptors stored in advance in a descriptor database, so that a document having entire or partial conformity with a descriptor stored in the descriptor database is searched from the input documents (see Japanese Patent Application Laid-Open No. H7-282088).

BRIEF SUMMARY OF THE INVENTION

Nevertheless, in the method in which partition sheets are inserted into the document like in the prior art, at each time of scan processing for a document, partition sheets need be inserted at desired positions of the document before the scan. Further, the partition sheets need be searched and removed from the document after the scan. Furthermore, in the method in which the number of pages of one sub-document is specified in advance, the kind of the number of pages that is allowed to be specified is restricted to one. Thus, documents can merely be partitioned using always the same number of pages. This has caused a problem that filing processing for page images is not achieved for a document in which the number of pages for each sub-document differs from each other.

In the above-mentioned apparatus according to Japanese Patent Application Laid-Open No. H8-7071, for the purpose of processing of a document in which the number of pages for each sub-document differs from each other, a description file which defines the number of pages of each of a plurality of sub-documents need be generated. Then, the generated description file need be read in advance. Thus, when the document is composed of a large number of pages, the work of generating the description file is complicated. Further, in the apparatus according to Japanese Patent Application Laid-Open No. H8-7071, when a part of the document has page omission or alternatively page substitution, a problem arises that each sub-document is stored in an unintended state.

Further, the above-mentioned apparatus according to Japanese Patent Application Laid-Open No. H7-282088 performs matching process for the descriptors basically on a single-page basis. That is, documents consisting of a plurality of pages are not expected as targets of processing. Thus, no description is given for, for example, processing to be performed when a part of the document has page omission, processing to be performed in case of page substitution, and processing of dividing the document into a plurality of sub-documents.

The present invention has been devised in view of such situations. An object of the present invention is to provide: an image processing method and an image processing apparatus capable of determining whether the order of obtained document images corresponds with the order of a document stored in advance, without the necessity of special operation by a user; and an image reading apparatus and an image forming apparatus employing this image processing apparatus.

Another object of the present invention is to provide: an image processing method and an image processing apparatus capable of, even when a large number of documents are obtained, dividing the document images for each document stored in advance and determining easily whether the order of the obtained document images corresponds with the order of a document stored in advance; and an image reading apparatus and an image forming apparatus employing this image processing apparatus.

Yet another object of the present invention is to provide: an image processing method and an image processing apparatus capable of extracting features of a document image and then, on the basis of the extracted features and the stored features of a reference image, judging easily whether the document image is similar to the reference image; and an image reading apparatus and an image forming apparatus employing this image processing apparatus.

Another object of the present invention is to provide: an image processing method and an image processing apparatus capable of notifying a user of a situation when the order of document images is determined as not being correct; and an image reading apparatus and an image forming apparatus employing this image processing apparatus.

The image processing apparatus according to the present invention is an image processing apparatus for judging whether an obtained document image is similar to a preliminary reference image and then, on the basis of the judgment result, performing image processing on the document image, comprising: storage means for storing a plurality of type identifiers each of which contains one or a plurality of image identifiers each for identifying each of a plurality of reference images and thereby identifies a type of a document; judgment means for judging whether the obtained document image is similar to a reference image; selection means for, when the judgment means judges that the document image is similar to a reference image, selecting an image identifier which identifies the reference image from among the image identifiers stored in the storage means; and determination means for, for each type identifier which contains the image identifier selected by the selection means, determining whether the image identifier contained in the type identifier corresponds with the image identifier which identifies the reference image judged as being similar to the document image.

A plurality of type identifiers are stored in advance each of which contains one or a plurality of image identifiers each for identifying each of a plurality of reference images. A type identifier (document type index) corresponds, for example, to what identifies each sub-document (the type of a document) composed of a plurality of pages, and identifies a classification unit used when a large number of documents are classified document by document. Further, an image identifier (a document page index) is used for identifying each reference image, and identifies each document page constituting a document. That is, the reference document is classified in accordance with the document type index (type identifier). Then, the document classified in accordance with the document type index contains reference images identified by one or a plurality of document page indexes (image identifier).

It is judged whether the obtained document image is similar to a reference image. The method of similarity judgment may be, for example, such that features extracted from individual images are compared with each other so that similarity is calculated. When the document image is judged as being similar to a reference image, an image identifier is selected that identifies the reference image from among a plurality of image identifiers. Then, a type identifier is identified that contains the selected image identifier. Thus, it is determined which type identifier contains the reference image similar to the document image. Further, the type identifier can be identified. For each identified type identifier, it is determined whether the image identifier contained in the type identifier corresponds with the image identifier which identifies the reference image judged as being similar to the document image. Thus, it can be determined whether the order of the obtained document images corresponds with the order of the reference images contained in each document stored in advance. Thus, when the reference images constituting each document are stored once, the presence or absence of page omission in the obtained document images and the presence or absence of page substitution can be determined without the necessity of special operation by a user. Further, when the above-mentioned processing is performed on the image read by the image reading means, the presence or absence of stacked page feed can also be determined in addition to the presence or absence of page omission in the read document image and the presence or absence of page substitution.

The image processing apparatus according to the present invention is an image processing apparatus wherein the image identifier contains an identifier which indicates whether the reference image is the first reference image contained in the document type identified by the type identifier which contains the image identifier itself, and wherein the image processing apparatus further comprises: means for, at each time when a document image is judged as being similar to a reference image, counting up the number of document images judged as being similar; and means for, when the first sheet is counted up, determining whether the reference image is the first reference image on the basis of the image identifier selected by the selection means; wherein when the reference image is determined as not being the first reference image, the determination means determines that the order of the document identified by the type identifier which contains the image identifier selected by the selection means does not correspond with the order of the document having been stored.

The image identifier for identifying each reference image contains an identifier which indicates whether the reference image is the first reference image contained in the document type identified by the type identifier which contains the image identifier itself. When it is judged for the first time that the document image is similar to a reference image, it is determined whether this reference image is the first reference image of the document containing the reference image. When the reference image is not the first reference image, the order of the document images is determined as not corresponding with the order of the reference images contained in the document stored in advance. Thus, in case that it is judged for the first time that the document image is similar to a reference image, when the reference image similar to the document image is not the first reference image of the document, an error is concluded in the order of the document images. Accordingly, even when a large number of documents are obtained, the documents can easily be partitioned for each type identifier and document separations to be classified can be detected and divided. At the same time, it can be determined whether the order of the document images is correct.

The image processing apparatus according to the present invention is an image processing apparatus wherein the image identifier contains an identifier which indicates whether the reference image is the last reference image contained in the document type identified by the type identifier which contains the image identifier itself, and wherein the image processing apparatus further comprises: means for, at each time when a document image is judged as being similar to a reference image, counting up the number of document images judged as being similar; means for, when the judgment means judges that the document image is similar to the reference image, determining whether the reference image is the last reference image on the basis of the image identifier selected by the selection means; and means for, when the reference image is determined as being the last reference image, determining whether the number of counted document images corresponds with the number of image identifiers contained in the type identifier which contains the image identifier selected by the selection means; wherein when the number of counted document images is determined as not corresponding with the number of image identifiers contained in the type identifier, the determination means determines that the order of the document identified by the type identifier which contains the image identifier selected by the selection means does not correspond with the order of the document having been stored.

The image identifier for identifying each reference image contains an identifier which indicates whether the reference image is the last reference image contained in the document type identified by the type identifier which contains the image identifier itself. At each time when a document image is judged as being similar to a reference image, the number of document images judged as being similar is counted up. Further, when the document image is judged as being similar to a reference image, it is determined whether this reference image is the last reference image of the document containing the reference image. When the reference image is the last reference image, it is determined whether the number of counted document images corresponds with the number of image identifiers contained in the type identifier. When it is determined that the number of document images does not correspond with the number of image identifiers, the order of the document images is determined as not corresponding with the order of the reference images contained in the document stored in advance. Thus, in case that the document image is similar to the last reference image of a document, when the number of document images having been counted up so far does not correspond with the number of reference images contained in the document, an error is concluded in the order of the document images. Accordingly, even when a large number of documents are obtained, the documents can easily be partitioned for each type identifier and document separations to be classified can be detected and divided. At the same time, it can be determined whether the order of the document images is correct.

The image processing apparatus according to the present invention is an image processing apparatus wherein the image identifier contains an identifier which indicates a page number in the document type identified by the type identifier containing the image identifier itself, and wherein the image processing apparatus further comprises: means for, at each time when a document image is judged as being similar to a reference image, counting up the number of document images judged as being similar; means for, when the judgment means judges that the document image is similar to the reference image, detecting the page number of the reference image on the basis of the image identifier selected by the selection means; and means for determining whether the detected page number corresponds with the number of counted document images; wherein when the detected page number is determined as not corresponding with the number of counted document images, the determination means determines that the order of the document identified by the type identifier which contains the image identifier selected by the selection means does not correspond with the order of the document having been stored.

The image identifier for identifying each reference image contains an identifier which indicates a page number in the document type identified by the type identifier containing the image identifier itself. At each time when a document image is judged as being similar to a reference image, the number of document images judged as being similar is counted up. Further, when the document image is judged as being similar to a reference image, the page number of this reference image is detected. Then, it is determined whether the detected page number corresponds with the number of counted document images. When it is determined that the page number does not correspond with the number of document images, the order of the document images is determined as not corresponding with the order of the reference images contained in the document stored in advance. Thus, in case that the document image is similar to a reference image, when the page number of the reference image similar to the document image does not correspond with the number of document images having been counted up so far, an error is concluded in the order of the document images. Accordingly, it can be determined whether the order of the document images is correct on a page basis for a document consisting of a plurality of document images.

The image processing apparatus according to the present invention is an image processing apparatus wherein the image identifier contains an identifier which indicates that the image is either a front side image or a back side image of one document sheet, the judgment means judges whether two document images obtained from the front side and the back side of the one document sheet are respectively similar to reference images, and when the judgment means judges that the two document images are respectively similar to reference images, the selection means selects image identifiers each of which identifies the reference image from among the image identifiers stored in the storage means, and wherein the image processing apparatus further comprises: means for, on the basis of the image identifier selected by the selection means, determining whether the two reference images are the front side image and the back side image of the one document sheet; and means for, when the two reference images are determined as being the front side image and the back side image of the one document sheet, determining whether the reference image similar to the document image obtained from the front side of the one document sheet is the front side image and whether the reference image similar to the document image obtained from the back side of the one document sheet is the back side image; wherein when it is determined that the reference image similar to the document image obtained from the front side of the one document sheet is the back side image and that the reference image similar to the document image obtained from the back side of the one document sheet is the front side image, the determination means determines that the order of the document identified by the type identifier which contains the image identifier selected by the selection means does not correspond with the order of the document having been stored.

The image processing apparatus according to the present invention is an image processing apparatus further comprising: means for, when it is determined that the reference image similar to the document image obtained from the front side of the one document sheet is the back side image and that the reference image similar to the document image obtained from the back side of the one document sheet is the front side image, exchanging the front and back of the two document images.

The image identifier for identifying each reference image contains an identifier which indicates that the image is either a front side image or a back side image of the one document sheet. When two document images obtained from the front side and the back side of the one document sheet are judged as being respectively similar to reference images, it is determined whether these two reference images are the front side image and the back side image of the one document sheet. When it is determined that these two reference images are the front side image and the back side image of the one document sheet, it is determined whether the reference image similar to the document image obtained from the front side of the one document sheet is the front side image and whether the reference image similar to the document image obtained from the back side of the one document sheet is the back side image. When it is determined that the reference image similar to the document image obtained from the front side of the one document sheet is the back side image and that the reference image similar to the document image obtained from the back side of the one document sheet is the front side image, the order of the document images is determined as not corresponding with the order of the reference images contained in the document stored in advance. Further, when it is determined that the reference image similar to the document image obtained from the front side of the same document sheet is the back side image and that the reference image similar to the document image obtained from the back side of the same document sheet is the front side image, the front and back of the two document images can be exchanged so that the document in which the front and back are substituted can be restored correctly.

The image processing apparatus according to the present invention is an image processing apparatus wherein the storage means stores features as associated with an image identifier of the reference image, and wherein the image processing apparatus further comprises extraction means for extracting features of the obtained document image, wherein on the basis of the features extracted by the extraction means and the features of the reference image stored in the storage means, the judgment means judges whether the document image is similar to the reference image.

The features (feature vectors e.g., hash values) and the image identifiers (document page indices) of reference images are stored in advance in a mutually associated manner, for example, in the form of a hash table. The features (feature vectors e.g., a hash value) of a document image is extracted. Then, it is determined whether the extracted features correspond with features stored in the hash table. In case of correspondence, voting is performed for the image identifier corresponding to the features. Similar processing is performed for respective features of the document image. Then, an image identifier having the greatest number of votes is identified, so that the document image is judged as being similar to a reference image identified by the image identifier having the greatest number of votes. The features of the document image is extracted. Then, on the basis of the extracted features and the stored features of a reference image, an image identifier corresponding to the features is identified. Then, the document image is judged as being similar to the reference image identified by the image identifier. Thus, without the necessity of storing the reference images themselves, merely by storing features corresponding to the reference images, it can easily be judged whether a document image is similar to a reference image.

The image processing apparatus according to the present invention is an image processing apparatus further comprising means for notifying a situation when the determination means determines that the order of the document identified by the type identifier which contains the image identifier selected by the selection means does not correspond with the order of the document having been stored.

When the order of the document images does not correspond with the order of the reference images of a document stored in advance, that is, when the order of the document images is determined as not being correct, this situation is notified. Thus, even in case that a large number of documents are obtained, when page omission, page substitution, or the like occurs in an obtained document, the user can easily recognize the situation. An exemplary method for notifying the user is to display the situation onto a display section in an operation panel provided in the image processing apparatus, the image reading apparatus, or the image forming apparatus. Further, when the document images are read by an image reading apparatus (a scanner) connected to a computer, the situation may be displayed on a display of the computer.

The image reading apparatus according to the present invention is an image reading apparatus comprising: image reading means for reading a document image; and any one of the image processing apparatuses described above; wherein the image processing apparatus processes the document image read by the image reading means.

The image forming apparatus according to the present invention is an image forming apparatus comprising: any one of the image processing apparatuses described above; and an image forming apparatus for forming an output image on the basis of the document image processed by the image processing apparatus.

The computer program according to the present invention is a computer program for causing a computer to judge whether an inputted document image is similar to a reference image stored in advance and then, on the basis of the judgment result, perform image processing on the document image, wherein the computer program comprises steps of: causing the computer to judge whether the inputted document image is similar to any one of a plurality of reference images; when a document image is judged as being similar to a reference image, causing the computer to select an image identifier which identifies the reference image from among a plurality of image identifiers each for identifying a reference image; and causing the computer, for each type identifier containing the selected image identifier, to determine whether the image identifier contained in the type identifier corresponds with the image identifier which identifies the reference image judged as being similar to the document image.

The computer-readable memory product according to the present invention stores the computer program described above.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanation diagram showing an example of a filter coefficient of a filtering section;

FIG. 5 is an explanation diagram showing an example of a feature point of a connected component;

FIGS. 8A through 8C are explanatory diagrams showing an example of calculation of an invariant, in accordance with the invention, with respect to a point P1;

FIGS. 9A through 9C are explanatory diagrams showing an additional example of calculation of an invariant, in accordance with the invention, with respect to a point P2;

FIGS. 10A through 10D are explanatory diagrams of a further example of calculation of an invariant, in accordance with the invention, with respect to a point P3;

FIGS. 11A through 11D are explanatory diagrams showing another example of calculation of an invariant, in accordance with the invention, with respect to a point P4;

FIGS. 12A and 12B are explanation diagrams showing a structure of a hash table;

FIG. 14 is an explanation diagram showing an example of a document to be stored;

FIGS. 15A and 15B are explanation diagrams showing a structure of a document image table and a document classification table;

FIG. 20 is an explanation diagram showing a structure of a document image table;

FIG. 24 is an explanation diagram showing a structure of a document image table;

DETAILED DESCRIPTION OF THE INVENTION

The present invention is described below with reference to the drawings illustrating its embodiments.

Embodiment 1

Figure 1:
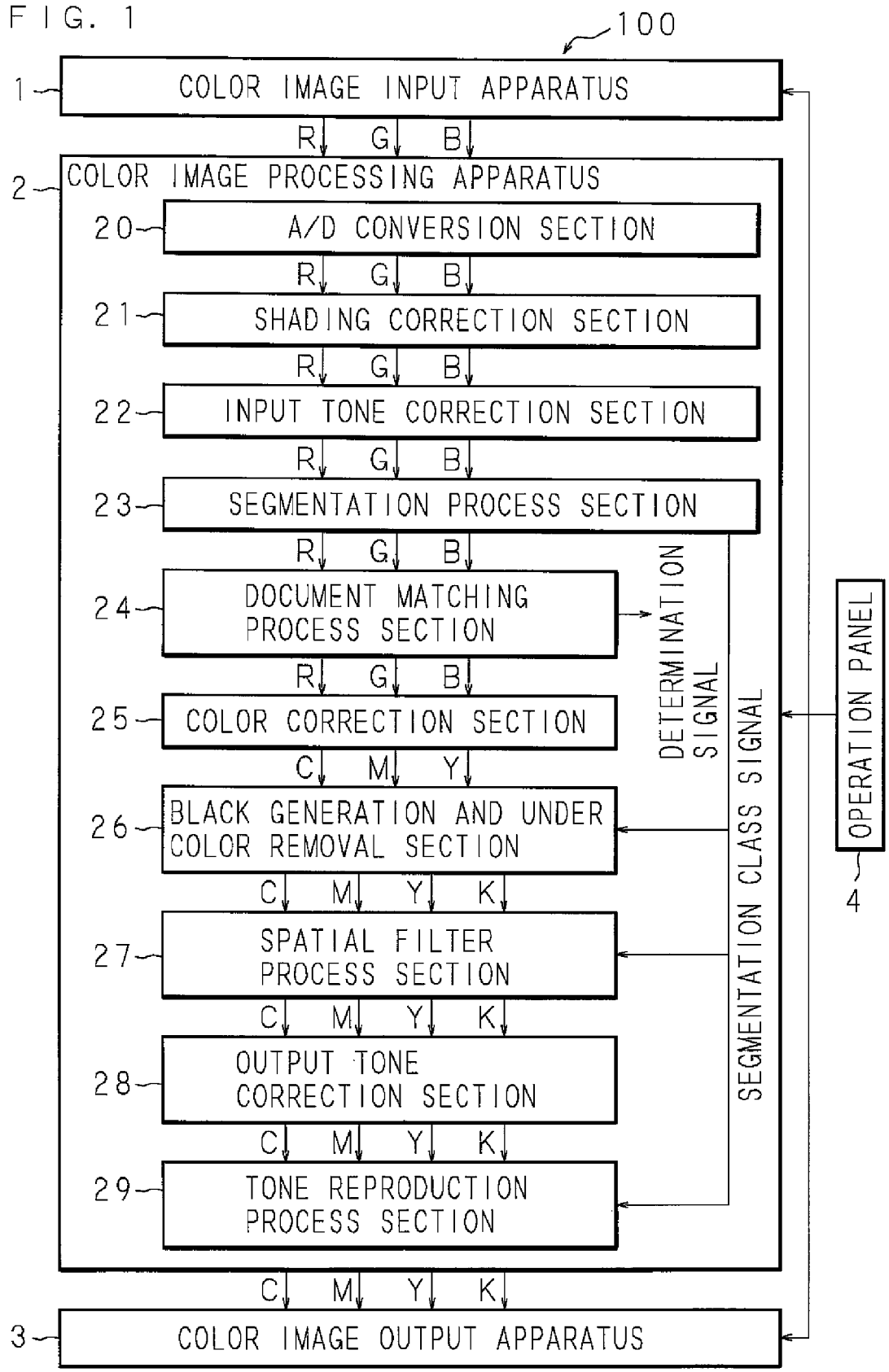
FIG. 1 is a block diagram showing a configuration of an image forming apparatus employing an image processing apparatus according to the present invention.

FIG. 1 is a block diagram showing the configuration of an image forming apparatus 100 employing an image processing apparatus according to the present invention. The image forming apparatus 100 (e.g., a digital color copying machine or a multi-function peripheral provided with combined functions such as a printer function and a facsimile and e-mail distribution function) includes a color image input apparatus 1, a color image processing apparatus 2 (an image processing apparatus), a color image output apparatus 3, and an operation panel 4 for various kinds of operation. Image data of analog signals of RGB (R: red, G: green, B: blue) obtained when the color image input apparatus 1 reads a document is outputted to the color image processing apparatus 2, then processed by predetermined processing in the color image processing apparatus 2, and then outputted to the color image output apparatus 3 as digital color signals of CMYK (C: cyan, M: magenta, Y: yellow, K: black).

The color image input apparatus 1 is, for example, a scanner provided with a CCD (Charged Coupled Device). The color image input apparatus 1 reads a reflected light image from the document image in the form of analog signals of RGB, and then outputs the read RGB signals to the color image processing apparatus 2. Further, the color image output apparatus 3 is an image forming apparatus employing an electrophotography method or an inkjet method for outputting the image data of the document image onto a record paper sheet. Further, the color image output apparatus 3 may be a display unit such as a display.

The color image processing apparatus 2 is constructed from an A/D conversion section 20, a shading correction section 21, an input tone correction section 22, a segmentation process section 23, a document matching process section 24, a color correction section 25, a black generation and under color removal section 26, a spatial filter process section 27, an output tone correction section 28, a tone reproduction process section 29, a CPU (Central Processing Unit) controlling operations of these hardware sections, an ASIC (Application Specific Integrated Circuit), and the like.

The A/D conversion section 20 converts the RGB signals inputted from the color image input apparatus 1 into, for example, 10-bit digital signals, and then outputs the converted RGB signals to the shading correction section 21. The shading correction section 21 performs correction processing in which various kinds of distortion generated in the illumination system, the image focusing system, and the image sensing system of the color image input apparatus 1 is removed from the inputted RGB signals, and then outputs the converted RGB signals (image) to the input tone correction section 22.

The input tone correction section 22 performs the processing of adjusting the color balance on the RGB signals after removing various kinds of distortion and performs the processing of converting the signals into those such as a density signal easily treated by the image processing system adopted in the color image processing apparatus 2. Further, the input tone correction section 22 performs image quality adjustment processing such as page background density removing or contrast, and then outputs the processed RGB signals to the segmentation process section 23.

On the basis of the inputted RGB signals, the segmentation process section 23 separates respective pixels of the inputted image into a text component, a halftone component, and a photograph component. On the basis of the segmentation result, the segmentation process section 23 outputs a segmentation class signal indicating that each pixel belongs to which segment, to the black generation and under color removal section 26, the spatial filter process section 27, and the tone reproduction process section 29. Further, the segmentation process section 23 outputs the inputted RGB signals intact to the document matching process section 24 of the subsequent stage.

The document matching process section 24 binarizes the inputted image (document image), then calculates feature points (e.g., the centroid) of a connected component specified on the basis of the binary image, then selects a plurality of feature points from among the calculated feature points, then calculates an invariant on the basis of the selected feature points, and then calculates features (e.g., a hash value) serving as an invariant. In a document storing mode in which a document is to be stored, the document matching process section 24 stores the inputted image as a reference image on the basis of the calculated features. Further, when the document images are to be classified and at the same time it is to be detected whether the order of individual document images is correct, the document matching process section 24 judges whether each document image is similar to a reference image on the basis of the calculated features. Then, on the basis of the judgment result, the document matching process section 24 classifies the document images for each document type, and then determines whether the order of the document images contained in each document type corresponds with the order of the reference images. Thus, the document type to which the document image belongs can be determined and, at the same time, in the determined document type, determination can be performed for the presence or absence of page omission in the document images, the presence or absence of order substitution in the document images, the presence or absence of stacked feed of document images, and the like.

When the order of the inputted document images differs from the order of the reference images such as when page omission is present in a part of document images and when order of document images is substituted, at the time when processing to all the document images by the document matching process section 24 has been completed, the image forming apparatus 100 displays on the operation panel 4 the position (an error occurrence position or a document division restarting position) where the order of the document images differs from the order of the reference images, so as to notify the user. Further, the document matching process section 24 outputs the inputted RGB signals intact to the color correction section 25 of the subsequent stage.

In place of the above-mentioned configuration that the document matching process section 24 is provided in the subsequent stage of the segmentation processing section 23, the document matching process section 24 may be provided in parallel to the input tone correction section 22, or alternatively between the shading correction section 21 and the input tone correction section 22. Here, in this case, the processing of adjusting color balance and the processing of converting the data into a density signal are performed by the shading correction section 21.

The color correction section 25 converts the inputted RGB signals into the color space of CMY, then performs color correction in accordance with the characteristics of the color image output apparatus 3, and then outputs the corrected CMY signals to the black generation and under color removal section 26. Specifically, for the purpose of high fidelity in color reproduction, the color correction section 25 performs the processing of removing color impurity on the basis of the spectral characteristics of the CMY color materials containing unnecessary absorption components.

On the basis of the CMY signals inputted from the color correction section 25, the black generation and under color removal section 26 generates a K (black) signal and, at the same time, subtracts the K signal from the inputted CMY signals so as to generate new CMY signals, and then outputs the generated CMYK signals to the spatial filter process section 27. An example of processing in the black generation and under color removal section 26 is described below. For example, in the case of processing of black generation by using skeleton black, the input-output characteristics of the skeleton curve is expressed by $y=f(x)$, input data is denoted by C, M, and Y, output data is denoted by C', M', Y', and K', and the UCR (Under Color Removal) ratio is denoted by $\alpha$ ($0<\alpha<1$). Then, data outputted in the black generation and under color removal process is expressed by $K'=f\{\min(C,M,Y)\}$, $C'=C-\alpha K'$, $M'=M-\alpha K'$, and $Y'=Y-\alpha K'$.

The spatial filter process section 27 performs spatial filtering by means of a digital filter based on the segmentation class signal, onto the CMYK signals inputted from the black generation and under color removal section 26. By virtue of this, the spatial frequency characteristics of the image data is corrected so that blur occurrence or graininess degradation is prevented in the output image in the color image output apparatus 3. For example, in order to improve the reproducibility of, especially, black characters (texts) or color characters, the spatial filter process section 27 performs edge enhancement processing so as to emphasize high frequency components for the segment separated into a text component by the segmentation process section 23. Further, the spatial filter process section 27 performs low pass filtering for removing the input halftone components, onto the segment separated into a halftone component by the segmentation process section 23. The spatial filter process section 27 outputs the processed CMYK signals to the output tone correction section 28.

The output tone correction section 28 performs output tone correction process of converting the CMYK signals inputted from the spatial filter process section 27 into a halftone screen area ratio which is a characteristic value of the color image output apparatus 3. Then, the output tone correction section 28 outputs the CMYK signals having undergone the output tone correction process to the tone reproduction process section 29.

On the basis of the segmentation class signal inputted from the segmentation process section 23, the tone reproduction process section 29 performs predetermined processing on the CMYK signals inputted from the output tone correction section 28. For example, in order to improve the reproducibility of, especially, black characters or color characters, the tone reproduction process section 29 performs binarization process or multi-level dithering process on the segment separated into a text component, such that the signals should become appropriate for the reproduction of high frequency components in the color image output apparatus 3. Further, the tone reproduction process section 29 performs tone reproduction process (halftone generation) on the segment separated into a halftone component by the segmentation process section 23, such that the image is finally separated into pixels so that each tone can be reproduced. Further, the tone reproduction process section 29 performs binarization processing or multi-level dithering processing on the segment separated into a photograph component by the segmentation process section 23, such that the signals should become appropriate for the tone reproduction in the color image output apparatus 3.

The color image processing apparatus 2 temporarily stores into a storage section (not shown) the image data (CMYK signals) processed by the tone reproduction process section 29. Then, in a predetermined timing of performing image formation, the color image processing apparatus 2 reads the image data stored in the storage section, and then outputs the read image data to the color image output apparatus 3. Control for these is performed, for example, by a CPU (not shown).

The operation panel 4 is constructed from a display section such as a liquid crystal display, setting buttons and the like. The operations of the color image input apparatus 1, the color image processing apparatus 2 and the color image output apparatus 3 are controlled on the basis of information inputted from the operation panel 4 (for example designation of document storing mode for storing documents, optional selection of output processing such as filing, copying, electronic distribution or the like with respect to document image in each classified document, and the like).

Figure 2:
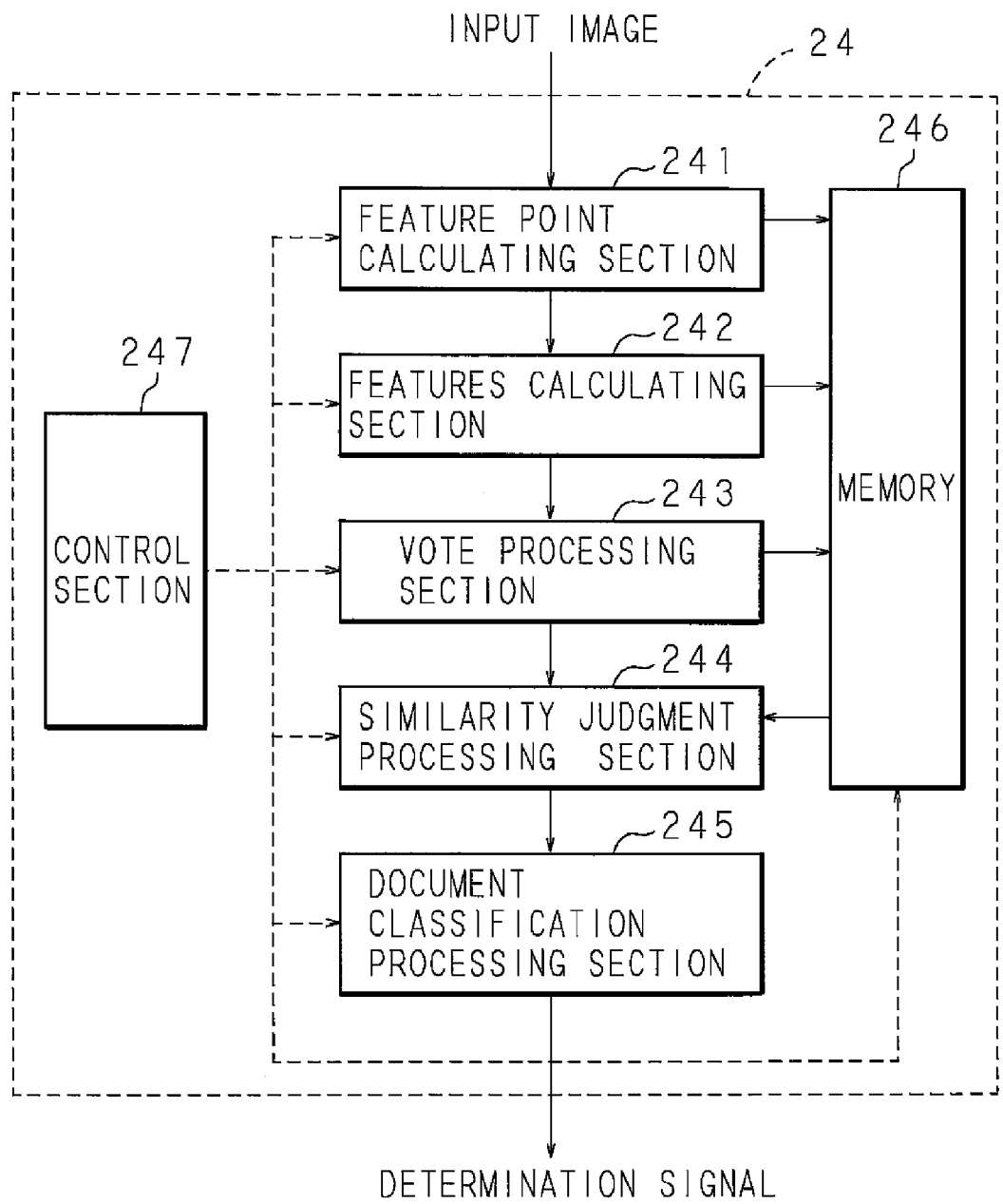
FIG. 2 is a block diagram showing a configuration of a document matching process section.

FIG. 2 is a block diagram showing the configuration of the document matching process section 24. The document matching process section 24 includes a feature point calculating section 241, a features calculating section 242, a vote processing section 243, a similarity judgment processing section 244, a document classification processing section 245, a memory 246, and a control section 247 for controlling these sections.

The feature point calculating section 241 performs later-described predetermined processing on the inputted image, and binarizes the inputted image, extracts (calculates) a feature point (e.g., a value obtained by accumulating the coordinate values of the respective pixels constituting a connected component in the binary image and by dividing the accumulated coordinate values with the number of pixels contained in the connected component) of the connected component specified on the basis of the binary image. The feature point calculating section 241 lets the memory 246 store the extracted feature point and outputs the extracted feature point to the features calculating section 242.

Figure 3:
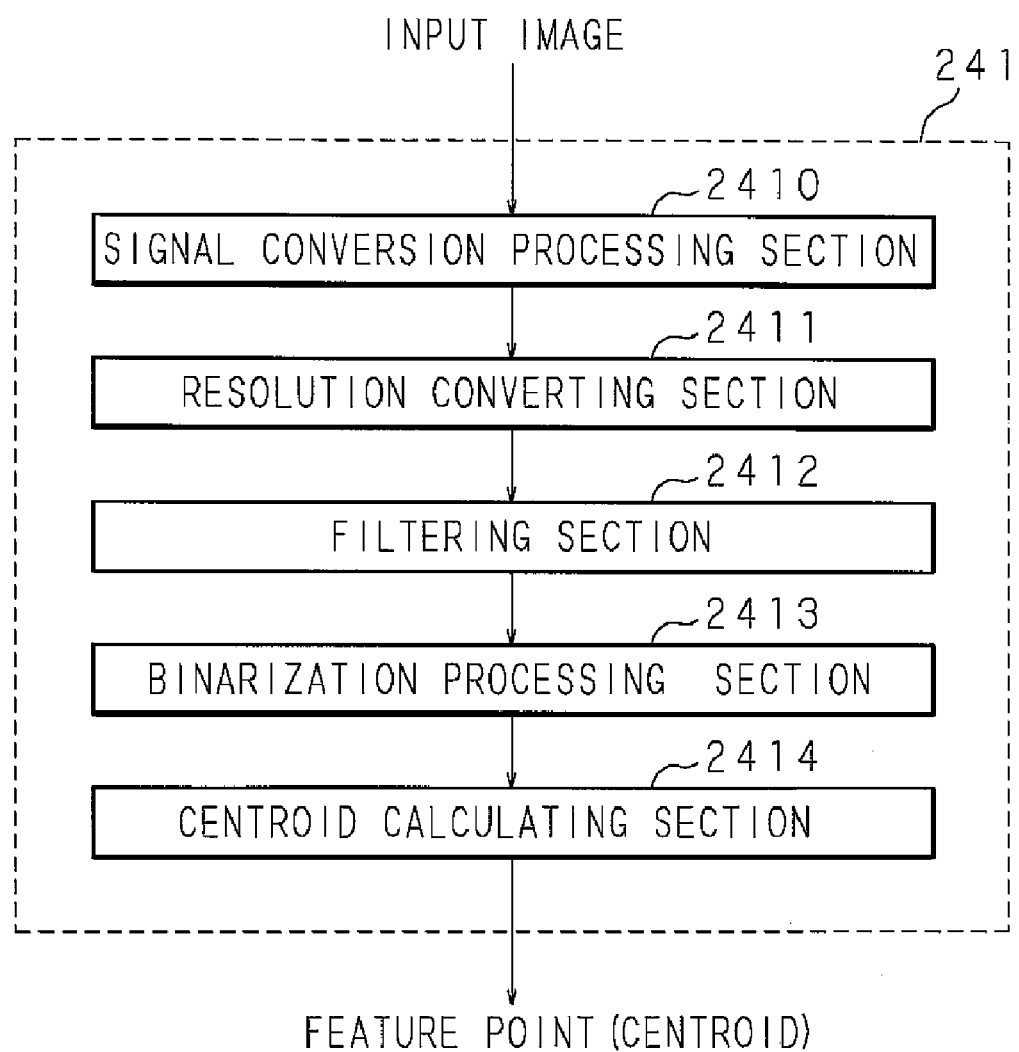
FIG. 3 is a block diagram showing a configuration of a feature point calculating section.

FIG. 3 is a block diagram showing the configuration of the feature point calculating section 241. The feature point calculating section 241 includes a signal conversion processing section 2410, a resolution converting section 2411, a filtering section 2412, a binarization processing section 2413, and a centroid calculating section 2414.

When the inputted image is a color image, the signal conversion processing section 2410 achromatizes and converts the color image into a luminance signal or a lightness signal, and then outputs the converted image to the resolution converting section 2411. For example, when the color components RGB of each pixel is denoted respectively by Rj, Gj, and Bj, the luminance signal Yj is expressed by Yj=0.30×Rj+0.59×Gj+0.11×Bj. Here, the present invention is not limited to this formula. That is, the RGB signals may be converted into CIE1976 L*a*b* signals.

Even when the inputted image is one having undergone optical magnification change in the color image input apparatus 1, the resolution converting section 2411 performs magnification change on the inputted image again such as to realize a predetermined resolution, and then outputs to the filtering section 2412 the image having undergone the magnification change. By virtue of this, even when magnification change processing has been performed by the color image input apparatus 1 so that the resolution has varied, extraction of a feature point is achieved free from its influence. This permits accurate classification of the document. In particular, in the case of size-reduced characters, a possibility is avoided that when a connected component is to be specified by binarization processing, blotted characters cause intrinsically separated regions to be specified as if they are connected to each other so that the calculated centroid may deviate. Further, the resolution converting section 2411 converts the image into that of a resolution smaller than the resolution obtained when the image is read by the color image input apparatus 1 with unity magnification. For example, an image read at 600 dpi (dot per inch) by the color image input apparatus 1 is converted into that of 300 dpi. This reduces the amount of processing in the subsequent stage.

The filtering section 2412 corrects the spatial frequency characteristics of the inputted image (e.g., enhancement processing and smoothing of the image), and then outputs the corrected image to the binarization processing section 2413. Since the spatial frequency characteristics of the color image input apparatus 1 is different depending on each model, the filtering section 2412 corrects the different spatial frequency characteristics into required characteristics. In the image (e.g., image signal) outputted from the color image input apparatus 1, degradation such as blurring in the image is caused by, for example: optical system components such as lenses and mirrors; the aperture ratio, the transfer efficiency, and the after-image of the light acceptance surface of CCD; and the storage effect and the scanning unevenness caused by the physical scan. The filtering section 2412 performs enhancement processing on the boundary or the edges so as to restore degradation such as blurring generated in the image. Further, the filtering section 2412 performs smoothing for suppressing high frequency components which are unnecessary in the feature point extracting processing performed in the subsequent stage. This permits accurate extraction of a feature point, and hence achieves accurate determination of the similarity of the image. Here, the filter coefficient used in the filtering section 2412 may be set up appropriately in accordance with the model, the characteristics, or the like of the employed color image input apparatus 1.

FIG. 4 is an explanation diagram showing an example of the filter coefficient of the filtering section 2412. As shown in the figure, the spatial filter is, for example, a mixing filter that has a size of 7×7 (seven rows by seven columns) and that performs enhancement processing and smoothing processing. The pixels of the inputted image are scanned so that arithmetic processing by the spatial filter is performed on all the pixels. Here, the size of the spatial filter is not limited to the size of 7×7. That is, the size may be 3×3, 5×5, or the like. Further, the numerical value of the filter coefficient is an example. That is, the actual value is not limited to this example, and may be set up appropriately in accordance with the model, the characteristics, or the like of the employed color image input apparatus 1.

The binarization processing section 2413 compares with a threshold value the luminance value (the luminance signal) or the lightness value (the lightness signal) of the inputted image so as to binarize the image, and then outputs to the centroid calculating section 2414 the binary image having undergone the binarization. On the basis of the binarization information (e.g., expressed by "1" and "0") of each pixel of the binary image inputted from the binarization processing section 2413, the centroid calculating section 2414 performs labeling (label attaching processing) on each pixel. Then, the centroid calculating section 2414 specifies a connected component where pixels having the same label are in succession, then extracts as a feature point the centroid of the specified connected component. The centroid calculating section 2414 lets the memory 246 store the extracted feature point and outputs the extracted feature point to the features calculating section 242. Here, the feature point is expressed by the coordinates (x-coordinate, y-coordinate) in the binary image.

Figure 6:
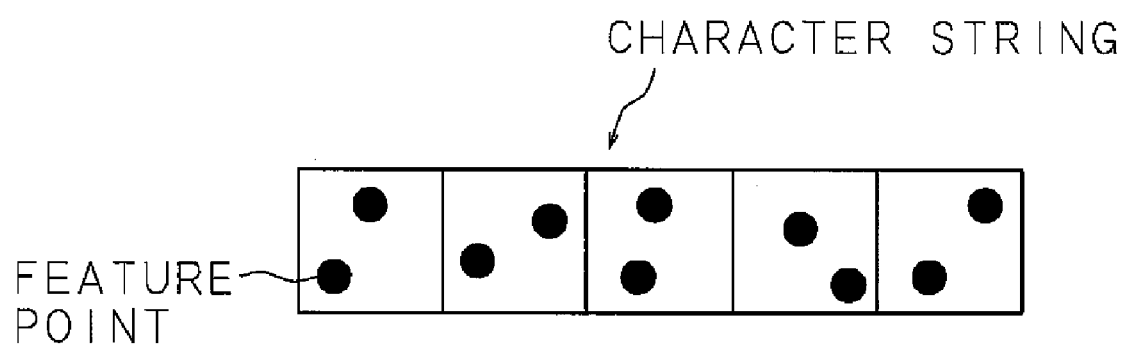
FIG. 6 is an explanation diagram showing an example of a result of extraction of a feature point for a character string.

FIG. 5 is an explanation diagram showing an example of a feature point of a connected component. In the figure, the specified connected component is a character "A", and is specified as a set of pixels to which the same label is imparted. A feature point (centroid) of this character "A" is located at a position (x-coordinate, y-coordinate) indicated by a black dot in the figure. FIG. 6 is an explanation diagram showing an example of a result of extraction of a feature point for a character string. In the case of a character string composed of a plurality of characters, a plurality of feature points are extracted that have different coordinates depending on the kinds of characters.

The features calculating section 242 adopts, as a current feature point, each feature point (that is, coordinate values of the centroid of the connected component) inputted from the feature point calculating section 241, and then extracts, for example, surrounding four feature points having smaller distances from the current feature point.

Figure 7:
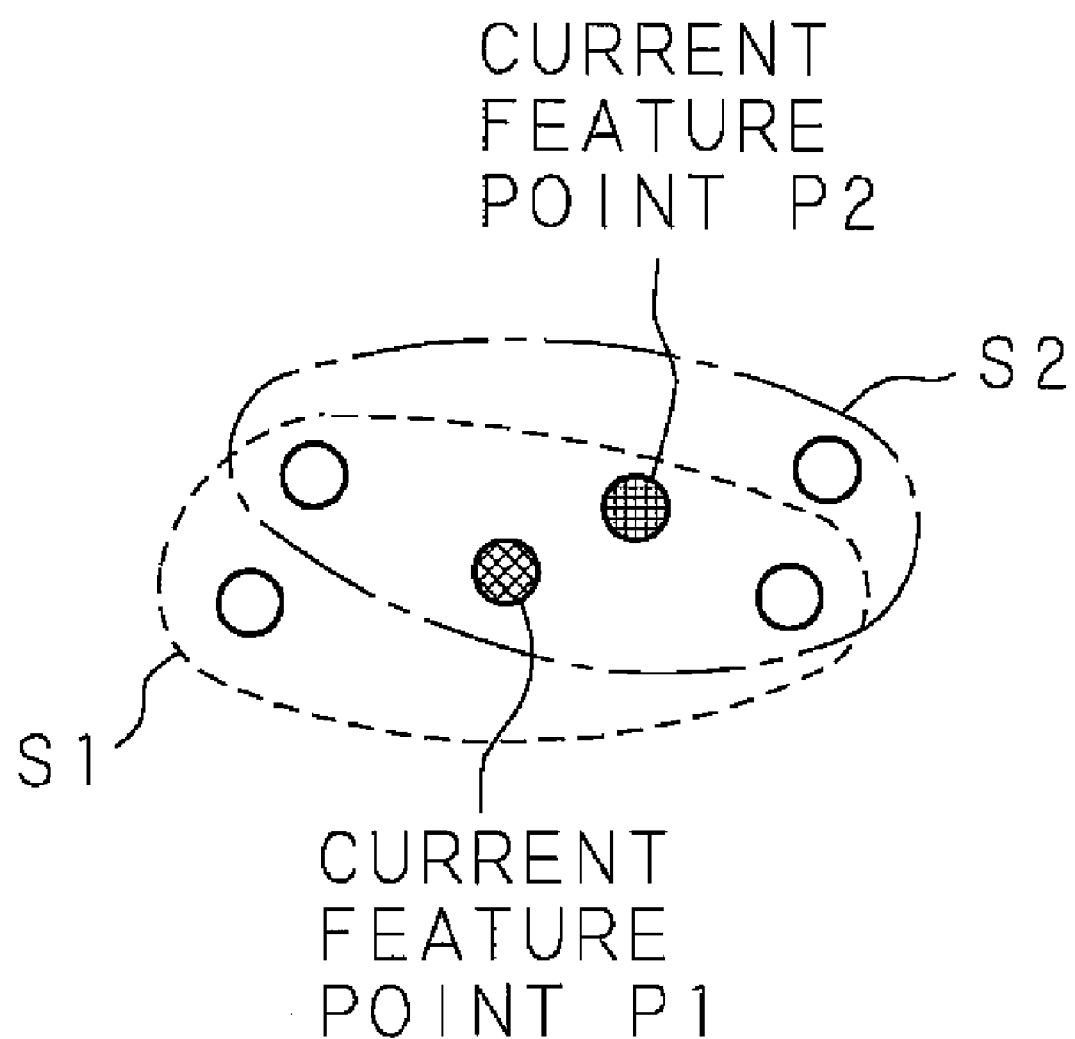
FIG. 7 is an explanation diagram showing the current feature point and the surrounding feature point.

FIG. 7 is an explanation diagram showing current feature points and surrounding feature points. As shown in the figure, for example, four feature points surrounded by a closed curve S1 are extracted for a current feature point P1 (for the current feature point P1, a current feature point P2 also is extracted as one feature point). Further, for the current feature point P2, for example, four feature points surrounded by a closed curve S2 are extracted (for the current feature point P2, the current feature point P1 also is extracted as one feature point).

The features calculating section 242 selects three feature points from the four extracted feature points so as to calculate an invariant. Here, the number of selected feature points is not limited to three. That is, four, five, or the like feature points may be selected. The number of feature points to be selected differs according to the kind of desired invariant. For example, an invariant calculated from three points is a similarity invariant (invariable parameter with respect to geometric change including rotation, parallel movement and expansion/reduction).

FIG. 8 is an explanatory diagram showing an example of calculation of an invariant with respect to a current feature point P1. FIG. 9 is an explanation diagram showing an example of calculation of an invariant with respect to the current feature point P2. As shown in FIG. 8, three feature points are selected from the four feature points surrounding the current feature point P1. Then, three kinds of invariants are denoted respectively by H$1j$ (j=1, 2, 3). Each invariant H$1j$ is calculated by a formula expressed by H$1j$=A$1j$/B$1j$. Here, each of A$1j$ and B$1j$ indicates the distance between feature points, and the distance is calculated on the basis of the coordinates of respective feature points. Thus, for example, even when the document is rotated, moved, or inclined, the invariant H$1j$ does not vary. Accordingly, determination of the similarity of the image is achieved with satisfactory accuracy, and hence a similar document can be determined with satisfactory accuracy.

Similarly, as shown in FIG. 9, three feature points are selected from the four feature points surrounding the current feature point P2. Then, three kinds of invariants are denoted respectively by H$2j$ (j=1, 2, 3). Each invariant H$2j$ is calculated by a formula expressed by H$2j$=A$2j$/B$2j$. Here, each of A$2j$ and B$2j$ indicates the distance between feature points, and the distance is calculated on the basis of the coordinates of respective feature points, as the same described. In accordance with a similar procedure, invariants can be calculated for the other current feature points.

On the basis of the invariants calculated for each current feature point, the features calculating section 242 calculates a hash value (features) Hi. The hash value of the current feature point Pi is expressed by Hi=(Hi$1 \times 10^2$+Hi$2 \times 10^1$+Hi$3 \times 10^0$)/E. Here, E is a constant determined by how large remainder is expected. For example, when the constant is set to be "10", the remainder falls between "0" and "9". This gives the range that can be taken by the calculated hash value. Further, i is a natural number, and i indicates the number of feature points.

The method of calculating invariants for current feature points is not limited to the above-mentioned method. FIG. 10 is an explanatory diagram showing another example of calculation of an invariant with respect to a current feature point P3. FIG. 11 is an explanation diagram showing another example of calculation of an invariant with respect to a current feature point P4. As shown in FIG. 10, three feature points are selected from the four feature points surrounding the current feature point P3, and four kinds of invariants are denoted respectively by H$3j$ (=1, 2, 3, 4). The invariant H$3j$ may be calculated by H$3j$=A$3j$/B$3j$ similarly to the above-mentioned method.

As shown in FIG. 11, three feature points are selected from the four feature points surrounding the current feature point P4, and four kinds of invariants are denoted respectively by H$4j$ (j=1, 2, 3, 4). The invariant H$4j$ may be calculated by H$4j$=A$4j$/B$4j$. In this case, the hash value Hi of a current feature point Pi is calculated by Hi=(Hi$1 \times 10^3$+Hi$2 \times 10^2$+Hi$3 \times 10^1$+Hi$4 \times 10^0$)/E.

Here, the above-mentioned hash value serving as features is an example, and is not limited to this. Another hash function may be employed. The above-mentioned example has been described for the case that four points are extracted as other surrounding feature points. However, the number of points is not limited to four. For example, six points may be extracted. In this case, five points may be extracted from the six feature points. Then, for each of the six kinds of methods of extracting five points, invariants may be calculated by extracting three points from the five points, so that a hash value may be calculated.

For example, when the images of a document consisting of a plurality of pages are to be stored (in the case of a document storing mode), the features calculating section 242 sets up document page indices (e.g., ID1, ID2, . . . ) of the reference images for individual images contained in the document. Each document page index is used for identifying each reference image, and identifies each document page constituting a document. In the case of a document storing mode, the features calculating section 242 sets up a document type index (e.g., DocID1, DocID2, . . . ) for each document. Each document type index corresponds to what identifies each sub-document (the type of a document) composed of a plurality of pages, and identifies a classification unit used when a large number of documents are classified document by document. In the case of a document storing mode, the features calculating section 242 stores the hash values (e.g., H1, H2, . . . ) calculated in the above-mentioned processing and the set-up document page indices into the hash table for each reference image.

FIGS. 12A and 12B are explanation diagrams showing the structure of the hash table 2461. As shown in FIG. 12A, the structure of the hash table 2461 is constructed from individual fields consisting of the hash value and the document page index. More specifically, in correspondence to a document page index, a point index which indicates a position in the document and an invariant (both are not shown) are stored. For the purpose of judgment of similarity of the image, matching information for the image, document image, or the like to be matched is stored into the hash table 2461 in advance. The hash table 2461 is stored in the memory 246. Here, as shown in FIG. 12B, when hash values are equal to each other (H1=H5), the two entries in the hash table 2461 may be unified.

Figures 13A, 13B:
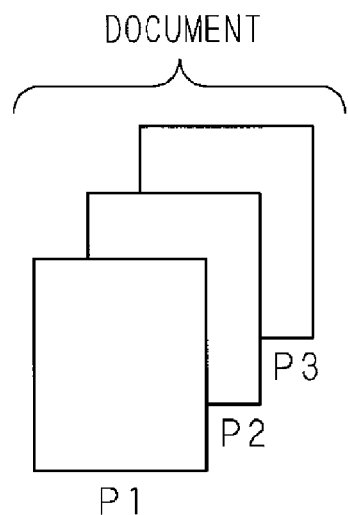
FIGS. 13A and 13B are explanation diagrams showing an example of a case that document images are to be registered.

FIGS. 13A and 13B are explanation diagrams showing an example of a case that document images are to be stored. As shown in FIG. 13A, when a document of three pages (P1, P2, P3) is to be stored, as shown in FIG. 13B, the features calculating section 242 sets up document page indices ID1, ID2, and ID3 respectively in the page order for the images (P1, P2, P3) of three pages, and then calculates hash values (e.g., H1, H2, . . . ) for the individual images having document page indices ID1, ID2, and ID3, respectively. The features calculating section 242 sets up a head flag which indicates whether each image is the first page of the document and an end flag which indicates whether each image is the last page of the document. Here, when each image is the first page of the document, the features calculating section 242 sets the corresponding head flag to be 1. Further, when each image is the last page of the document, the features calculating section 242 sets the corresponding end flag to be 1. When each image is a page other than these, the features calculating section 242 sets the corresponding head flag and the corresponding end flag to be 0.

The features calculating section 242 sets up a document type index DocID1 for identifying the entirety of the document of three pages (the type of a document). At the same time, the features calculating section 242 sets the number of document page indices having been set up for individual images in the page order, into the number of reference pages ("3" in this case). The features calculating section 242 stores the document page index, the head flag, the end flag, and the document type index into a document image table described later. Further, the features calculating section 242 stores the document type index and the number of reference pages into a document classification table described later.

FIG. 14 is an explanation diagram showing an example of a document to be stored. The following description is given for a case that two types of documents are to be stored as shown in FIG. 14. A document type index DocID1 is set up for a document consisting of reference images of three pages. Then, document page indices ID1, ID2, and ID3 are set up for these pages. Similarly, a document type index DocID2 is set up for a document consisting of reference images of two pages. Then, document page indices ID4 and ID5 are set up for these pages.

FIG. 15A is an explanation diagram showing a structure of a document image table 2462, and FIG. 15B is an explanation diagram showing a structure of a document classification table 2463. The document image table 2462 is constructed from individual fields consisting of the document page index, the head flag, the end flag, and the document type index. The document classification table 2463 is constructed from individual fields consisting of the document type index and the number of reference pages. In a document storing mode, the document image table 2462 and the document classification table 2463 are updated at each time when a document is stored. FIGS. 15A and 15B show the document image table 2462 and the document classification table 2463 in the case that the two types of documents shown in FIG. 14 are to be stored.

That is, according to the document image table 2462, the reference image identified by document page index ID1 is contained in a document identified by document type index DocID1, and is the first page of this document. The reference image identified by document page index ID2 is contained in the document identified by document type index DocID1, and is neither the first page nor the last page of this document. The reference image identified by document page index ID3 is contained in the document identified by document type index DocID1, and is the last page of this document. Further, according to the document classification table 2463, the number of reference pages of the document identified by document type index DocID1 is "3".

Similarly, according to the document image table 2462, the reference image identified by document page index ID4 is contained in a document identified by document type index DocID2, and is the first page of this document. The reference image identified by document page index ID5 is contained in the document identified by document type index DocID2, and is the last page of this document. Further, according to the document classification table 2463, the number of reference pages of the document identified by document type index DocID2 is "2".

When the document matching process section 24 classifies the inputted document images for each document type and then determines whether the order of the document images contained in each document type corresponds with the order of the reference images, in a case that it is to be judged whether each document image is similar to a reference image stored in advance, the features calculating section 242 stores into the memory 246 the calculated hash values of the individual document images.

On the basis of the hash value (features) calculated by the features calculating section 242, the vote processing section 243 searches the hash table 2461 stored in the memory 246. When the hash value corresponds, the vote processing section 243 votes for the document page index stored at the hash value (that is, the image in which the hash value corresponds). The result obtained by accumulating the votes is outputted as the number of obtained votes to the similarity judgment processing section 244.

On the basis of the voting result inputted from the vote processing section 243, the similarity judgment processing section 244 judges whether the read document image is similar to any reference image, and then outputs the judgment result to the document classification processing section 245. More specifically, the similarity judgment processing section 244 divides the number of obtained votes inputted from the vote processing section 243 by the greatest number of obtained votes of the document image (expressed by the number of feature points×the number of hash values calculated from one feature point), so as to calculate a normalized similarity. Then, the similarity judgment processing section 244 compares the calculated similarity with a threshold value Th (e.g., 0.8) determined in advance. When the similarity is greater than or equal to the threshold value Th, the judgment determination processing section 244 judges that the document image is similar to the reference image in which the similarity has been calculated. When the similarity is smaller than the threshold value Th, the similarity judgment processing section 244 concludes the absence of a reference image similar to the document image, and then outputs the judgment result (document page index when the images are similar) to the document classification processing section 245. Here, the number of obtained votes inputted from the vote processing section 243 may be compared with a threshold value defined in advance. Then, when the number of obtained votes is greater than or equal to the threshold value, it may be judged that the document image is similar to a reference image stored in advance, and further it may be judged that a reference image having the greatest number of obtained votes among the reference images judged as being similar corresponds with the document image.

Figure 16:
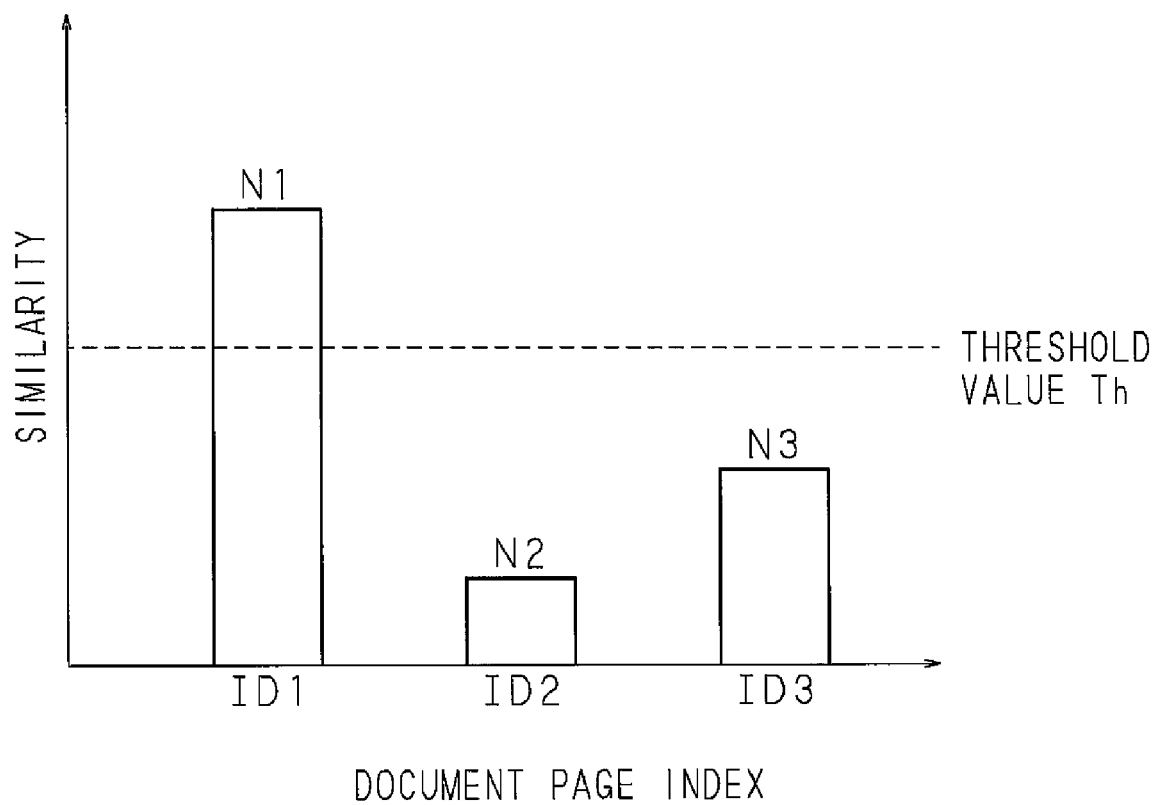
FIG. 16 is an explanation diagram showing an example of similarity judgment based on a voting result.

FIG. 16 is an explanation diagram showing an example of similarity judgment based on a voting result. As shown in FIG. 13B, the hash table 2462 is searched and vote is performed for each hash value calculated from the document image. Then, it is assumed that as a result, vote has been performed for the reference images in which the document page indices are ID1, ID2, and ID3. Then, each number of obtained votes obtained as a result of the voting is divided by the greatest number of obtained votes of the document image, so that normalized similarities N1, N2, and N3 are calculated. The reference image having a calculated similarity greater than or equal to the threshold value Th is that has the document page index ID1. Thus, the document image is judged as being similar to the reference image having the document page index ID1.

The document classification processing section 245 has: an overall counter TC which indicates the head flag, the end flag, the number of reference pages corresponding to the page (document image) under processing, as well as the number of pages of the read document images; a page counter PC which indicates the page number of the document image in each divided document type; an error flag which indicates error occurrence; and a storage section for an error occurrence position which indicates the page number where the error has occurred. Before the processing, the overall counter TC, the page counter PC, the error flag, and the error occurrence position are all initialized into "0". Here, when an error occurs, the document classification processing section 245 sets the error flag to be 1.

When a reference image is similar to the document image, that is, when a document page index is inputted as a judgment result from the similarity judgment processing section 244, the document classification processing section 245 searches the document image table 2462 on the basis of the document page index, so as to identify the head flag, the end flag, and the document type index of the document page index. Further, the document classification processing section 245 searches the document classification table 2463 on the basis of the identified document type index, so as to identify the number of reference pages corresponding to the document type index, and then sets the head flag, the end flag, and the number of reference pages having been identified into the head flag, the end flag, and the number of reference pages corresponding to the document image under processing.

Here, when a judgment result which indicates the absence of a reference image similar to the document image is inputted from the similarity judgment processing section 244, the document classification processing section 245 sets the head flag, the end flag, and the number of reference pages to be 1. Further, at each time when a judgment result is obtained from the similarity judgment processing section 244, the document classification processing section 245 adds one to the overall counter TC.

When it is judged for the first time that the document image is similar to a reference image, the document classification processing section 245 determines whether the set-up head flag is 1. When the head flag is not 1, that is, when a reference image to which a document image is judged as being similar for the first time is not the first document sheet of the document type which contains this reference image, the document classification processing section 245 concludes error occurrence so as to set the error flag to be 1 and set the page number indicated by the overall counter TC into the error occurrence position value.

When the head flag is 1, that is, when a reference image to which a document image is judged as being similar for the first time is the first document sheet of the document type which contains this reference image, the document classification processing section 245 sets the value in the page counter PC to be 1. Then, the document classification processing section 245 determines whether the set-up end flag is 1. When the end flag is 1, the document classification processing section 245 determines whether the value in the page counter PC corresponds with the number of reference pages. In case that the end flag is 1, when the page counter PC does not correspond with the number of reference pages, that is, in a case where despite that the reference image to which the document image is similar is the last document sheet in the document type, the number of document images (the value in the page counter PC) having been counted up by the time when this document image is judged as being similar to the reference image does not correspond with the number of reference images (the number of reference pages) contained in the document type, the document classification processing section 245 concludes error occurrence so as to set the error flag to be 1 and set the page number indicated by the overall counter TC into the error occurrence position value.

In case that the end flag is 1, when the value in the page counter PC corresponds with the number of reference pages, the number of document images having been counted up by the time when the document image is judged as being similar to the reference image corresponds with the number of reference images contained in the document type. Thus, the document classification processing section 245 concludes that the order of the document images corresponds with the order of reference images contained in the document type stored in advance. Thus, in this case, the document classification processing section 245 concludes that this document image is the last document image contained in the present document type, and hence determines a document dividing position to be located between the present document image and the document image to be processed next.

Further, when the head flag is 1, the document classification processing section 245 determines whether the error flag is 1. When the error flag is 1, the document classification processing section 245 records the value of the error occurrence position into a recorder (not shown), and then concludes that the document image processed before this document image is the last document image contained in the preceding document type, so as to determine a document dividing position to be located between the document image processed before and the present document image. Here, the information which indicates the determined document dividing position is outputted together with the occurrence position of the error as a determination signal and then stored into the recorder. The recorder for recording the determination signal may be provided in the inside or the outside of the color image processing apparatus 2. When the recorder is a non-volatile memory, the position of the detected error can be saved.

Further, when the document classification processing section 245 has completed the above-mentioned processing for all the document images, the image forming apparatus 100 can display onto the operation panel 4 the error occurrence position recorded in the recorder, so as to notify the user that the order of the document inputted through the color image input apparatus 1 is different from the order of the document stored in advance, together with the difference position. The above-mentioned determination signal may be transmitted, for example, together with the document image, to a printer or a multi-function peripheral via a network, and may be outputted to a printer directly or via a computer.

Thus, without the necessity of special operation by a user, inputted document images can easily be classified in accordance with an order of a document stored in advance. At the same time, it can be determined whether the order of document images corresponds with the order of a document stored in advance. Further, even when a large number of document images are inputted, the document images can easily be partitioned and document separations to be classified can be detected and divided. Further, it can be determined whether each classified document corresponds with the order of a document stored in advance. Furthermore, when the order of the inputted document images differs from the order of a document stored in advance, the user can be notified of the situation.

Figure 17:
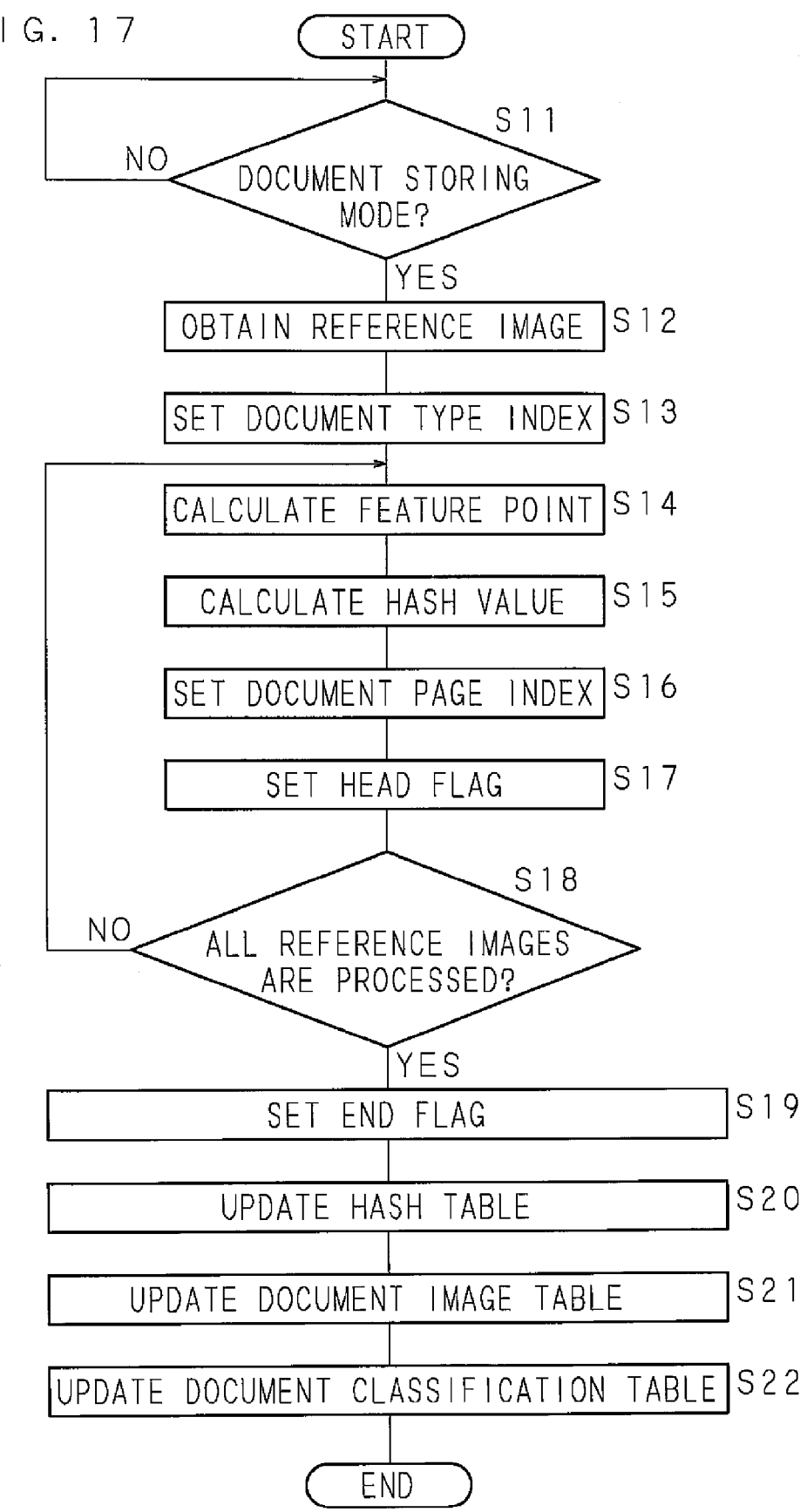
FIG. 17 is a flow chart showing a procedure of document storage processing.
Figure 18A:
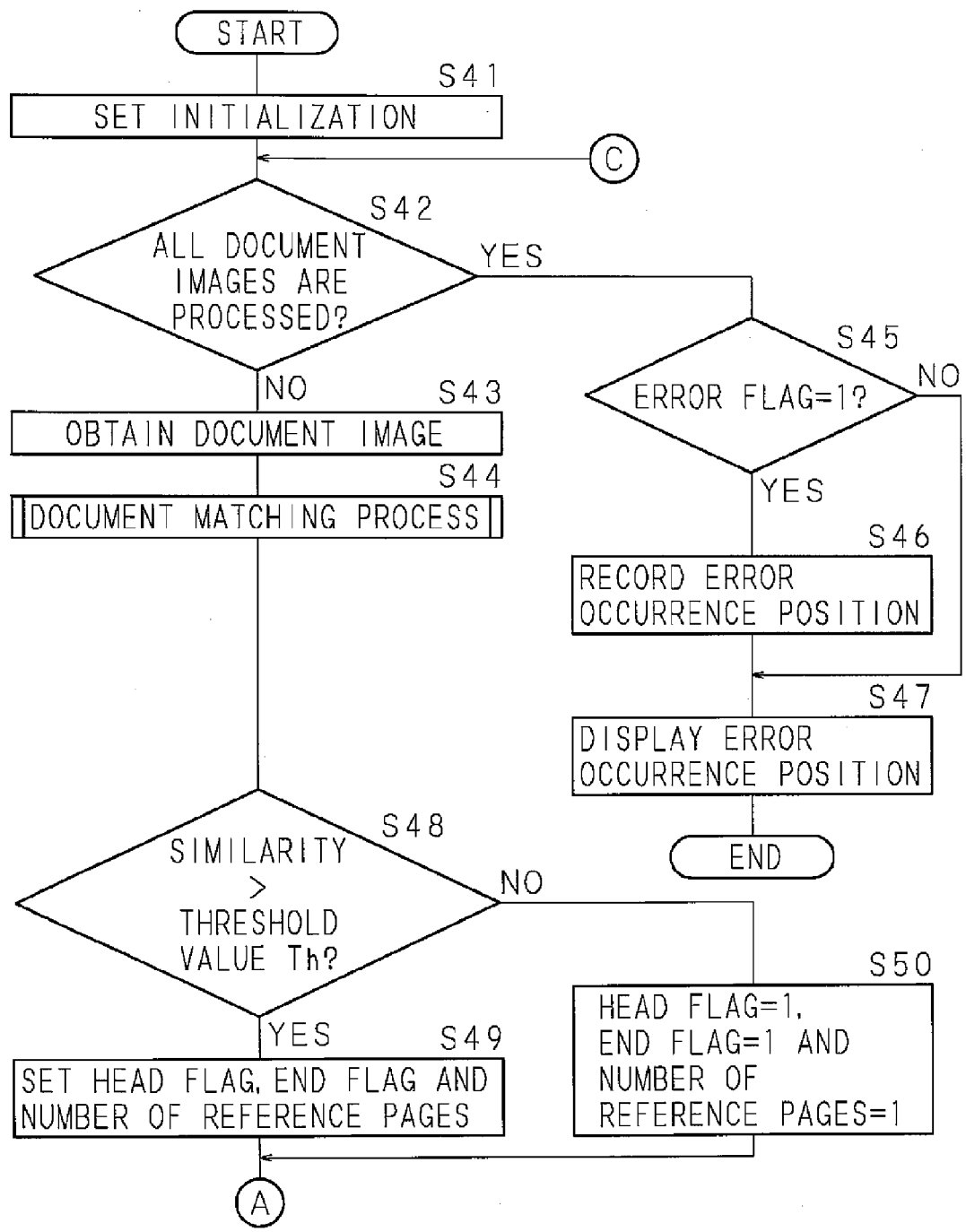
FIGS. 18A to 18E are flow charts showing a procedure of detection processing for an order of document images.
Figure 18B:
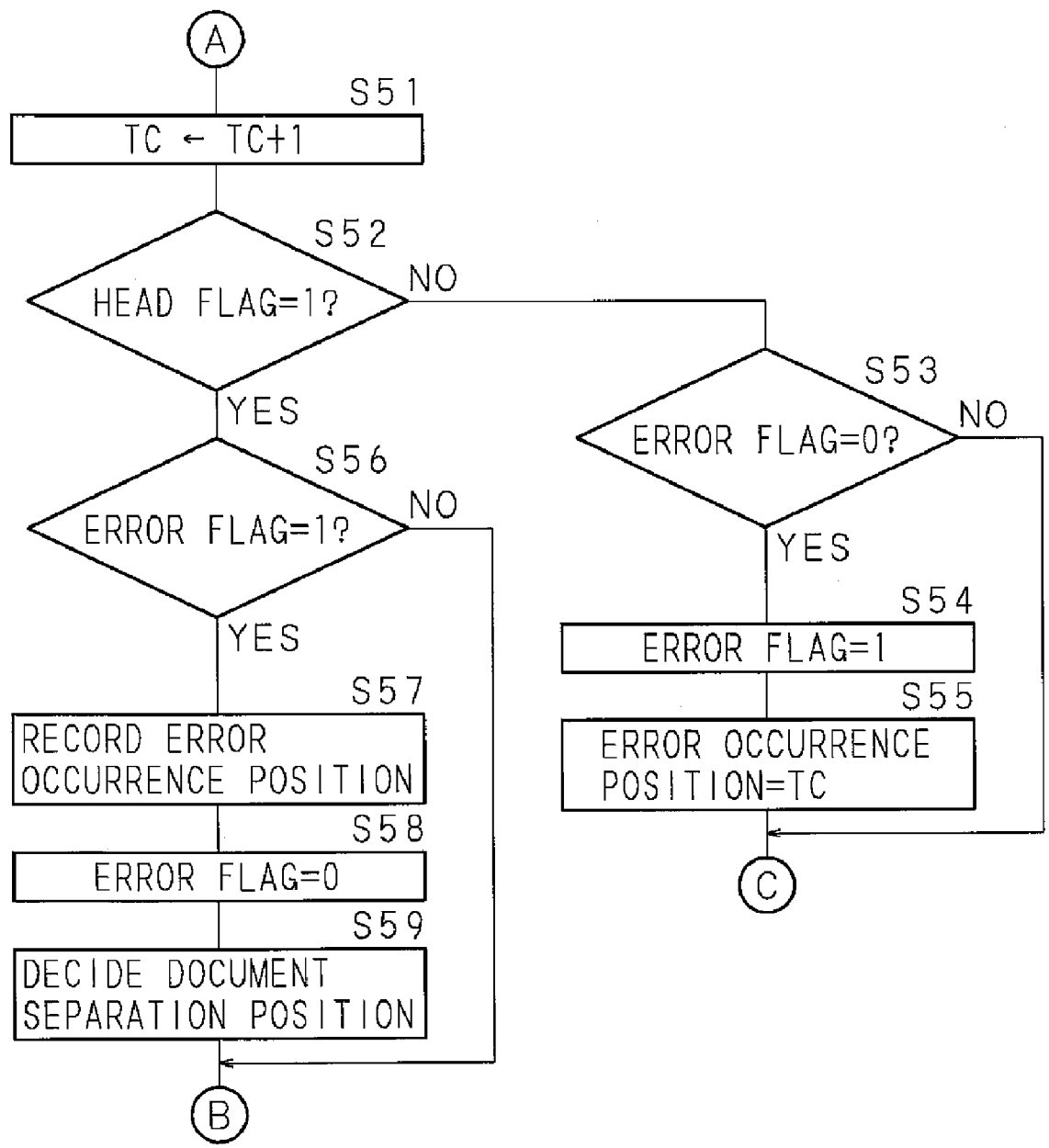
Figure 18C:
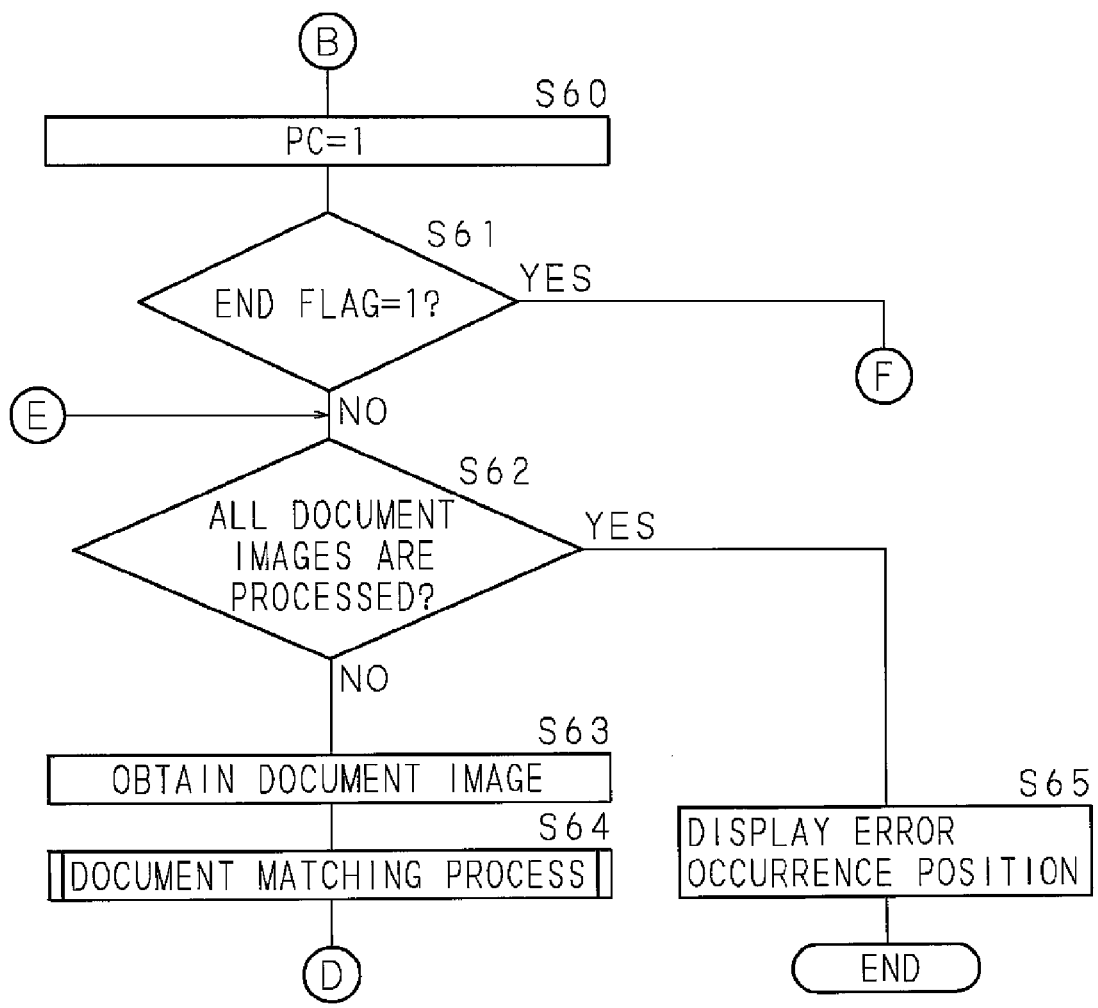
Figure 18D:
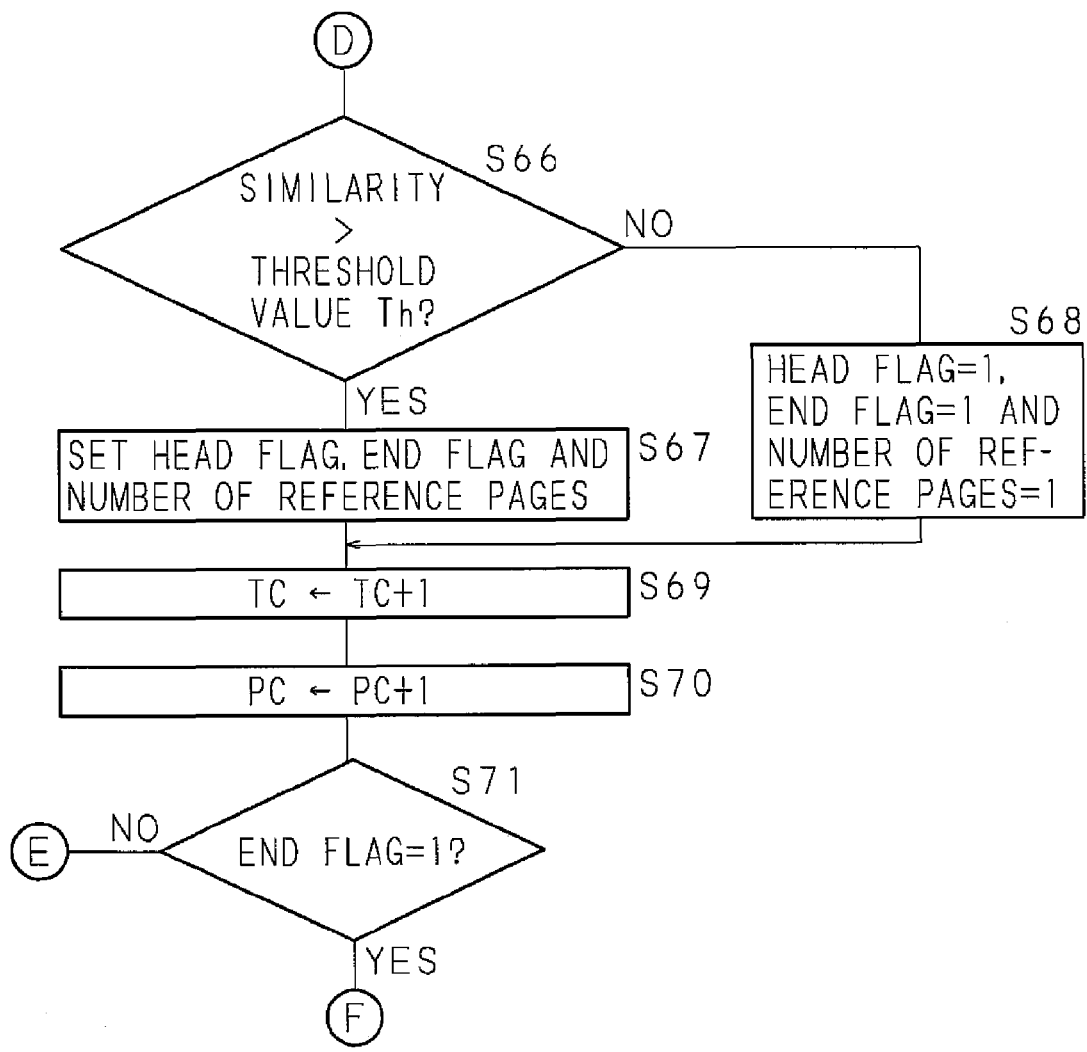
Figure 18E:
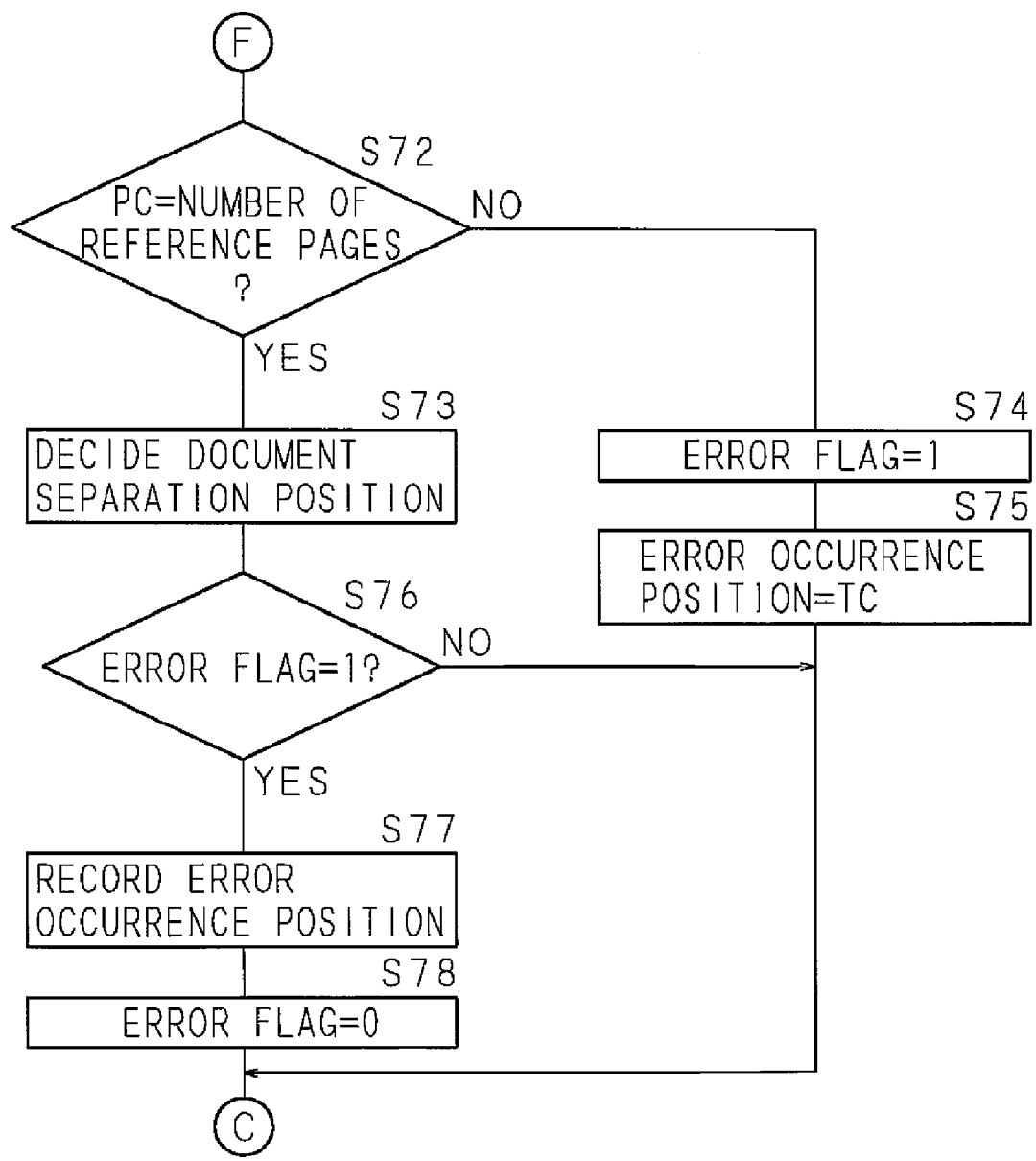

Next, the operation of the color image processing apparatus 2 is described below. FIG. 17 is a flow chart showing a procedure of document storage processing. Here, in addition to being performed by a dedicated hardware circuit such as the document matching process section 24, the document storage processing may be performed by a method in which a computer program that defines the procedure of document storage processing is loaded onto a personal computer having a CPU, a RAM, a ROM, and the like and then the computer program is executed by the CPU. In the following description, the color image processing apparatus 2 is referred to as a "processing section".

The processing section determines whether the mode is a document storing mode (S11). When the mode is not a document storing mode (NO at S11), the processing section continues the processing of step S11, and waits until a user specifies a document storing mode through the operation panel 4. When the mode is a document storing mode (YES at S11), the processing section obtains a reference image (S12). At that time, the reference image may be obtained by reading a document through a document reading apparatus. Alternatively, the document image may be obtained by receiving electronic data generated by a processing apparatus such as a personal computer.

The processing section sets up the document type index (S13). The processing section calculates the feature points of the reference image (S14) and then, on the basis of the calculated feature points, calculates a hash value (features) (S15). The processing section sets up the document page index of the reference image (S16), then sets up the head flag of the reference image (S17), and then determines whether processing for all the reference images has been completed (S18).

When processing for all the reference images is not yet completed (NO at S18), the processing section continues the processing at and after step S14 so as to calculate the hash values of the remaining reference images and set up document page indices and head flags. When processing for all the reference images has been completed (YES at S18), the processing section sets up the end flag of each reference image (S19). As a result, the document page index, the head flag, the end flag, and the document type index are set up for each reference image.

The processing section stores the set-up document page indices and the calculated hash values into the hash table 2461 so as to update the hash table 2461 (S20). The processing section stores into the document image table 2462 the document page index, the head flag, the end flag, and the document type index having been set up, so as to update the document image table 2462 (S21). Then, the processing section stores into the document classification table 2463 the document type index and the number of reference pages having been set up, so as to update the document classification table 2463 (S22), and then terminates the processing.

FIGS. 18A to 18E are flow charts showing a procedure of detection processing for the order of document images. Here, in addition to being performed by a dedicated hardware circuit such as the document matching process section 24, the detection processing for the order of document images may be performed by loading a computer program that defines a procedure of detection processing for the order of document images onto a personal computer having a CPU, a RAM, a ROM, and the like, and then causing the CPU to execute the computer program.

The processing section performs initial setting (S41). Specifically, the processing section sets the individual values of the overall counter TC, the page counter PC, the error flag, and the error occurrence position to be 0. The processing section determines whether processing for all the document images has been completed (S42). When processing for all the document images is not yet completed (NO at S42), the processing section obtains a document image (S43). At that time, the document image may be obtained by reading a document through a document reading apparatus. Alternatively, the document image may be obtained by receiving electronic data generated by a processing apparatus such as a personal computer.

The processing section performs document matching process on the obtained document image (S44). Here, details of the document matching process are described later. When processing has been completed for all the document images (YES at S42), the processing section determines whether the error flag is 1 (S45). When the error flag is 1 (YES at S45), the processing section records the value of the error occurrence position into the recorder (S46). The processing section displays onto the operation panel 4 the error occurrence position recorded in the recorder (S47), and then terminates the processing. When the error flag is 0 (NO at S45), the processing section skips the processing of step S46, then displays onto the operation panel 4 the error occurrence position recorded in the recorder (S47), and then terminates the processing.

The processing section determines whether the similarity obtained in the document matching process is larger than a threshold value Th (S48). When the similarity is larger than the threshold value Th (YES at S48), on the basis of the document page index of a reference image similar to the document image, the processing section searches the document image table 2462 and the document classification table 2463 so as to identify the head flag, the end flag, and the number of reference pages of the document page index, and then sets the values into the head flag, the end flag, and the number of reference pages corresponds to the document image under processing (S49). When the similarity is smaller than the threshold value Th (NO at S48), the processing section sets 1 into the individual values of the head flag, the end flag, and the number of reference pages corresponds to the document image under processing (S50).

The processing section adds one to the overall counter TC (S51). The processing section determines whether the head flag is 1 (S52). When the head flag is 0 (NO at S52), the processing section determines whether the error flag is 0 (S53). When the error flag is 0 (YES at S53), the processing section sets the error flag to be 1 (S54), then sets the value of the overall counter TC into the error occurrence position value (S55), and then returns the processing to step S42. When the error flag is 1 (NO at S53), the processing section skips the processing of steps S54 and S55 so as to return the processing to step S42, and then continues the processing at and after step S42 so as to process the remaining document images.

When the head flag is 1 (YES at S52), the processing section determines whether the error flag is 1 (S56). When the error flag is 1 (YES at S56), the processing section records the value of the error occurrence position into the recorder (S57), and then sets the error flag to be 0 (S58). The processing section concludes that the present document image is the first document image contained in a new document type, hence determines a document dividing position to be located between the document image processed before and the present document image (S59), and then moves the processing to step S60. When the error flag is 0 (NO at S56), the processing section skips the processing of steps S57 to S59, and moves the processing to step S60.

The processing section sets the value in the page counter PC to be 1 (S60). The processing section determines whether the end flag is 1 (S61). When the end flag is 1 (YES at S61), the processing section moves the processing to step S72. When the end flag is 0 (NO at S61), the processing section determines whether processing for all the document images has been completed (S62). When processing for all the document images is not yet completed (NO at S62), the processing section obtains a document image (S63), and then performs document matching process on the obtained document image (S64).

When processing has been completed for all the document images (YES at S62), the processing section displays onto the operation panel 4 the error occurrence position recorded in the recorder (S65), and then terminates the processing. The processing section determines whether the similarity obtained in the document matching process is larger than a threshold value Th (S66). When the similarity is larger than the threshold value Th (YES at S66), on the basis of the document page index of a reference image similar to the document image, the processing section searches the document image table 2462 and the document classification table 2463 so as to identify the head flag, the end flag, and the number of reference pages of the document page index, and then sets the values into the head flag, the end flag, and the number of reference pages corresponding to the document image under processing (S67). When the similarity is smaller than the threshold value Th (NO at S66), the processing section sets 1 into the individual values of the head flag, the end flag, and the number of reference pages corresponding to the document image under processing (S68).

The processing section adds one to the overall counter TC (S69), and then adds one to the page counter PC (S70). The processing section determines whether the end flag is 1 (S71). When the end flag is 0 (NO at S71), the processing section returns the processing to step S62, and then continues the processing at and after step S62 so as to process the remaining document images.

When the end flag is 1 (YES at S71), the processing section determines whether the value in the page counter PC corresponds with the number of reference pages (S72). When the value in the page counter PC corresponds with the number of reference pages (YES at S72), the processing section concludes that this document image is the last document image contained in the present document type, hence determines a document dividing position to be located between the present document image and the document image to be processed next (S73), and then moves the processing to step S76. When the value in the page counter PC does not correspond with the number of reference pages (NO at S72), the processing section sets the error flag to be 1 (S74), and then sets the value of the overall counter TC into the error occurrence position value (S75). Then, the processing section returns the processing to step S42, and then continues the processing at and after step S42 so as to process the remaining document images.

The processing section determines whether the error flag is 1 (S76). When the error flag is 1 (YES at S76), the processing section records the value of the error occurrence position into the recorder (S77), then sets the error flag to be 0 (S78), and then returns the processing to step S42. When the error flag is 0 (NO at S76), the processing section skips the processing of steps S77 and S78, and returns the processing to step S42.

Figure 19:
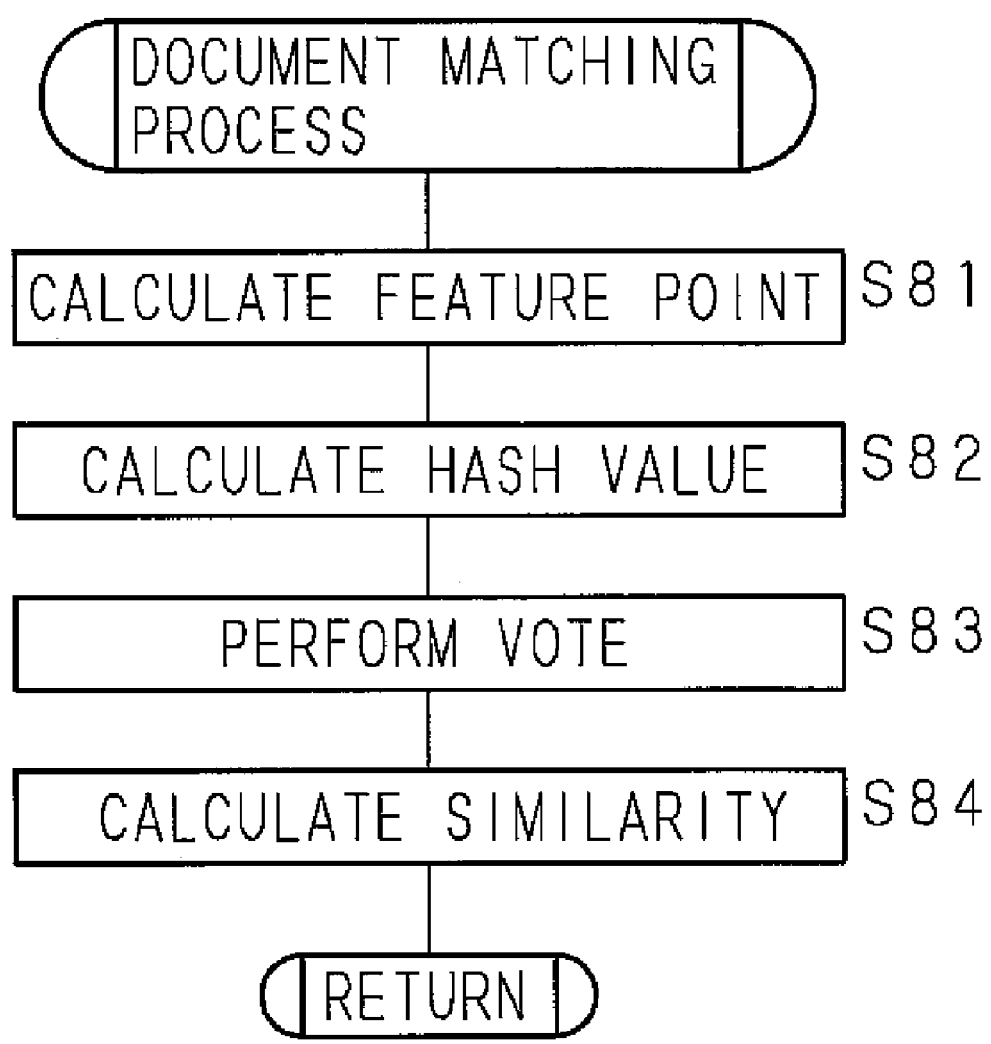
FIG. 19 is a flow chart showing a procedure of document matching process.

The document matching process (steps S44 and S64 in FIGS. 18A to 18E) in the above-mentioned detection processing for the order of document images is described below. FIG. 19 is a flow chart showing a procedure of document matching process, which is a subroutine of the flow charts of FIGS. 18A to 18E.

The processing section calculates the feature points of the obtained document image (S81) and then, on the basis of the calculated feature points, calculates a hash value (features) (S82). On the basis of the calculated hash value, the processing section searches the hash table 2461, and performs voting for a document page index having the same hash value (S83). On the basis of the result of the voting process, the processing section calculates similarity (S84), and then returns to the processing shown in FIGS. 18A to 18E.

When an error occurs, the occurrence position of the generated error is displayed on the operation panel 4, so that the user can be notified of the occurrence position of the error. Further, when it is concluded that the present document image is the first document image contained in a new document type, a document dividing position is determined to be located between the document image processed before and the present document image. Alternatively, when it is concluded that this document image is the last document image contained in the present document type, a document dividing position is determined to be located between the present document image and the document image to be processed next. By virtue of this, document images can be divided for each document type. Then, different output processing may be performed on each group of the divided document images. Further, it can be determined for each document type whether the order of the document images is correct.

Thus, even when a document consisting of a plurality of sheets is read, it is sufficient that the user performs re-read operation only for the document located at the notified error occurrence position. That is, it is not necessary to redo the entire read processing for the document. Further, folders for filing (e.g., a hard disk provided in the image forming apparatus 100; or alternatively stored into a server via a network) may be set up separately for documents having a correct order of document images and documents having been read correctly without occurrence of stacked feed or the like at the time of reading of the document images and for documents having an error in the order of document images. Then, these documents may be stored separately. A path may be set up for each folder. Then, image data may be stored into each folder on the basis of a determination signal which indicates the determination result of document classification. Further, at the time of being stored into the folder, the image data is compressed into a JPEG (Joint Photographic Experts Group) format or the like.

Embodiment 2

Embodiment 2 is described below. Here, an image forming apparatus according to Embodiment 2 has a similar configuration to the image forming apparatus 100 according to Embodiment 1 described above. Thus, description concerning the configuration is omitted.

Embodiment 1 has been described above for a configuration that when the first inputted document image is similar to a reference image and the head flag of the similar reference image is not 1, the document matching process section 24 of the color image processing apparatus 2 determines that this document image has a different order from the reference images. Further, when the inputted document image is similar to a reference image the document 16 matching process section 24 according to Embodiment 1 counts up the number of document images. Then, in case that the end flag of the similar reference image is 1, when the number of pages of the document containing this document image does not correspond with the counted number of sheets, the document matching process section 24 determines that this document image has a different order from the reference images. Thus, Embodiment 1 described above is effective in a case that it is to be determined whether the order of a document consisting of, for example, three or more document images is correct.

In Embodiment 2, the document matching process section 24 of the color image processing apparatus 2 imparts to each reference image a page number in each document type, and then counts up the number of document images when the inputted document image is similar to a reference image. Then, on the basis of whether the page number of the similar reference image corresponds with the counted number of sheets, the document matching process section 24 determines whether this document image has a different order from the reference images. Specifically, when the page number of the similar reference image does not correspond with the counted number of sheets, it is determined that this document image has a different order from the reference images.

FIG. 20 is an explanation diagram showing the structure of a document image table 2464. FIG. 20 shows a document image table 2464 in a case that two types of documents shown in FIG. 14 are stored. The document image table 2464 according to Embodiment 2 is constructed from individual fields consisting of the document page index, the page ID which indicates the page number of each image in the document, and the document type index. Here, the document classification table according to Embodiment 2 has a similar configuration to the document classification table 2463 according to Embodiment 1 described above. Further, in a document storing mode, the document image table 2464 and the document classification table 2463 are updated at each time when a document is stored.

According to the document image table 2464, the reference image identified by document page index ID1 is contained in a document identified by document type index DocID1, and is the first page of this document. The reference image identified by document page index ID2 is contained in the document identified by document type index DocID1, and is the second page of this document. The reference image identified by document page index ID3 is contained in the document identified by document type index DocID1, and is the third page of this document.

Similarly, according to the document image table 2464, the reference image identified by document page index ID4 is contained in a document identified by document type index DocID2, and is the first page of this document. The reference image identified by document page index ID5 is contained in the document identified by document type index DocID2, and is the second page of this document.

As described in Embodiment 1, when the document matching process section 24 classifies the inputted document images for each document type and then determines whether the order of the document images contained in each document type corresponds with the order of the reference images, the features calculating section 242 calculates a hash value for each document image. Then, on the basis of the hash value, the vote processing section 243 votes for the document page index of a reference image having a corresponding hash value. Then, on the basis of the voting result by the vote processing section 243, the similarity judgment processing section 244 judges whether the document image is similar to any reference image. Then, on the basis of the judgment result by the similarity judgment processing section 244, the document classification processing section 245 determines whether the inputted document images have a corresponding order with the reference images stored in advance.

The processing performed by the document classification processing section 245 according to Embodiment 2 is described below. The document classification processing section 245 has a storage section: an overall counter TC which indicates the page ID, the number of reference pages corresponding to the page (document image) under processing, as well as the number of pages of the read document images; a page counter PC which indicates the page number of the document image in each divided document type; an error flag which indicates error occurrence; and an error occurrence position which indicates the page number where an error has occurred. Before the processing, the overall counter TC, the page counter PC, the error flag, and the error occurrence position are all initialized into "0". Here, when an error occurs, the document classification processing section 245 sets the error flag to be 1.

When a reference image is similar to the document image, that is, when a document page index is inputted as a judgment result from the similarity judgment processing section 244, the document classification processing section 245 searches the document image table 2464 on the basis of the document page index, so as to identify the page ID and the document type index of the document page index. Further, the document classification processing section 245 searches the document classification table 2463 on the basis of the identified document type index, so as to identify the number of reference pages corresponding to the document type index, and then sets the page ID and the number of reference pages having been identified into the page ID and the number of reference pages corresponding to the document image under processing.

Here, when a judgment result which indicates the absence of a reference image similar to the document image is inputted from the similarity judgment processing section 244, the document classification processing section 245 sets the page ID and the number of reference pages to be 1. Further, at each time when a judgment result is obtained from the similarity judgment processing section 244, the document classification processing section 245 adds one to the overall counter TC.

When it is judged for the first time that the document image is similar to a reference image, the document classification processing section 245 determines whether the set-up page ID is 1. When the page ID is not 1, that is, when a reference image to which a document image is judged as being similar for the first time is not the first document sheet of the document type which contains this reference image, the document classification processing section 245 concludes error occurrence so as to set the error flag to be 1 and set the page number indicated by the overall counter TC into the error occurrence position value.

When the page ID is 1, that is, when a reference image to which a document image is judged as being similar for the first time is the first document sheet of the document type which contains this reference image, the document classification processing section 245 sets the value in the page counter PC to be 1. Then, the document classification processing section 245 determines whether the value of the number of reference pages corresponds with the set-up value of the page ID. When the values do not correspond with each other, that is, when this reference image is not the last document sheet of the document type, it is judged whether the next document image is similar to a reference image. When the next document image is judged as being similar to a reference image, the document classification processing section 245 sets the page ID and the number of reference pages of the document page index of the reference image into the page ID and the number of reference pages corresponding to the document image under processing, and then adds one to the overall counter TC and the page counter PC.

The document classification processing section 245 determines whether the value in the page counter PC corresponds with the value of the page ID. When the value in the page counter PC does not correspond with the value of the page ID, that is, when the number of document images (the value in the page counter PC) having been counted up by the time when this document image is judged as being similar to the reference image does not correspond with the page number (the value of the page ID) of the reference image in the document type, the document classification processing section 245 concludes error occurrence so as to set the error flag to be 1 and set the page number indicated by the overall counter TC into the error occurrence position value.

When the value in the page counter PC corresponds with the value of the page ID, the number of document images having been counted up by the time when the document image is judged as being similar to the reference image corresponds with the page number of the reference image in the document type. Thus, the document classification processing section 245 concludes that the order of the document images corresponds with the order of reference images contained in the document type stored in advance. Then, the document classification processing section 245 determines whether the number of reference pages corresponds with the set-up value of the page ID. In case of corresponding, that is, when this reference image is the last page in the document type, the document classification processing section 245 concludes that this document image is the last document image contained in the present document type, and hence determines a document dividing position to be located between the present document image and the document image to be processed next.

Further, when the page ID is 1, the document classification processing section 245 determines whether the error flag is 1. When the error flag is 1, the document classification processing section 245 records the value of the error occurrence position into a recorder (not shown), and then concludes that the document image processed before this document image is the last document image contained in the preceding document type, so as to determine a document dividing position to be located between the document image processed before and the present document image. Here, the information which indicates the determined document dividing position is outputted together with the occurrence position of the error as a determination signal and then stored into the recorder. The recorder for recording the determination signal may be provided in the inside or the outside of the color image processing apparatus 2. When the recorder is a nonvolatile memory, the position of the detected error can be saved.

Further, when the document classification processing section 245 has completed the above-mentioned processing for all the document images, the image forming apparatus 100 can display onto the operation panel 4 the error occurrence position recorded in the recorder, so as to notify the user that the order of the document inputted through the color image input apparatus 1 is different from the order of the document stored in advance, together with the difference position. The above-mentioned determination signal may be transmitted, for example, together with the document image, to a printer or a multi-function peripheral via a network, and may be outputted to a printer directly or via a computer.

As such, in Embodiment 2, when the inputted document image is similar to a reference image, it can be determined whether the order of the document images corresponds with the order of a document stored in advance on the basis of whether the page position of each document image corresponds with the page position in the document stored in advance. Thus, it can be determined whether the order of document images is correct and, at the same time, the page number of page omission can be recognized in a document consisting of a plurality of pages.

Figure 21:
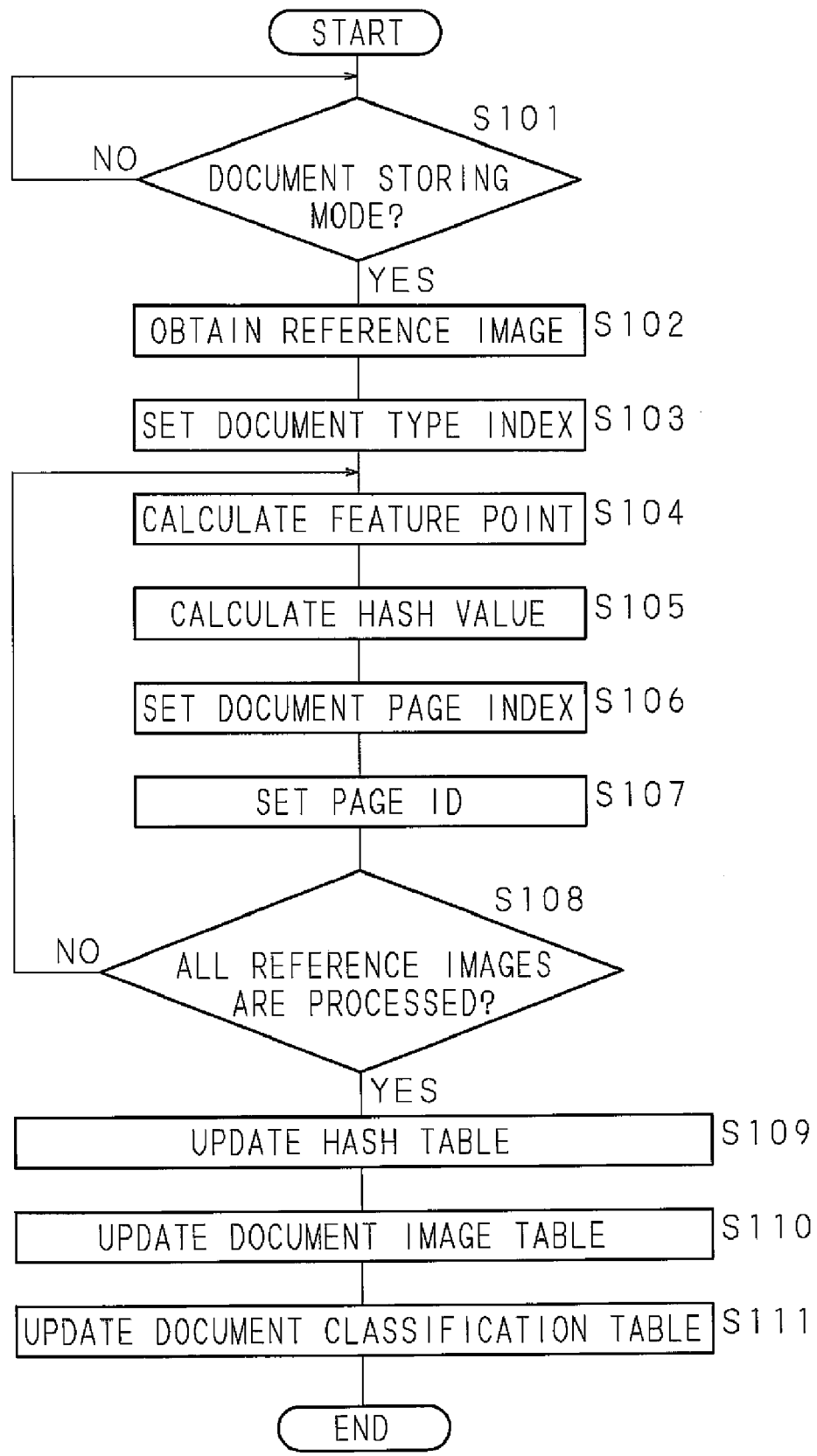
FIG. 21 is a flow chart showing a procedure of document storage processing.
Figure 22A:
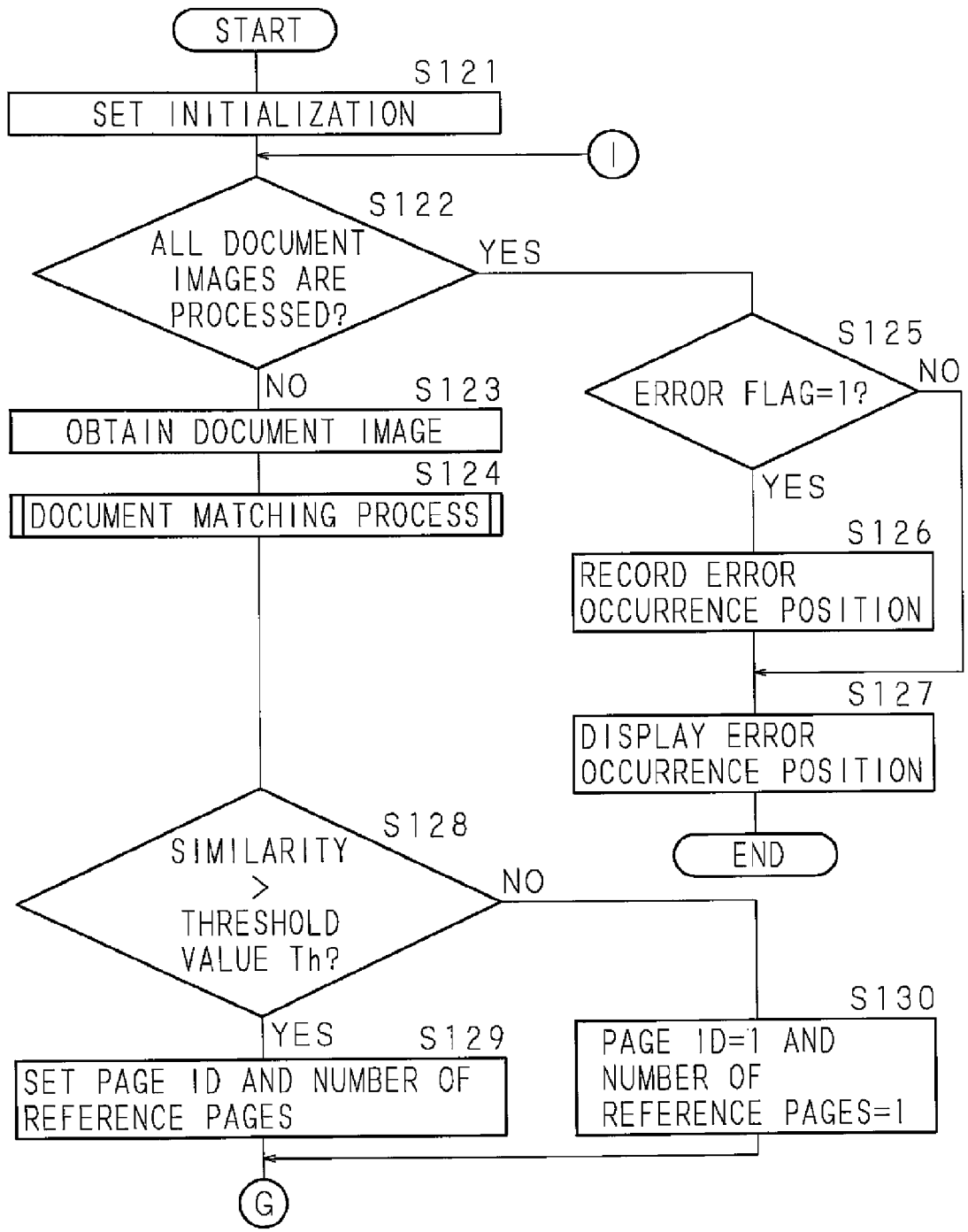
FIGS. 22A to 22E are flow charts showing a procedure of detection processing for an order of document images.
Figure 22B:
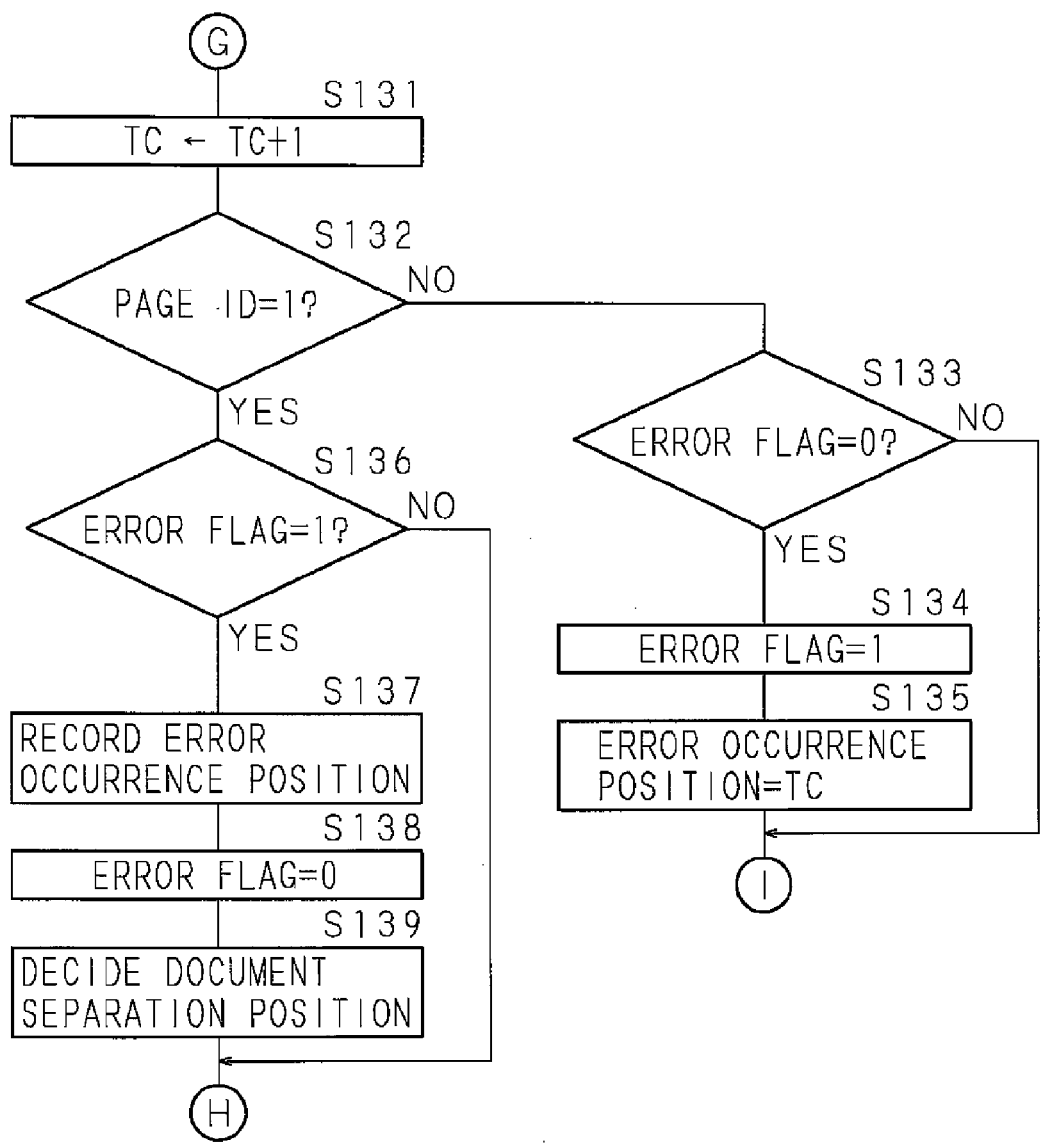
Figure 22C:
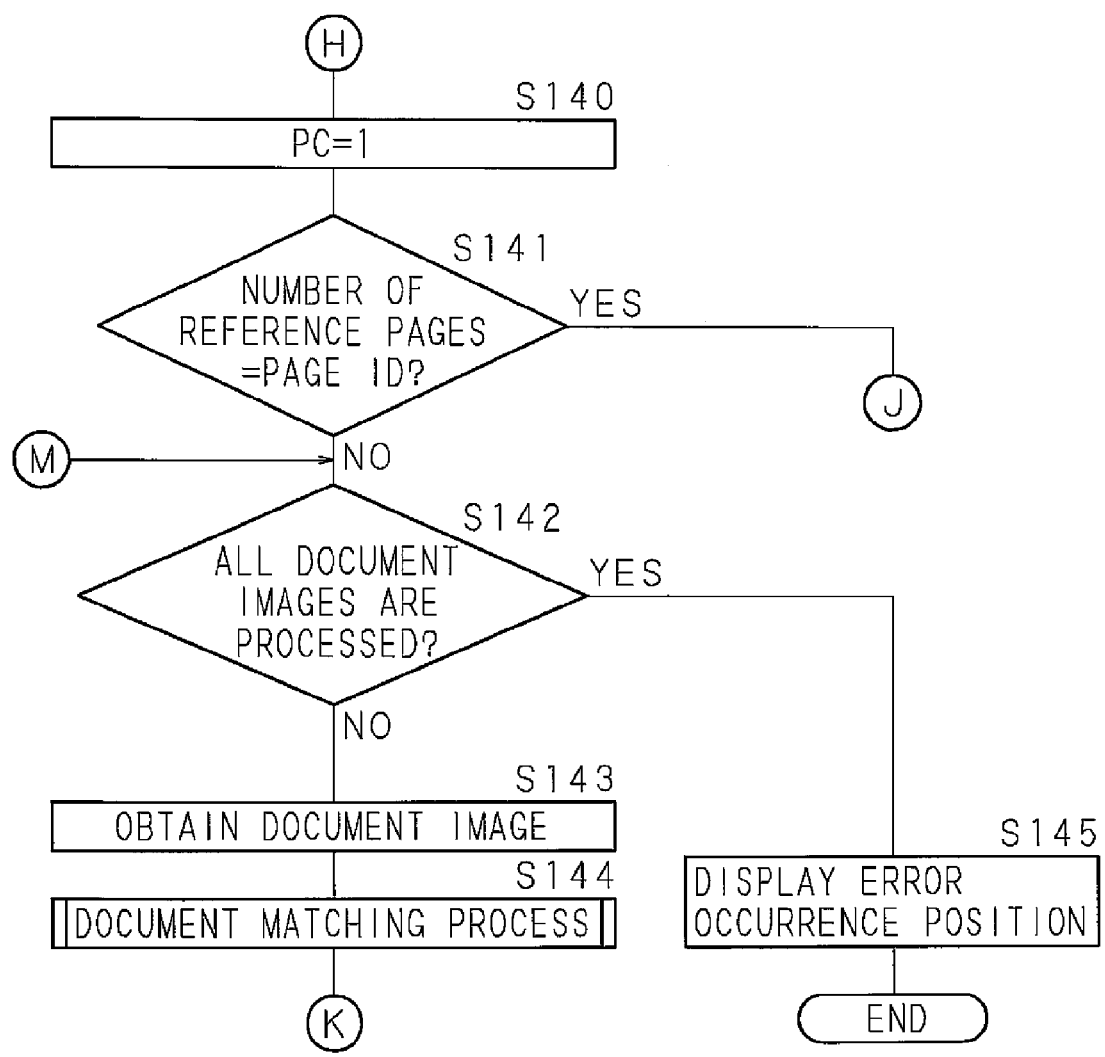
Figure 22D:
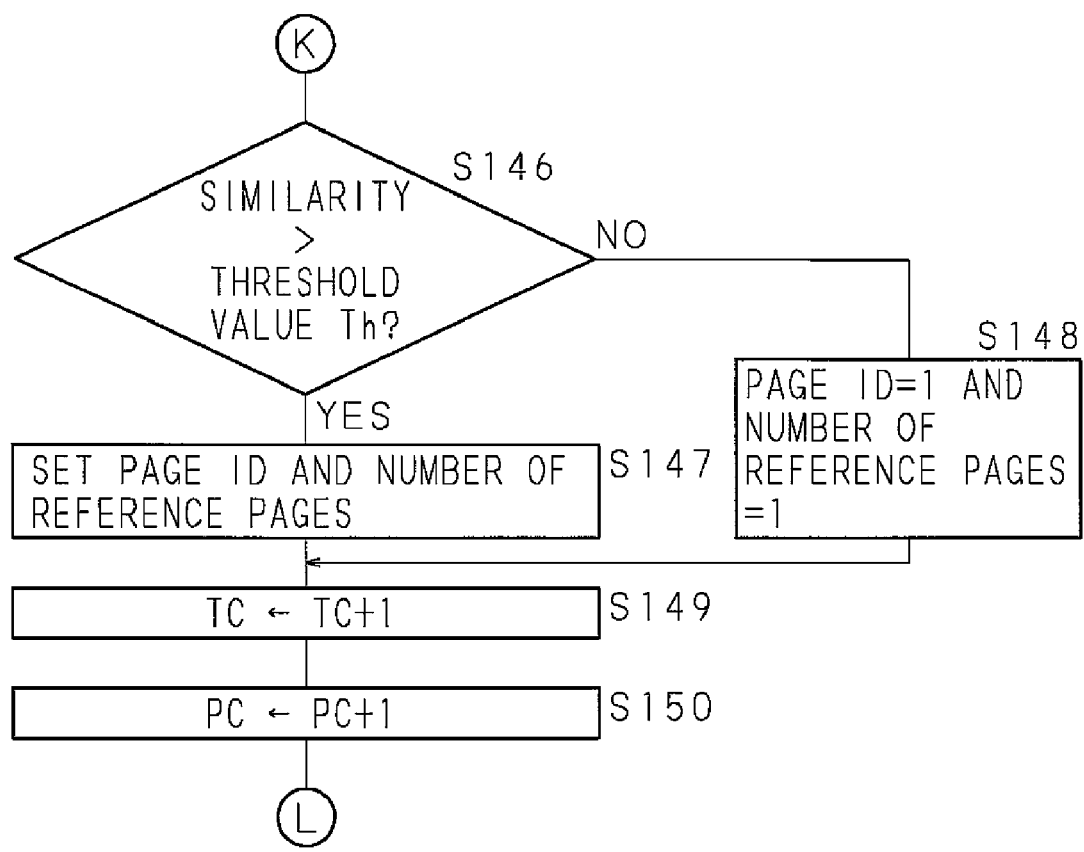
Figure 22E:
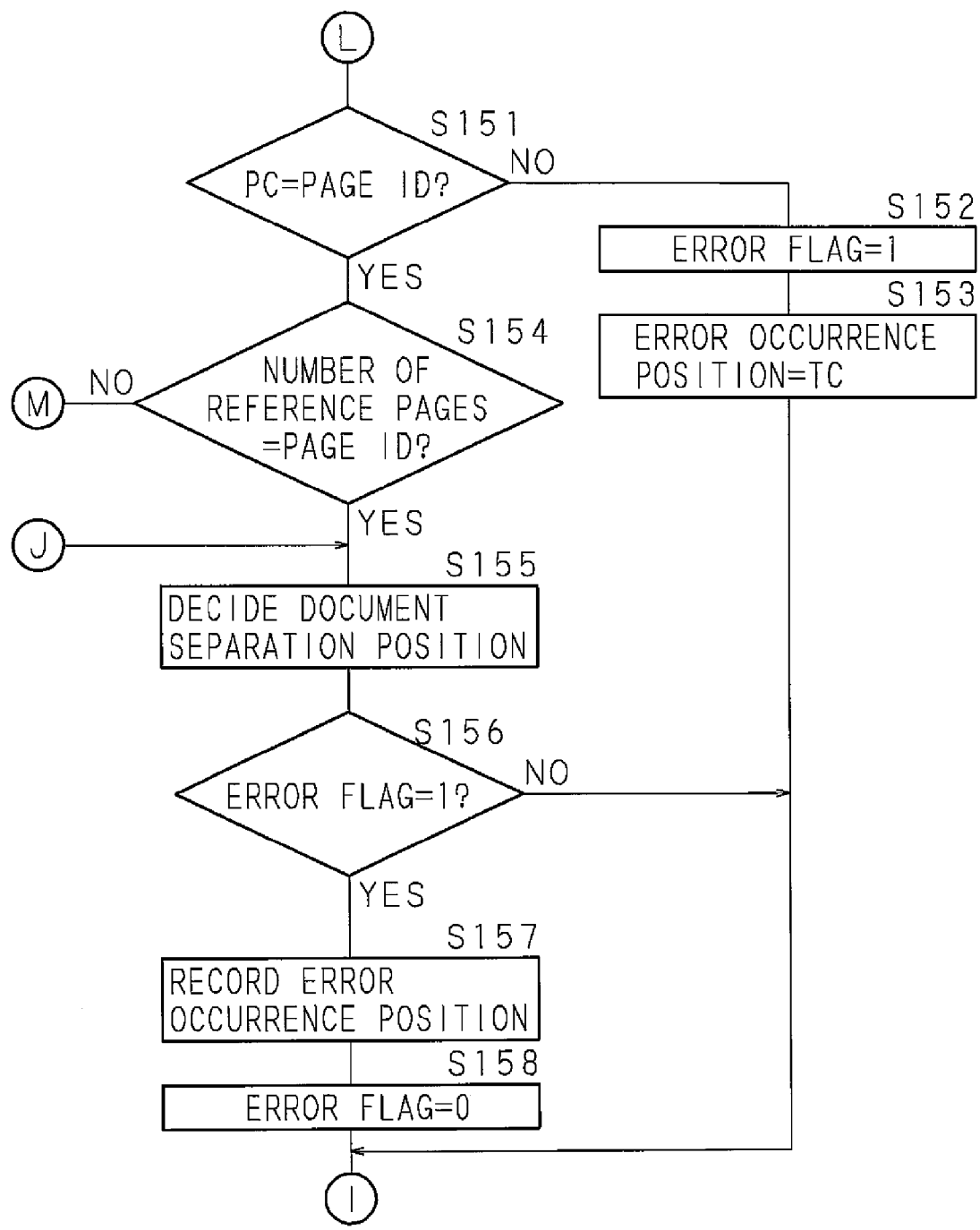

Next, the document storage processing in Embodiment 2 is described below. FIG. 21 is a flow chart showing a procedure of document storage processing. Here, in addition to being performed by a dedicated hardware circuit such as the document matching process section 24, the document storage processing may be performed by a method in which a computer program that defines the procedure of document storage processing is loaded onto a personal computer having a CPU, a RAM, a ROM, and the like and then the computer program is executed by the CPU. In the following description, the color image processing apparatus 2 is referred to as a "processing section".

The processing section determines whether the mode is a document storing mode (S101). When the mode is not a document storing mode (NO at S101), the processing section continues the processing of step S101, and waits until a user specifies a document storing mode through the operation panel 4. When the mode is a document storing mode (YES at S101), the processing section obtains a reference image (S102). At that time, the reference image may be obtained by reading a document through a document reading apparatus. Alternatively, the document image may be obtained by receiving electronic data generated by a processing apparatus such as a personal computer.

The processing section sets up the document type index (S103). The processing section calculates the feature points of the reference image (S104) and then, on the basis of the calculated feature points, calculates a hash value (features) (S105). The processing section sets up the document page index of the reference image (S106), then sets up the page ID of the reference image (S107), and then determines whether processing for all the reference images has been completed (S108). Here, the page ID may be set up 1, 2, 3 . . . in the order where individual reference images are obtained.

When processing for all the reference images is not yet completed (NO at S108), the processing section continues the processing at and after step S104 so as to calculate the hash values of the remaining reference images and set up document page indices and page IDs. When processing for all the reference images has been completed (YES at S108), the document page index, the page ID, and the document type index are set up for each reference image, and the processing section stores into the hash table 2461 the set-up document page index and the calculated hash value so as to update the hash table 2461 (S109).

The processing section stores into the document image table 2464 the document page index, the page ID and the document type index having been set up, so as to update the document image table 2464 (S110). Then, the processing section stores into the document classification table 2463 the document type index and the number of reference pages having been set up, so as to update the document classification table 2463 (S111), and then terminates the processing.

Next, the detection processing for the order of document images in Embodiment 2 is described. FIGS. 22A to 22E are flow charts showing a procedure of detection processing for the order of document images. Here, in addition to being performed by a dedicated hardware circuit such as the document matching process section 24, the detection processing for the order of document images may be performed by loading a computer program that defines a procedure of detection processing for the order of document images onto a personal computer having a CPU, a RAM, a ROM, and the like, and then causing the CPU to execute the computer program.

The processing section performs initial setting (S121). Specifically, the processing section sets the individual values of the overall counter TC, the page counter PC, the error flag, and the error occurrence position to be 0. The processing section determines whether processing for all the document images has been completed (S122). When processing for all the document images is not yet completed (NO at S122), the processing section obtains a document image (S123). At that time, the document image may be obtained by reading a document through a document reading apparatus. Alternatively, the document image may be obtained by receiving electronic data generated by a processing apparatus such as a personal computer.

The processing section performs document matching process on the obtained document image (S124). Here, details of the document matching process are the same as those in Embodiment 1, and the description thereof is omitted. When processing has been completed for all the document images (YES at S122), the processing section determines whether the error flag is 1 (S125). When the error flag is 1 (YES at S125), the processing section records the value of the error occurrence position into the recorder (S126). The processing section displays onto the operation panel 4 the error occurrence position recorded in the recorder (S127), and then terminates the processing. When the error flag is 0 (NO at S125), the processing section skips the processing of step S126, then displays onto the operation panel 4 the error occurrence position recorded in the recorder (S127), and then terminates the processing.

The processing section determines whether the similarity obtained in the document matching process is larger than a threshold value Th (S128). When the similarity is larger than the threshold value Th (YES at S128), on the basis of the document page index of a reference image similar to the document image, the processing section searches the document image table 2464 and the document classification table 2463 so as to identify the page ID and the number of reference pages of the document page index, and then sets the values into the page ID and the number of reference pages corresponding to the document image under processing (S129). When the similarity is smaller than the threshold value Th (NO at S128), the processing section sets 1 into the individual values of the page ID and the number of reference pages corresponds to the document image under processing (S130).

The processing section adds one to the overall counter TC (S131). The processing section determines whether the value of page ID is 1 (S132). When the value of page ID is not 1 (NO at S132), the processing section determines whether the error flag is 0 (S133). When the error flag is 0 (YES at S133), the processing section sets the error flag to be 1 (S134), then sets the value of the overall counter TC into the error occurrence position value (S135), and then returns the processing to step S122. When the error flag is 1 (NO at S133), the processing section skips the processing of steps S134 and S135 so as to return the processing to step S122, and then continues the processing at and after step S122 so as to process the remaining document images.

When the value of page ID is 1 (YES at S132), the processing section determines whether the error flag is 1 (S136). When the error flag is 1 (YES at S136), the processing section records the value of the error occurrence position into the recorder (S137), and then sets the error flag to be 0 (S138). The processing section concludes that the present document image is the first document image contained in a new document type, hence determines a document dividing position to be located between the document image processed before and the present document image (S139), and then moves the processing to step S140. When the error flag is 0 (NO at S136), the processing section skips the processing of steps S137 to S139, and moves the processing to step S140.

The processing section sets the value in the page counter PC to be 1 (S140). The processing section determines whether the number of reference pages is coincident with the value of page ID (S141). When the number of reference pages is coincident with the value of page ID (YES at S141), the processing section moves the processing to step S155. When the number of reference pages is not coincident with the value of page ID (NO at S141), the processing section determines whether processing for all the document images has been completed (S142). When processing for all the document images is not yet completed (NO at S142), the processing section obtains a document image (S143), and then performs document matching process on the obtained document image (S144).

When processing has been completed for all the document images (YES at S142), the processing section displays onto the operation panel 4 the error occurrence position recorded in the recorder (S145), and then terminates the processing. The processing section determines whether the similarity obtained in the document matching process is larger than a threshold value Th (S146). When the similarity is larger than the threshold value Th (YES at S146), on the basis of the document page index of a reference image similar to the document image, the processing section searches the document image table 2464 and the document classification table 2463 so as to identify the page ID and the number of reference pages of the document page index, and then sets the values into the page ID and the number of reference pages corresponding to the document image under processing (S147). When the similarity is smaller than the threshold value Th (NO at S146), the processing section sets 1 into the individual values of the page ID and the number of reference pages corresponding to the document image under processing (S148).

The processing section adds one to the overall counter TC (S149), and then adds one to the page counter PC (S150). The processing section determines whether the value in the page counter PC is coincident with the value of page ID (S161). When the value in the page counter PC is not coincident with the value of page ID (NO at S151), the processing section sets the error flag to be 1 (S152), sets the value of the overall counter TC into the error occurrence position value (S153), returns the processing to step S122, and then continues the processing at and after step S122 so as to process the remaining document images.

When the value in the page counter PC is coincident with the value of page ID (YES at S151), the processing section determines whether the number of reference pages corresponds with the value of page ID (S154). When the number of reference pages corresponds with the value of page ID (YES at S154), the processing section concludes that this document image is the last document image contained in the present document type, hence determines a document dividing position to be located between the present document image and the document image to be processed next (S155), and then moves the processing to step S156. When the number of reference pages does not correspond with the value of page ID (NO at S154), the processing section returns the processing to step S142, and then continues the processing at and after step S142 so as to process the remaining document images.

The processing section determines whether the error flag is 1 (S156). When the error flag is 1 (YES at S156), the processing section records the value of the error occurrence position into the recorder (S157), then sets the error flag to be 0 (S158), and then returns the processing to step S122. When the error flag is 0 (NO at S156), the processing section skips the processing of steps S157 and S158, and returns the processing to step S122.

When an error occurs, the occurrence position of the generated error is displayed on the operation panel 4, so that the user can be notified of the occurrence position of the error. Further, when it is concluded that the present document image is the first document image contained in a new document type, a document dividing position is determined to be located between the document image processed before and the present document image. Alternatively, when it is concluded that this document image is the last document image contained in the present document type, a document dividing position is determined to be located between the present document image and the document image to be processed next. By virtue of this, document images can be divided for each document type. Then, different output processing may be performed on each group of the divided document images. Further, it can be determined whether each page contained in each document type is correct.

Thus, even when a document consisting of a plurality of sheets is read, it is sufficient that the user performs re-read operation only for the document located at the notified error occurrence position. That is, it is not necessary to redo the entire read processing for the document. Further, folders for filing (e.g., a hard disk provided in the image forming apparatus 100; or alternatively stored into a server via a network) may be set up separately for documents having a correct order of document images and documents having been read correctly without occurrence of stacked feed or the like at the time of reading of the document images and for documents having an error in the order of document images. Then, these documents may be stored separately. A path may be set up for each folder. Then, image data may be stored into each folder on the basis of a determination signal which indicates the determination result of document classification. Further, at the time of being stored into the folder, the image data is compressed into a JPEG (Joint Photographic Experts Group) format or the like.

Embodiment 3

Embodiment 3 is described below. Here, an image forming apparatus according to Embodiment 3 has a similar configuration to the image forming apparatus 100 according to Embodiment 1 described above. Thus, description concerning the configuration is omitted.

Embodiments 1 and 2 have been described above for a configuration that the document matching process section 24 of the color image processing apparatus 2 detects the presence or absence of page omission in document images, the presence or absence of order substitution in document images, the presence or absence of stacked feed of document images, and the like. Thus, in Embodiments 1 and 2 described above, it can be determined with satisfactory precision whether the order of a document consisting of a plurality of document images is correct. In Embodiment 3, in addition to the presence or absence of page omission in document images, the presence or absence of order substitution in document images, and the presence or absence of stacked feed of document images, the document matching process section 24 of the color image processing apparatus 2 detects also the presence or absence of substitution of front and back of a document in a double-sided document. Thus, the document matching process section 24 according to Embodiment 3 outputs, as a determination signal, information which indicates the position where the front and back of the document are substituted in a double-sided document, together with the information which indicates a document dividing position as well as an error occurrence position.

In Embodiment 3, as shown in FIG. 13A, when the two sides (P1 front side, P1 back side, P2 front side, P2 back side, P3 front side, P3 back side) of a document of three sheets (P1, P2, P3) are to be stored, the document matching process section 24 (specifically, the features calculating section 242) sets up document page indices ID1, ID2, ID3, ID4, ID5, and ID6 in page order respectively for the double-sided images (P1 front side, P1 back side, P2 front side, P2 back side, P3 front side, P3 back side) of the document of three sheets, and then calculates a hash values (e.g., H1, H2, . . . ) for the image of each of the document page indices ID1, ID2, ID3, ID4, ID5, and ID6. The features calculating section 242 sets up: the page ID which indicates the sheet number of the document where each image is located; and the side information which indicates whether each image is the front side image or the back side image of the document. Here, when each image is the front side image of the document, the features calculating section 242 sets the corresponding side information to be 1. When each image is the back side image of the document, the features calculating section 242 sets the corresponding side information to be 2.

The features calculating section 242 sets up a document type index DocID1 for identifying the entirety of the document of three sheets (the type of a document) and, at the same time, sets up the maximum of the page IDs having been set up for individual images, into the number of reference pages ("3", in this case). The features calculating section 242 stores the document page index, the page ID, the side information, and the document type index into a document image table described later. Further, the features calculating section 242 stores the document type index and the number of reference pages into a document classification table described later.

Figure 23:
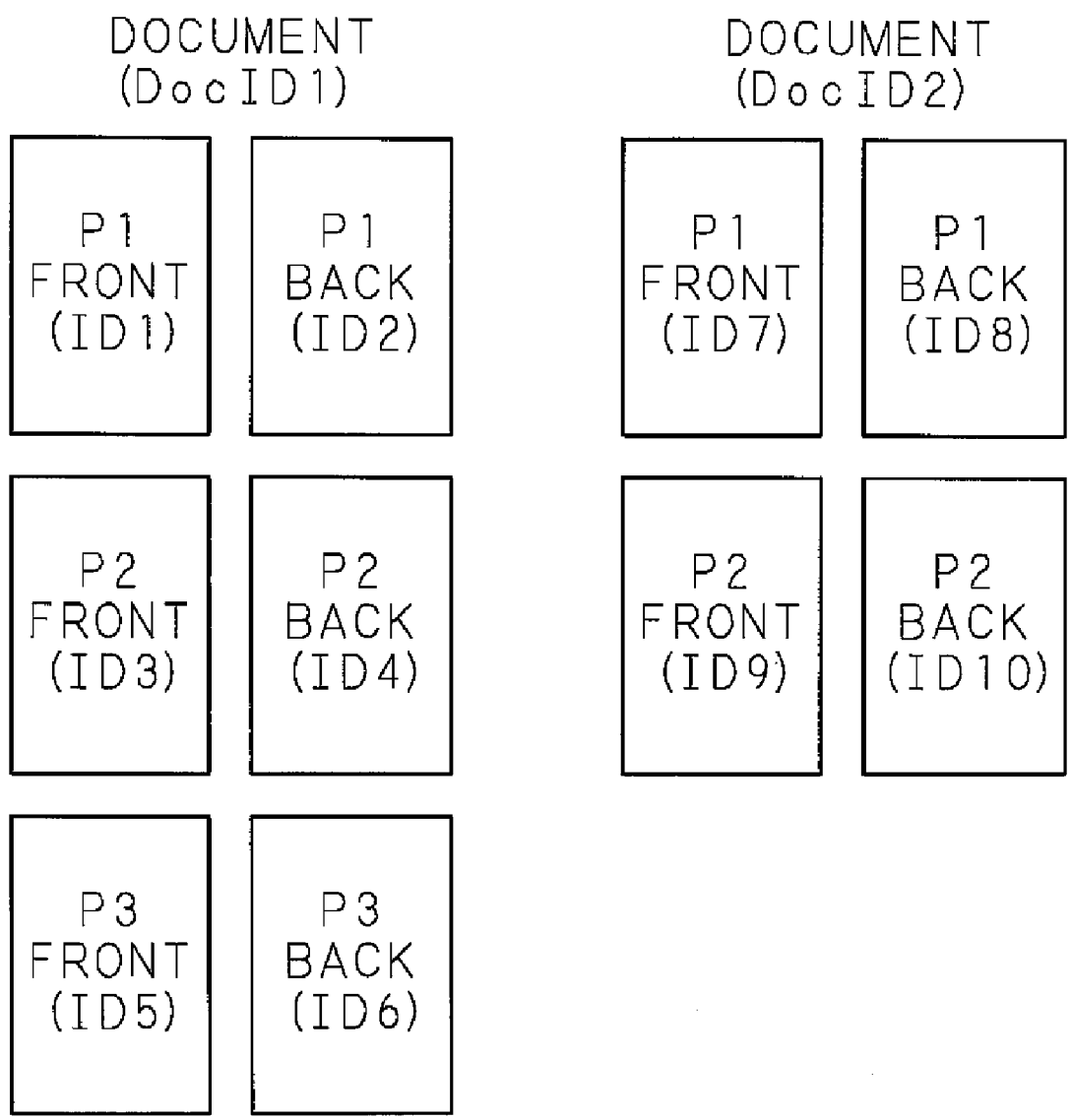
FIG. 23 is an explanation diagram showing an example of a document to be stored.

FIG. 23 is an explanation diagram showing an example of a document stored in Embodiment 3. The following description is given for a case that two types of documents are to be stored as shown in FIG. 23. A document type index DocID1 is set up for a document consisting of six pages of reference images (three double-sided document sheets). Then, document page indices ID1, ID2, ID3, ID4, ID5, and ID6 are set up for the individual pages of the document. Similarly, a document type index DocID2 is set up for a document consisting of four pages of reference images (two double-sided document sheets). Then, document page indices ID7, ID8, ID9, and ID10 are set up for the individual pages of the document.

FIG. 24 is an explanation diagram showing the structure of a document image table 2465. The document image table 2465 according to Embodiment 3 is constructed from individual fields consisting of the document page index, the page ID, the face information, and the document type index. Here, the document classification table according to Embodiment 3 has a similar configuration to the document classification table 2463 according to Embodiment 1 described above. Further, in a document storing mode, the document image table 2465 and the document classification table 2463 are updated at each time when a document is stored.

According to the document image table 2465, the reference image identified by document page index ID1 is the front side image of the first sheet of the document identified by document type index DocID1. Further, the reference image identified by document page index ID2 is the back side image of the first sheet of the document identified by document type index DocID1. The reference image identified by document page index ID3 is the front side image of the second sheet of the document identified by document type index DocID1. The reference image identified by document page index ID4 is the back side image of the second sheet of the document identified by document type index DocID1. The reference image identified by document page index ID5 is the front side image of the third sheet of the document identified by document type index DocID1. The reference image identified by document page index ID6 is the back side image of the third sheet of the document identified by document type index DocID1. Further, according to the document classification table 2463, the number of reference pages of the document identified by document type index DocID1 is "3".

Similarly, according to the document image table 2465, the reference image identified by document page index ID7 is the front side image of the first sheet of the document identified by document type index DocID2. Further, the reference image identified by document page index ID8 is the back side image of the first sheet of the document identified by document type index DocID2. The reference image identified by document page index ID9 is the front side image of the second sheet of the document identified by document type index DocID2. The reference image identified by document page index ID10 is the back side image of the second sheet of the document identified by document type index DocID2. Further, according to the document classification table 2463, the number of reference pages of the document identified by document type index DocID2 is "2".

As described in Embodiment 1, when the document matching process section 24 classifies the inputted document images for each document type and then determines whether the order of the document images contained in each document type corresponds with the order of the reference images, the features calculating section 242 calculates a hash value for each document image. Then, on the basis of the hash value, the vote processing section 243 votes for the document page index of a reference image having a corresponding hash value. Then, on the basis of the voting result by the vote processing section 243, the similarity judgment processing section 244 judges whether the document image is similar to any reference image. Then, on the basis of the judgment result by the similarity judgment processing section 244, the document classification processing section 245 determines whether the inputted document images have a corresponding order with the reference images stored in advance.

Here, in Embodiment 3, in addition to the order of the document, the presence or absence of substitution of front and back of the document is also detected in a double-sided document. That is, document images read from the two sides of one document sheet are respectively inputted, and then it is determined whether the front and back of the inputted document images are correct. Specifically, the similarity judgment processing section 244 judges whether the two document images read from the two sides of one document sheet are similar respectively to any one of the reference images. When the two are similar respectively, the document classification processing section 245 determines whether the two reference images judged as being similar to the two document images are respectively the front side image and the back side image of the one document sheet. When the two reference images are the front side image and the back side image of the one document sheet, on the basis of whether the front and back of the inputted document images correspond with the front and back of the reference images, the document classification processing section 245 determines whether the front and back of the two inputted document images are correct. Here, in the inputted document images, the image inputted first is defined as the front side image, while the image inputted next is defined as the back side image.

The processing performed by the document classification processing section 245 according to Embodiment 3 is described below. The document classification processing section 245 has a storage section for: an overall counter TC which indicates the page ID, the face information, the number of reference pages, and the number of pages of read document images corresponding to the page (document image) under processing; a page counter PC which indicates the page number of the document image in each divided document type; an error flag which indicates error occurrence; an error occurrence position which indicates the page number where an error has occurred; and a front/back change position which indicates the page number where the front and back are substituted. Before the processing, the overall counter TC, the page counter PC, the error flag, the error occurrence position, and the front/back change position are all initialized into "0". Here, when an error occurs, the document classification processing section 245 sets the error flag to be 1.

When two reference images are similar respectively to the two document images read from the two sides of one document sheet, that is, when two document page indices are inputted as a judgment result from the similarity judgment processing section 244, the document classification processing section 245 searches the document image table 2465 on the basis of the two document page indices, so as to determine whether the page IDs of the two document page indices are the same to each other and the face information is respectively 1 and 2. When the page IDs of the two document page indices are the same to each other and the face information is respectively 1 and 2, that is, when the two reference images are the images read respectively from the front side and the back side of one document sheet, the document classification processing section 245 determines whether the front and back of the inputted document images correspond with the front and back of the reference images.

When the front and back of the inputted document images correspond with the front and back of the reference images, specifically, when the face information of a reference image similar to the document image read from the front side of the document is 1 and the face information of a reference image similar to the document image read from the back side of the document is 2, the document classification processing section 245 determines that the front and back of the two inputted document images are correct. Here, when the front and back of the two document images are not correct, specifically, when the face information of a reference image similar to the document image read from the front side of the document is 2 and the face information of a reference image similar to the document image read from the back side of the document is 1, the document classification processing section 245 concludes error occurrence so as to set the error flag to be 1 and sets the page number indicated by the overall counter TC as the front/back change position.

When the front and back of the two document images are correct, on the basis of the document image table 2465, the document classification processing section 245 identifies the page IDs and the document type index for the two document page indices inputted as a judgment result from the similarity judgment processing section 244. Further, the document classification processing section 245 identifies the number of reference pages corresponding to the identified document type index from the document classification table 2463, and then sets the page IDs and the number of reference pages having been identified into the page IDs and the number of reference pages corresponding to the document images under processing.

Here, when a judgment result which indicates that no reference image is similar to one or both of the two document images is inputted from the similarity judgment processing section 244, or alternatively when the two reference images similar to the two document images are not the front side image and the back side image of the one document sheet, the document classification processing section 245 sets the page IDs and the number of reference pages to be 1. Further, at each time when a judgment result is obtained from the similarity judgment processing section 244, the document classification processing section 245 adds one to the overall counter TC.

When it is determined for the first time that the two document images are similar respectively to reference images and that the two reference images are the front side image and the back side image of the one document sheet, the document classification processing section 245 determines whether the set-up page ID is 1. When the page ID is not 1, that is, when a reference image to which a document image is judged as being similar for the first time is not the first document sheet of the document type which contains this reference image, the document classification processing section 245 concludes error occurrence so as to set the error flag to be 1 and set the page number indicated by the overall counter TC into the error occurrence position value.

When the page ID is 1, that is, when a reference image to which a document image is judged as being similar for the first time is the first document sheet of the document type which contains this reference image, the document classification processing section 245 sets the value in the page counter PC to be 1. Then, the document classification processing section 245 determines whether the value of the number of reference pages corresponds with the set-up value of the page ID. When the values do not correspond with each other, that is, when this reference image is not the last document sheet of the document type, it is judged whether the next document image is similar to a reference image. When it is determined that the two next document images are similar to reference images respectively and that the two reference images are the front side image and the back side image of the one document sheet, the document classification processing section 245 sets the page ID and the number of reference pages of the document page index of the reference image into the page ID and the number of reference pages corresponding to the document image under processing, and then adds one to the overall counter TC and the page counter PC.

The document classification processing section 245 determines whether the value in the page counter PC corresponds with the value of the page ID. When the value in the page counter PC does not correspond with the value of the page ID, that is, when the number of document images (the value in the page counter PC) having been counted up by the time when this document image is judged as being similar to the reference image does not correspond with the page number (the value of the page ID) of the reference image in the document type, the document classification processing section 245 concludes error occurrence so as to set the error flag to be 1 and set the page number indicated by the overall counter TC into the error occurrence position value.

When the value in the page counter PC corresponds with the value of the page ID, the number of document images having been counted up by the time when the document image is judged as being similar to the reference image corresponds with the page number of the reference image in the document type. Thus, the document classification processing section 245 concludes that the order of the document images corresponds with the order of reference images contained in the document type stored in advance. Then, the document classification processing section 245 determines whether the number of reference pages corresponds with the set-up value of the page ID. In case of corresponding, that is, when this reference image is the last page in the document type, the document classification processing section 245 concludes that this document image is the last document image contained in the present document type, and hence determines a document dividing position to be located between the present document image and the document image to be processed next.

Further, when the page ID is 1, the document classification processing section 245 determines whether the error flag is 1. When the error flag is 1, the document classification processing section 245 records the value of the error occurrence position into a recorder (not shown), and then concludes that the document image processed before this document image is the last document image contained in the preceding document type, so as to determine a document dividing position to be located between the document image processed before and the present document image. Here, the information which indicates the determined document dividing position and the front/back change position is outputted together with the occurrence position of the error as a determination signal and then stored into the recorder. The recorder for recording the determination signal may be provided in the inside or the outside of the color image processing apparatus 2. When the recorder is a nonvolatile memory, the position of the detected error can be saved.

Further, when the document classification processing section 245 has completed the above-mentioned processing for all the document images, the image forming apparatus 100 can display onto the operation panel 4 the error occurrence position and the front/back change position recorded in the recorder, so as to notify the user that the order of the document inputted through the color image input apparatus 1 is different from the order of the document stored in advance, together with the difference position and the front/back change position. The above-mentioned determination signal may be transmitted, for example, together with the document image, to a printer or a multi-function peripheral via a network, and may be outputted to a printer directly or via a computer.

As such, in Embodiment 3, when the two inputted document images are similar to reference images respectively, it can be determined whether the order of the document images corresponds with the order of a document stored in advance on the basis of whether the two front side and back side document images read from the front side and back side of the one document sheet correspond with the front side and the back side of the document stored in advance. Thus, it can be determined whether the order of document images is correct and, at the same time, the page number in which the front side and the back side are reversed can be recognized in a document consisting of a plurality of pages.

Figure 25:
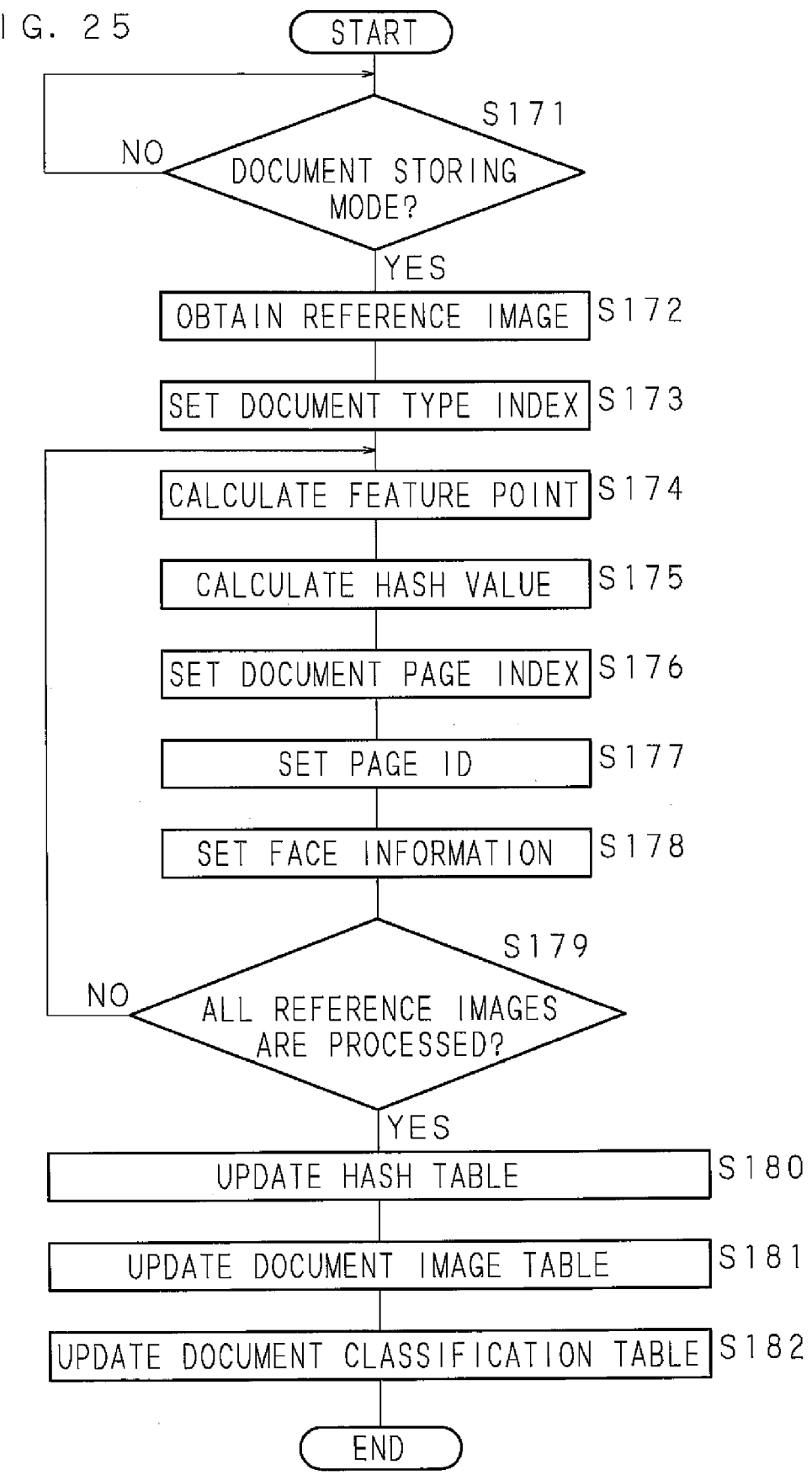
FIG. 25 is a flow chart showing a procedure of document storage processing.
Figure 26A:
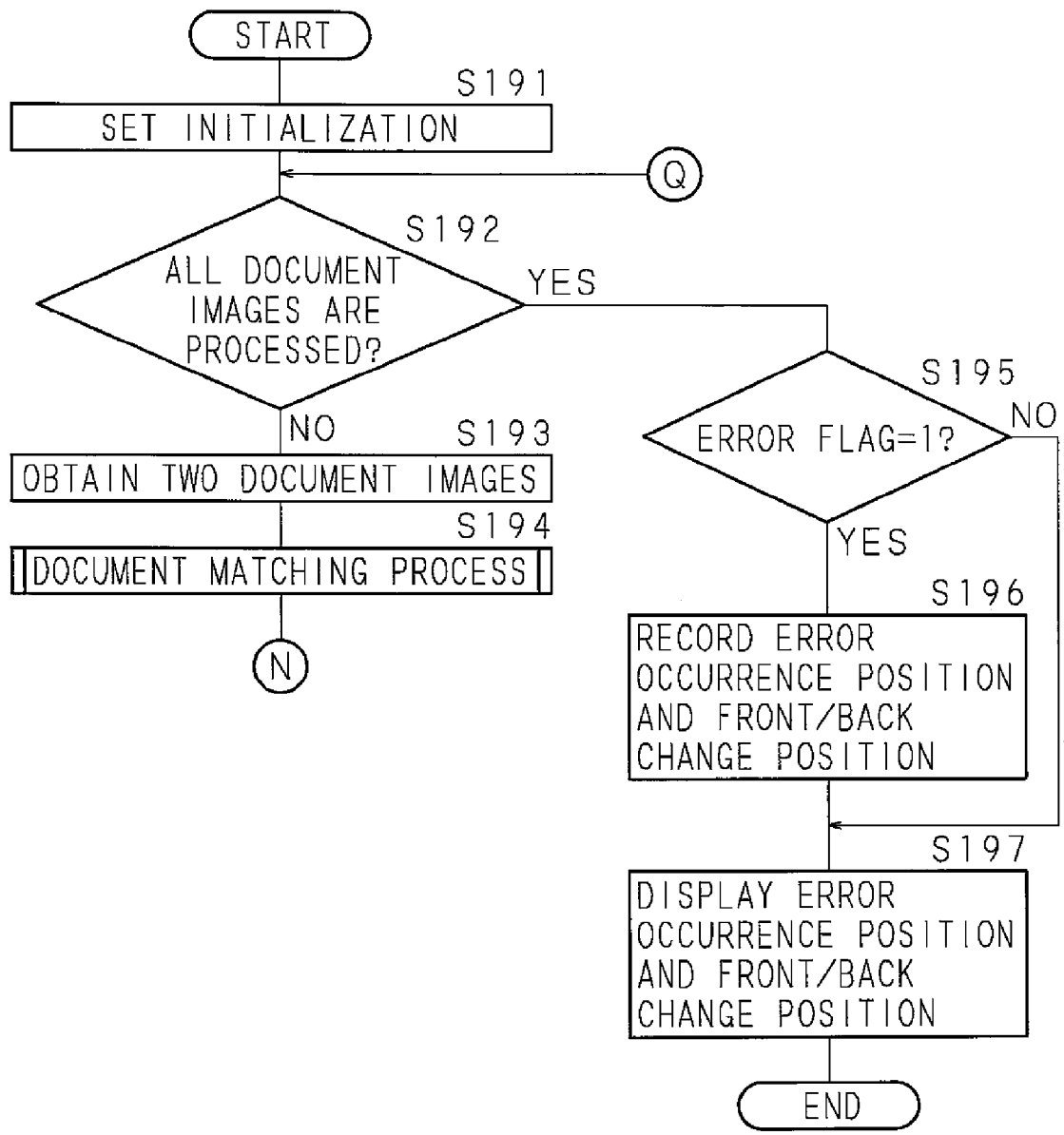
FIGS. 26A to 26F are flow charts showing a procedure of detection processing for an order of document images.
Figure 26B:
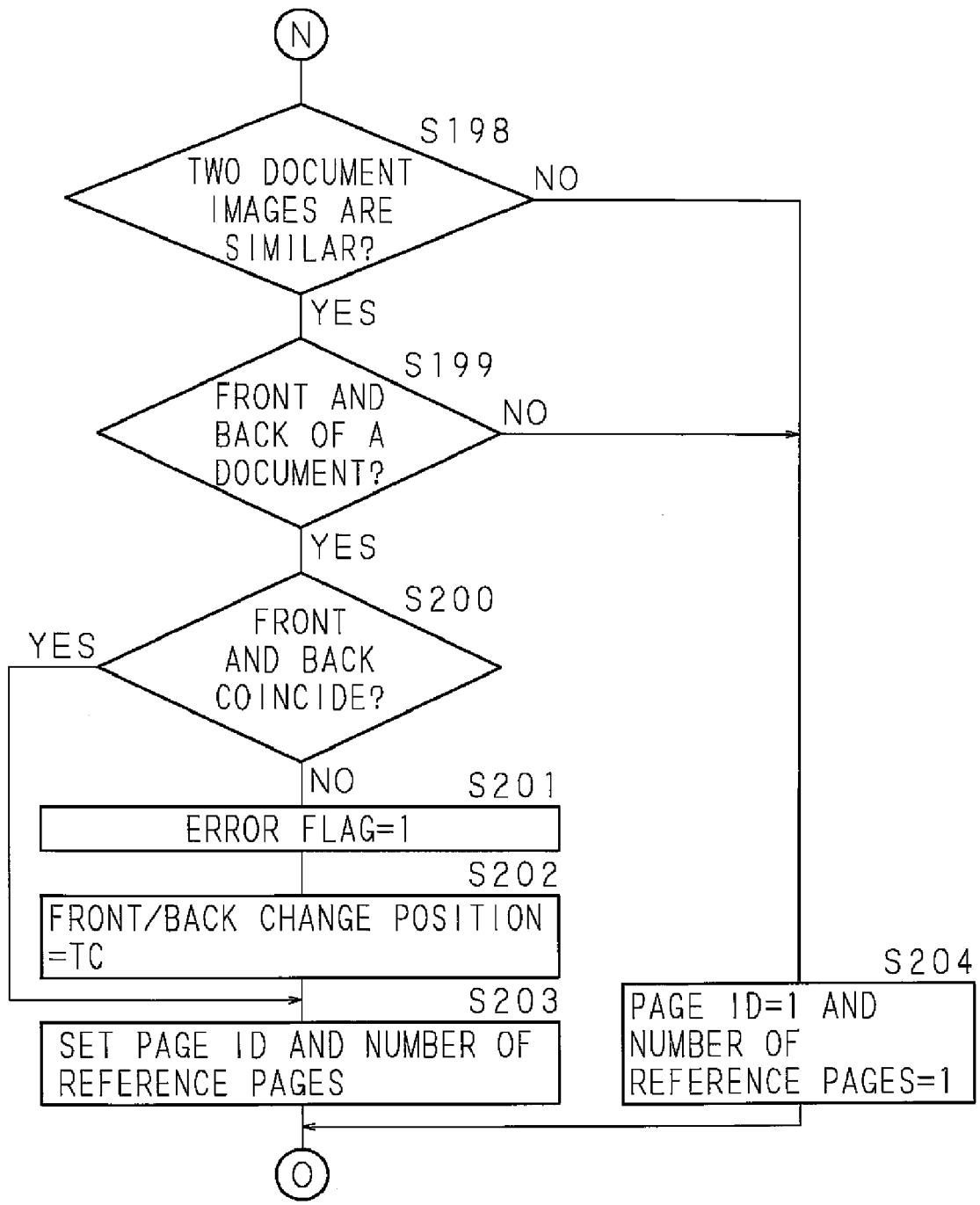
Figure 26C:
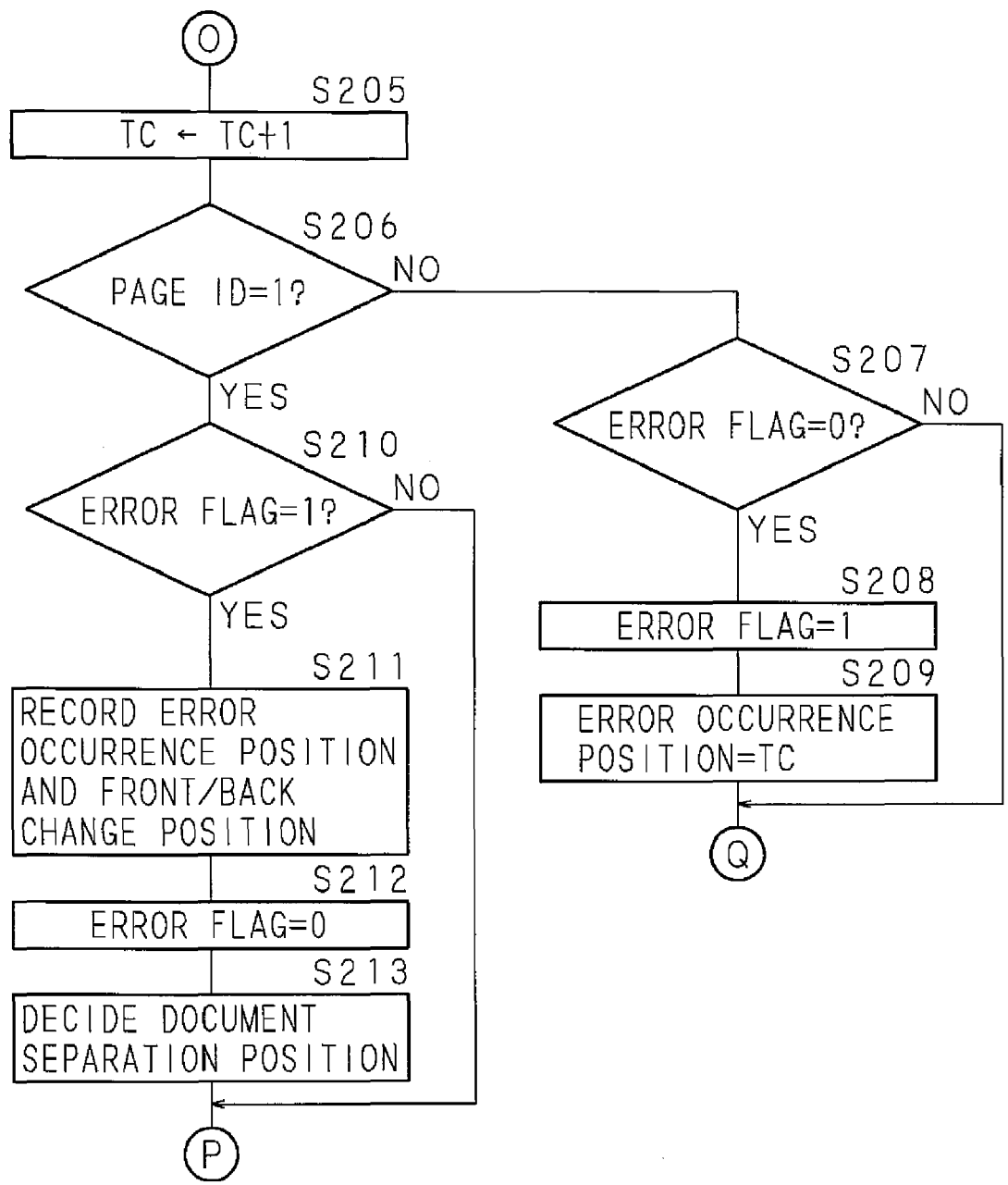
Figure 26D:
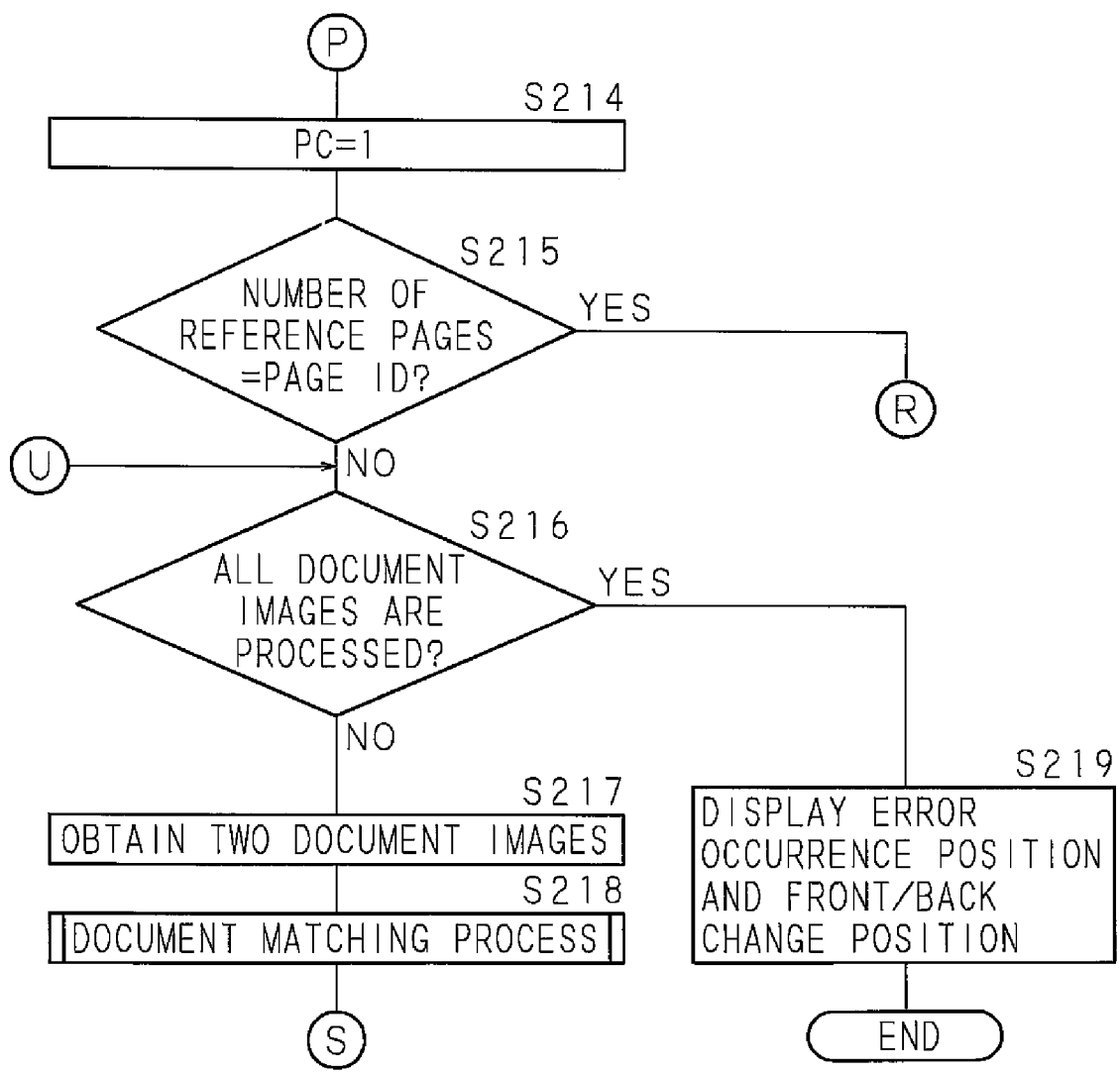
Figure 26E:
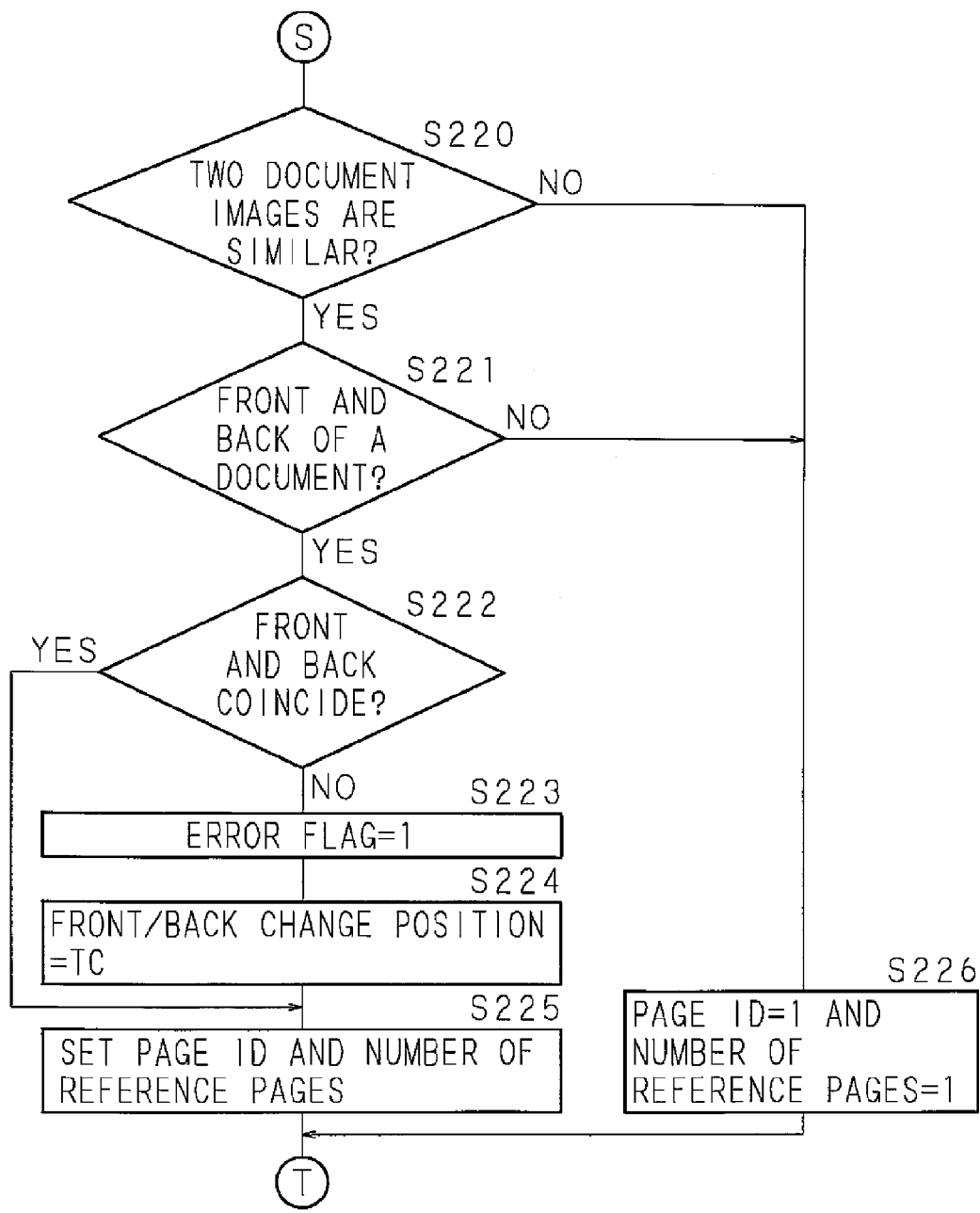
Figure 26F:
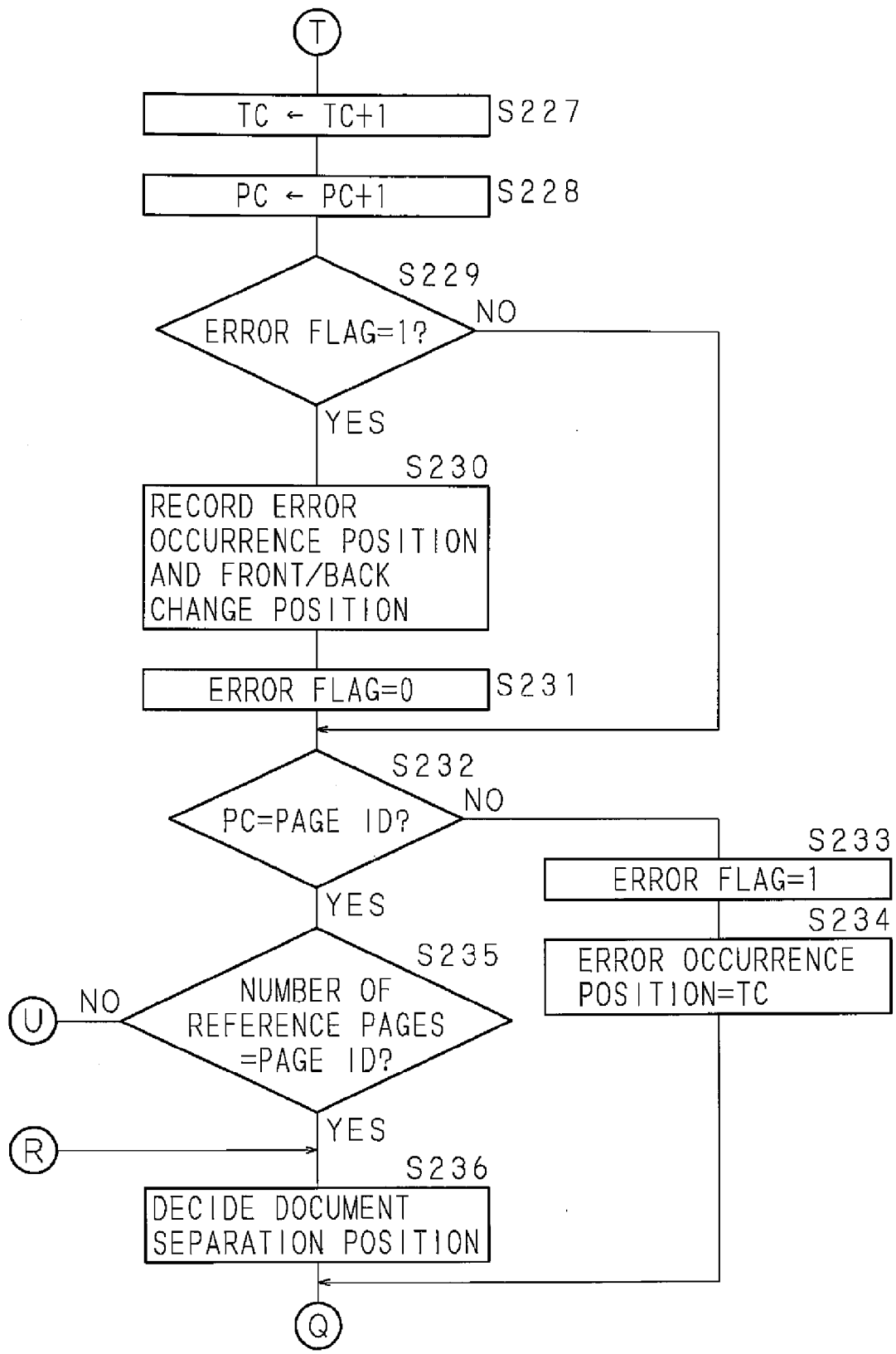

Next, the document storage processing in Embodiment 3 is described below. FIG. 25 is a flow chart showing a procedure of document storage processing. Here, in addition to being performed by a dedicated hardware circuit such as the document matching process section 24, the document storage processing may be performed by a method in which a computer program that defines the procedure of document storage processing is loaded onto a personal computer having a CPU, a RAM, a ROM, and the like and then the computer program is executed by the CPU. In the following description, the color image processing apparatus 2 is referred to as a "processing section".

The processing section determines whether the mode is a document storing mode (S171). When the mode is not a document storing mode (NO at S171), the processing section continues the processing of step S171, and waits until a user specifies a document storing mode through the operation panel 4. When the mode is a document storing mode (YES at S171), the processing section obtains a reference image (S172). At that time, the reference image may be obtained by reading two sides of a document through a document reading apparatus. Alternatively, the document image may be obtained by receiving electronic data generated by a processing apparatus such as a personal computer.

The processing section sets up the document type index (S173). The processing section calculates the feature points of the reference image (S174) and then, on the basis of the calculated feature points, calculates a hash value (features)

(S175). The processing section sets up the document page index of the reference image (S176), then sets up the page ID of the reference image (S177), then sets up face information of the reference image (S178), and then determines whether processing for all the reference images has been completed (S179). Here, the page ID may be set up 1, 2, 3 in the order where individual reference images are obtained. When the reference image is read by the document reading apparatus, the face information is set up 1 (front side) or 2 (back side) on the basis of the direction of document in the document reading apparatus.

When processing for all the reference images is not yet completed (NO at S179), the processing section continues the processing at and after step S174 so as to calculate the hash values of the remaining reference images and set up document page indices, page IDs and face information. When processing for all the reference images has been completed (YES at S179), the document page index, the page ID, the face information, and the document type index are set up for each reference image, and the processing section store into the hash table 2461 the set-up document page index and the calculated hash value so as to update the hash table 2461 (S180).

The processing section stores into the document image table 2465 the document page index, the page ID, the face information and the document type index having been set up, so as to update the document image table 2465 (S181). Then, the processing section stores into the document classification table 2463 the document type index and the number of reference pages having been set up, so as to update the document classification table 2463 (S182), and then terminates the processing.

Next, the detection processing for the order of document images in Embodiment 3 is described. FIGS. 26A to 26F are flow charts showing a procedure of detection processing for the order of document images. Here, in addition to being performed by a dedicated hardware circuit such as the document matching process section 24, the detection processing for the order of document images may be performed by loading a computer program that defines a procedure of detection processing for the order of document images onto a personal computer having a CPU, a RAM, a ROM, and the like, and then causing the CPU to execute the computer program.

The processing section performs initial setting (S191). Specifically, the processing section sets the individual values of the overall counter TC, the page counter PC, the error flag, the error occurrence position, and the front/back change position to be 0. The processing section determines whether processing for all the document images has been completed (S192). When processing for all the document images is not yet completed (NO at S192), the processing section obtains two document images read from the front side and the back side of one document sheet (S193). At that time, the document image may be obtained by reading a document through a document reading apparatus. Alternatively, the document image may be obtained by receiving electronic data generated by a processing apparatus such as a personal computer.

The processing section performs document matching process on the obtained document image (S194). Here, the document matching process is the same as that described in Embodiment 1, and hence description is omitted. When processing has been completed for all the document images (YES at S192), the processing section determines whether the error flag is 1 (S195). When the error flag is 1 (YES at S195), the processing section records the values of the error occurrence position and the front/back change position into the recorder (S196). The processing section displays onto the operation panel 4 the error occurrence position and the front/back change position recorded in the recorder (S197), and then terminates the processing. When the error flag is 0 (NO at S195), the processing section skips the processing of step S196, then displays onto the operation panel 4 the error occurrence position and the front/back change position recorded in the recorder (S197), and then terminates the processing.

On the basis of the determination whether the similarity obtained in the document matching process is larger than a threshold value Th, the processing section judges whether both of the two obtained document images are similar to reference images (S198). When the two document images are similar to reference image (YES at S198), on the basis of the document page indices of the reference images to which the two document images are respectively similar, the processing section searches the document image table 2465 so as to determine whether the two reference images are the front side image and the back side image of the one document sheet (S199). When the two reference images are the front side image and the back side image of the one document sheet (YES at S199), specifically, when the page IDs of the document page indices of the two reference images are the same to each other and the face information is respectively 1 and 2, the processing section determines whether the front and back of the two document images correspond with the front and back of the reference images (S200).

When one or both of the two document images are not similar to reference images (NO at S198), or alternatively when the two reference images to which the two document images are respectively similar are not the front side image and the back side image of the one document sheet (NO at S199), the processing section sets 1 into the individual values of the page ID and the number of reference pages corresponding to the document image under processing (S204). When the front and back of the two document images do not correspond with the front and back of the reference images (NO at S200), the processing section sets the error flag to be 1 (S201), then sets the value of the overall counter TC as the front/back change position (S202), and then returns the processing to step S203. When the front and back of the two document images correspond with the front and back of the reference images (YES at S200), the processing section skips the processing of steps S201 and S202, and then moves the processing to step S203.

On the basis of the document page indices of the reference images to which the two document images are respectively similar, the processing section searches the document image table 2465 and the document classification table 2463 so as to identify the page ID and the number of reference pages of the document page index, and then sets the values into the page ID and the number of reference pages corresponding to the document image under processing (S203).

The processing section adds one to the overall counter TC (S205). The processing section determines whether the value of the page ID is 1 (S206). When the value of the page ID is not 1 (NO at S206), the processing section determines whether the error flag is 0 (S207). When the error flag is 0 (YES at S207), the processing section sets the error flag to be 1 (S208), then sets the value of the overall counter TC into the error occurrence position value (S209), and then returns the processing to step S192. When the error flag is 1 (NO at S207), the processing section skips the processing of steps S208 and S209 so as to return the processing to step S192, and then continues the processing at and after step S192 so as to process the remaining document images.

When the value of the page ID is 1 (YES at S206), the processing section determines whether the error flag is 1

(S210). When the error flag is 1 (YES at S210), the processing section records the values of the error occurrence position and the front/back change position into the recorder (S211), and then sets the error flag to be 0 (S212). The processing section concludes that the present document image is the first document image contained in a new document type, hence determines a document dividing position to be located between the document image processed before and the present document image (S213), and then moves the processing to step S214. When the error flag is 0 (NO at S210), the processing section skips the processing of steps S211 to S213, and moves the processing to step S214.

The processing section sets the value in the page counter PC to be 1 (S214). The processing section determines whether the value of the number of reference pages corresponds with the value of the page ID (S215). When the value of the number of reference pages corresponds with the value of the page ID (YES at S215), the processing section moves the processing to step S236. When the value of the number of reference pages does not correspond with the value of the page ID (NO at S215), the processing section determines whether processing for all the document images has been completed (S216). When processing for all the document images is not yet completed (NO at S216), the processing section obtains two document images read from the front side and the back side of the one document sheet (S217), and then performs document matching process on the two obtained document images (S218).

When processing has been completed for all the document images (YES at S216), the processing section displays onto the operation panel 4 the error occurrence position and the front/back change position recorded in the recorder (S219), and then terminates the processing. At that time, the read image data may be stored in a hard disk or the like, and then selection whether the data should be exchanged may be displayed on the operation panel 4, so that the user may select the processing. When the processing of exchanging the data is selected, exchange processing for the image data is performed on the basis of the information concerning the front/back change position.

On the basis of the determination whether the similarity obtained in the document matching process is larger than a threshold value Th, the processing section judges whether both of the two obtained document images are similar to reference images (S220). When the two document images are similar to reference image (YES at S220), on the basis of the document page indices of the reference images to which the two document images are respectively similar, the processing section searches the document image table 2465 so as to determine whether the two reference images are the front side image and the back side image of the one document sheet (S221).

When the two reference images are the front side image and the back side image of the one document sheet (YES at S221), specifically, when the page IDs of the document page indices of the two reference images are the same to each other and the face information is respectively 1 and 2, the processing section determines whether the front and back of the two document images correspond with the front and back of the reference images (S222).

When one or both of the two document images are not similar to reference images (NO at S220), or alternatively when the two reference images to which the two document images are respectively similar are not the front side image and the back side image of the one document sheet (NO at S221), the processing section sets 1 into the individual values of the page ID and the number of reference pages corresponding to the document image under processing (S226), and then moves the processing to step S227. When the front and back of the two document images do not correspond with the front and back of the reference images (NO at S222), the processing section sets the error flag to be 1 (S223), then sets the value of the overall counter TC as the front/back change position (S224), and then moves the processing to step S225. When the front and back of the two document images correspond with the front and back of the reference images (YES at S222), the processing section skips the processing of steps S223 and S224, and then moves the processing to step S225.

On the basis of the document page indices of the reference images to which the two document images are respectively similar, the processing section searches the document image table 2465 and the document classification table 2463 so as to identify the page ID and the number of reference pages of the document page index, and then sets the values into the page ID and the number of reference pages corresponding to the document image under processing (S225).

The processing section adds one to the overall counter TC (S227), and then adds one to the page counter PC (S228). The processing section determines whether the error flag is 1 (S229). When the error flag is 1 (YES at S229), the processing section records the values of the error occurrence position and the front/back change position into the recorder (S230), then sets the error flag to be 0 (S231), and then moves the processing to step S232. When the error flag is 0 (NO at S229), the processing section skips the processing of steps S230 to S231, and moves the processing to step S232.

The processing section determines whether the value in the page counter PC corresponds with the value of the page ID (S232). When the value in the page counter PC does not correspond with the value of the page ID (NO at S232), the processing section sets the error flag to be 1 (S233), then sets the value of the overall counter TC into the error occurrence position value (S234), then returns the processing to step S192, and then continues the processing at and after step S192 so as to process the remaining document images.

When the value in the page counter PC corresponds with the value of the page ID (YES at S232), the processing section determines whether the value of the number of reference pages corresponds with the value of the page ID (S235). When the value of the number of reference pages corresponds with the value of the page ID (YES at S235), the processing section concludes that this document image is the last document image contained in the present document type, hence determines a document dividing position to be located between the present document image and the document image to be processed next (S236), then returns the processing to step S192, and then continues the processing at and after step S192 so as to process the remaining document images. When the value of the number of reference pages does not correspond with the value of the page ID (NO at S235), the processing section returns the processing to step S216, and then continues the processing at and after step S216 so as to process the remaining document images.

When an error or front/back change occurs, the occurrence position is displayed on the operation panel 4. Thus, the user can be notified of the occurrence position of the error or front/back change. Further, document images can be divided for each document type, while it can be determined whether each page contained in each document type is correct as well as the front and back of the page.

Embodiment 4

The image reading apparatus according to the present invention is described below in the form of Embodiment 4.

Figure 27:
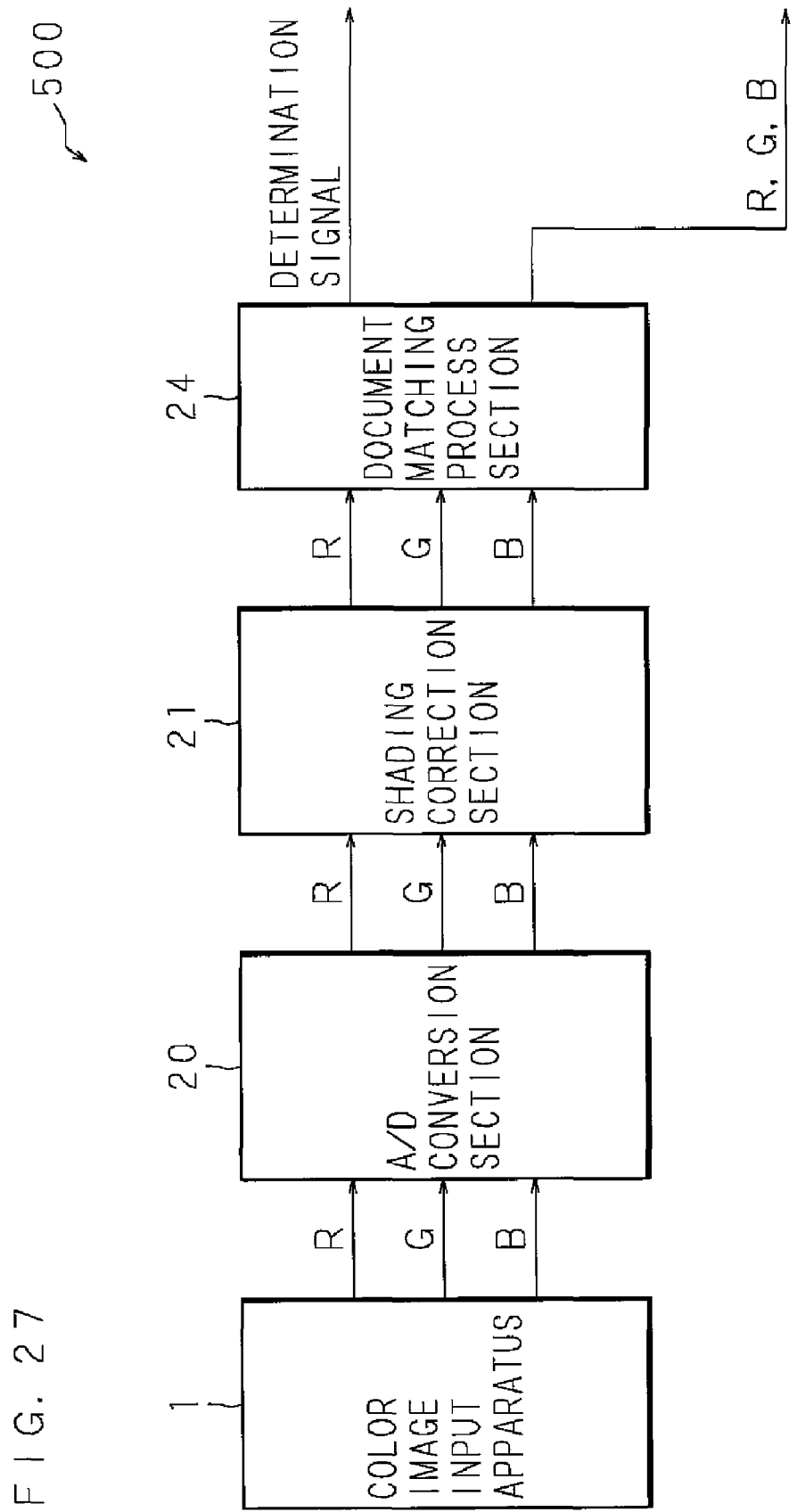
FIG. 27 is a block diagram showing a configuration of an image reading apparatus according to the present invention.

FIG. 27 is a block diagram showing the configuration of an image reading apparatus 500 according to the present invention. As shown in the figure, the image reading apparatus 500 includes a color image input apparatus 1, an A/D conversion section 20, a shading correction section 21, and a document matching process section 24. The color image input apparatus 1, the A/D conversion section 20, the shading correction section 21, and the document matching process section 24 are similar to those of the above-mentioned image forming apparatus 100, and hence description is omitted.

As described above, in the present invention, when a document consisting of a plurality of pages (e.g., fixed form sheets) is to be scanned so that a scanned filing document is to be generated, page order information for a document consisting of a plurality of pages is stored in advance together with matching information for the fixed forms of a plurality of pages. Then, similarity is judged between the reference images and the document images, so that document separations to be classified are detected. By virtue of this, the document images are classified into the form of a reference document, so that scanned filing documents can be generated. At the same time, it can be determined whether the order of document images corresponds with the order of a document stored in advance. That is, without the necessity of special operation by a user, document images can easily be classified in accordance with the order of a document stored in advance. At the same time, it can be determined whether the order of the document images is correct.

Further, even when the number of sheets for each sub-document stored in advance differs from each other, the document images can be classified in accordance with the appropriate number of document sheets. At the same time, it can be determined whether the order of the individual document images is correct. Further, when a large number of document images are to be classified, documents can easily be partitioned, and document separations to be classified are detected and divided. At the same time, it can be determined whether the order of the individual divided document images is correct. Furthermore, without the necessity of storing the reference images themselves, merely by storing features corresponding to the reference images, it can easily be judged whether a document image is similar to a reference image.

Further, at the time of scanning process (or also in the case of electronic data), when page omission, page order substitution, front/back change in a double-sided document, or the like occurs in a part of the document, the occurrence position is stored and then a scanned filing document is generated again starting at a subsequent position where the page order became correct. Thus, even when a user scans a large number of document sheets, the position where a problem such as page omission occurs can easily be recognized and, at the same time, a scanned filing document can be generated even after the position where page omission has occurred. Thus, it is sufficient that the user scans again only the part where page omission has occurred.

In the above-mentioned embodiment, the color image input apparatus 1 may be implemented by, for example, a flat-bed scanner, a film scanner, a digital camera, or a portable telephone. Further, the color image output apparatus 3 may be implemented by, for example: an image display device such as a CRT display and a liquid crystal display; or a printer employing an electrophotography method or an inkjet method that outputs the processing result onto a recording paper sheet or the like. Furthermore, as the image forming apparatus 100, a modem may be provided that serves as communication means for connecting with a server apparatus or the like via a network. Further, in place of obtaining color image data from the color image input apparatus 1, the color image data may be obtained from an external storage device, a server device, or the like via a network.

In the above-mentioned embodiment, the memory 246 and the control section 247 have been provided in the inside of the document matching process section 24. However, the present invention is not limited to this. That is, the memory 246 and the control section 247 may be provided in the outside of the document matching process section 24.

In the present invention, a computer program code for controlling document storing process, document classifying process, and process of detecting order of document image may be recorded on a computer-readable memory product for storing a program code of computer program (executable program, intermediate code program, and source program) to be executed by a computer. As a result, a memory product that stores a program code for controlling document storing process, document classifying process, and process of detecting order of document image is provided in a freely portable manner. In order that that processing can be performed by a microcomputer, the memory product may be a program medium such as a memory (not shown) like a ROM. Alternatively, a program media of another type may be employed in which a program reading device serving as an external storage device (not shown) is provided, and a memory product is inserted into there so that the memory product is read.

In each case, the stored computer program code may be accessed and executed directly by a microprocessor. Alternatively, the computer program code may be read, then the read computer program code may be downloaded into a program storage area (not shown) in a microcomputer, and then the computer program code may be executed. In this case, a computer program for download is stored in the main device in advance.

Here, the above-mentioned program medium is a memory product separable from the main body, and may be: a tape system such as a magnetic tape and a cassette tape; a disk system such as a magnetic disk (including a flexible disk and a hard disk) and an optical disk such as CD-ROM/MO/MD/DVD; a card system such as an IC card (including a memory card) and an optical card; and a medium that carries a computer program in a fixed manner, including a semiconductor memory such as a mask ROM, an EPROM (Erasable Programmable Read Only Memory), an EEPROM (Electrically Erasable Programmable Read Only Memory), and a flash ROM.

Further, in this case, since the employed system configuration permits connection to a communication network including the Internet, the memory product may carry the computer program code dynamically, for example, by means of downloading the computer program code from a communication network. Here, when the computer program code is to be downloaded from a communication network, a computer program for download may be stored in the main device in advance, or alternatively may be installed from another memory product. Here, the present invention may be implemented in the form of a computer data signal in which the above-mentioned program code is embedded in a carrier wave embodied by electronic transmission.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus for judging for each page whether an obtained document image is similar to a preliminary reference image and then, on the basis of the judgment result, performing image processing on the document image, comprising:
   a storage section for storing a plurality of type identifiers each of which contains one or a plurality of image identifiers each for identifying each of a plurality of reference images page by page and thereby identifies a type of a document composed of a plurality of pages;
   a judgment section for judging whether the obtained document image is similar to a reference image;
   a selection section for, when said judgment section judges that the document image is similar to a reference image, selecting an image identifier which identifies the reference image from among the image identifiers stored in said storage section; and
   a first determination section for, for each type identifier which contains the image identifier selected by said selection section, determining whether a constitution of the document image corresponds with a constitution of the reference image by determining whether the image identifier contained in the type identifier corresponds with the image identifier which identifies the reference image judged as being similar to the document image.

2. The image processing apparatus according to claim 1, wherein
   the image identifier contains an identifier which indicates whether the reference image is the first reference image contained in the document type identified by the type identifier which contains the image identifier itself, and wherein
   said image processing apparatus further comprises:
   a counting section for, at each time when a document image is judged as being similar to a reference image, counting up the number of document images judged as being similar; and
   a second determination section for, when the first sheet is counted up, determining whether the reference image is the first reference image on the basis of the image identifier selected by said selection section; wherein
   when the reference image is determined as not being the first reference image, said first determination section determines that the order of the document identified by the type identifier which contains the image identifier selected by said selection section does not correspond with the order of the document having been stored.

3. The image processing apparatus according to claim 1, wherein
   the image identifier contains an identifier which indicates whether the reference image is the last reference image contained in the document type identified by the type identifier which contains the image identifier itself, and wherein
   said image processing apparatus further comprises:
   a counting section for, at each time when a document image is judged as being similar to a reference image, counting up the number of document images judged as being similar;
   a third determination section for, when said judgment section judges that the document image is similar to the reference image, determining whether the reference image is the last reference image on the basis of the image identifier selected by said selection section; and
   a fourth determination section for, when the reference image is determined as being the last reference image, determining whether the number of counted document images corresponds with the number of image identifiers contained in the type identifier which contains the image identifier selected by said selection section; wherein
   when the number of counted document images is determined as not corresponding with the number of image identifiers contained in the type identifier, said first determination section determines that the order of the document identified by the type identifier which contains the image identifier selected by said selection section does not correspond with the order of the document having been stored.

4. The image processing apparatus according to claim 1, wherein
   the image identifier contains an identifier which indicates a page number in the document type identified by the type identifier containing the image identifier itself, and wherein
   said image processing apparatus further comprises:
   a counting section for, at each time when a document image is judged as being similar to a reference image, counting up the number of document images judged as being similar;
   a detecting section for, when said judgment section judges that the document image is similar to the reference image, detecting the page number of the reference image on the basis of the image identifier selected by said selection section; and
   a fifth determination section for determining whether the detected page number corresponds with the number of counted document images; wherein
   when the detected page number is determined as not corresponding with the number of counted document images, said first determination section determines that the order of the document identified by the type identifier which contains the image identifier selected by said selection section does not correspond with the order of the document having been stored.

5. The image processing apparatus according to claim 1, wherein
   the image identifier contains an identifier which indicates that the image is either a front side image or a back side image of one document sheet,
   said judgment section judges whether two document images obtained from the front side and the back side of the one document sheet are respectively similar to reference images, and
   when said judgment section judges that the two document images are respectively similar to reference images, said selection section selects image identifiers each of which identifies the reference image from among the image identifiers stored in said storage section, and wherein
   said image processing apparatus further comprises:
   a sixth determination section for, on the basis of the image identifier selected by said selection section, determining whether the two reference images are the front side image and the back side image of the one document sheet; and
   a seventh determination section for, when the two reference images are determined as being the front side image and the back side image of the one document sheet, determining whether the reference image similar to the document image obtained from the front side of the one document sheet is the front side image and whether the reference image similar to the document image obtained from the back side of the one document sheet is the back side image; wherein when it is determined that the reference image similar to the document image obtained from the front side of the one document sheet is the back side image and that the reference image similar to the document image obtained from the back side of the one document sheet is the front side image, said first determination section determines that the order of the document identified by the type identifier which contains the image identifier selected by said selection section does not correspond with the order of the document having been stored.

6. The image processing apparatus according to claim 5, further comprising:

an exchange section for, when it is determined that the reference image similar to the document image obtained from the front side of the one document sheet is the back side image and that the reference image similar to the document image obtained from the back side of the one document sheet is the front side image, exchanging the front and back of the two document images.

7. The image processing apparatus according to claim 1, wherein said storage section stores features as associated with an image identifier of the reference image, and wherein said image processing apparatus further comprises an extraction section for extracting features of the obtained document image, wherein on the basis of the features extracted by said extraction section and the features of the reference image stored in said storage section, said judgment section judges whether the document image is similar to the reference image.

8. The image processing apparatus according to claim 1, further comprising a notification section for notifying a situation when said first determination section determines that the order of the document identified by the type identifier which contains the image identifier selected by said selection section does not correspond with the order of the document having been stored.

9. An image reading apparatus comprising:

an image input apparatus for reading a document image; and an image processing apparatus according to claim 1; wherein said image processing apparatus processes the document image read by said image input apparatus.

10. An image forming apparatus comprising:

an image processing apparatus according to claim 1; and an image output apparatus for forming an output image on the basis of the document image processed by said image processing apparatus.

11. A non-transitory computer-readable memory product which stores a computer program for causing a computer to judge for each page whether an inputted document image is similar to a reference image stored in advance and then, on the basis of the judgment result, perform image processing on the document image, wherein the computer program comprises steps of:

causing the computer to judge whether the inputted document image is similar to any one of a plurality of reference images;

when a document image is judged as being similar to a reference image, causing the computer to select an image identifier which identifies the reference image from among a plurality of image identifiers each for identifying a reference image page by page; and causing the computer, for each type identifier containing the selected image identifier and identifying a type of a document composed of a plurality of pages, to determine whether a constitution of the document image corresponds with a constitution of the reference image by determining whether the image identifier contained in the type identifier corresponds with the image identifier which identifies the reference image judged as being similar to the document image.

\* \* \* \* \*